(12) United States Patent
Hunt et al.

(10) Patent No.: US 12,240,780 B2
(45) Date of Patent: Mar. 4, 2025

(54) GLASS-BASED ARTICLES WITH STRESS PROFILES HAVING REGIONS OF ENHANCED STRESS

(71) Applicant: CORNING INCORPORATED, Corning, NY (US)

(72) Inventors: Jennifer Lynn Hunt, Corning, NY (US); Rostislav Vatchev Roussev, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 541 days.

(21) Appl. No.: 17/623,791

(22) PCT Filed: Jul. 1, 2020

(86) PCT No.: PCT/US2020/040415
§ 371 (c)(1),
(2) Date: Dec. 29, 2021

(87) PCT Pub. No.: WO2021/003212
PCT Pub. Date: Jan. 7, 2021

(65) Prior Publication Data
US 2022/0242780 A1 Aug. 4, 2022

(51) Int. Cl.
*C03C 17/02* (2006.01)
*C03C 3/085* (2006.01)
*C03C 21/00* (2006.01)

(52) U.S. Cl.
CPC .............. *C03C 17/02* (2013.01); *C03C 3/085* (2013.01); *C03C 21/002* (2013.01)

(58) Field of Classification Search
None
See application file for complete search history.

(56) References Cited

U.S. PATENT DOCUMENTS 8,854,623 B2  10/2014  Fontaine et al.
10,633,279 B2  4/2020  Gross et al.
(Continued)

FOREIGN PATENT DOCUMENTS

WO  2018/143991 A1  8/2018
WO  2020/009957 A1  1/2020
(Continued)

OTHER PUBLICATIONS

International Search Report and Written Opinion of the International Searching Authority; PCT/US2020/040415; dated Oct. 9, 2020; pp. 09; European Patent Office.

*Primary Examiner* — David Sample
(74) *Attorney, Agent, or Firm* — Jeffrey A. Schmidt

(57) ABSTRACT

Glass-based articles comprise: a lithium-based aluminosilicate composition; a glass-based substrate having opposing first and second surfaces defining a substrate thickness (t), wherein t is less than or equal to 0.74 mm; and a stress profile comprising: a spike region extending from the first surface to a tail region. A stress profile comprises: a maximum compressive stress ($CS_{max}$) of greater than or equal to 450 MPa; a spike region extending from the first surface to a tail region; and the tail region extending to a center of the glass-based article; wherein the tail region comprises: a region of enhanced stress having a first average compressive stress ($CS_{avg-1}$) of greater than or equal to 100 MPa; and a FSM depth of layer ($DOL_{FSM}$) located at a depth of greater than or equal to 13 micrometers.

14 Claims, 34 Drawing Sheets

(56) References Cited

U.S. PATENT DOCUMENTS

| | | |
|---|---|---|
| 10,906,834 B2 | 2/2021 | Gross et al. |
| 11,312,657 B2 | 4/2022 | Schneider |
| 2018/0105461 A1 | 4/2018 | Schneider |
| 2018/0251400 A1 | 9/2018 | Bookbinder et al. |
| 2019/0016627 A1 | 1/2019 | Li et al. |
| 2020/0002225 A1 | 1/2020 | Schneider |
| 2020/0131085 A1* | 4/2020 | Hu .......................... C03C 3/097 |

FOREIGN PATENT DOCUMENTS

| | | |
|---|---|---|
| WO | 2020/041057 A1 | 2/2020 |
| WO | 2020/092122 A1 | 5/2020 |

* cited by examiner

GLASS-BASED ARTICLES WITH STRESS PROFILES HAVING REGIONS OF ENHANCED STRESS

CROSS-REFERENCE TO RELATED APPLICATIONS

This application is a national stage entry of International Patent Application Ser. No. PCT/US2020/040415 filed on Jul. 1, 2020, which in turn, claims the benefit of priority under 35 U.S.C. § 119 of U.S. Provisional Application Ser. No. 62/869,887 filed on Jul. 2, 2019, the contents of each of which are relied upon and incorporated herein by reference in their entireties.

FIELD

Embodiments of the disclosure generally relate to glass-based articles having improved stress profiles and methods for manufacturing the same.

BACKGROUND

Glass-based articles are used in many various industries including consumer electronics, transportation, architecture, defense, medical, and packaging. For consumer electronics, glass-based articles are used in electronic devices as cover plates or windows for portable or mobile electronic communication and entertainment devices, for example mobile phones, smart phones, tablets, watches, video players, information terminal (IT) devices, laptop computers, navigation systems and the like. In architecture, glass-based articles are included in windows, shower panels, and countertops; and in transportation, glass-based articles are present in automobiles, trains, aircraft, and sea-craft. Glass-based articles are suitable for any application that would benefit from superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired and/or engineered stress profile having one or more of the following parameters: compressive stress (CS), depth of compression (DOC), and maximum central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

In the consumer electronics industry, chemically-strengthened glass is used as a preferred material for display covers due to better aesthetics and scratch resistance compared to plastics, and better drop performance plus better scratch resistance compared to non-strengthened glass.

There is an on-going need provide glass-based articles having mechanical and/or chemical reliability for their industry. There is also an ongoing need to do so in cost-effective ways.

SUMMARY

Aspects of the disclosure pertain to glass-based articles and methods for their manufacture.

A first aspect is a glass-based article comprising: a lithium-based aluminosilicate composition; a glass-based substrate having opposing first and second surfaces defining a substrate thickness (t), wherein t is less than or equal to 0.74 mm; and a stress profile comprising: a maximum compressive stress ($CS_{max}$) of greater than or equal to 450 MPa; a spike region extending from the first surface to a tail region; and the tail region extending to a center of the glass-based article; wherein the tail region comprises: a region of enhanced stress having a first average compressive stress ($CS_{avg-1}$) of greater than or equal to 100 MPa; and a FSM depth of layer ($DOL_{FSM}$) located at a depth of greater than or equal to 13 micrometers.

Another aspect is a glass-based article comprising: a lithium-based aluminosilicate composition; a glass-based substrate having opposing first and second surfaces defining a substrate thickness (t), wherein t is less than or equal to 0.74 mm; and a stress profile comprising: a maximum compressive stress ($CS_{max}$) of greater than or equal to 450 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to a potassium depth of layer ($DOL_K$) having a second average compressive stress ($CS_{avg-2}$) of greater than or equal to 100 MPa; wherein the $DOL_K$ is located at a depth of greater than or equal to 20 micrometers.

A further aspect is a glass-based article comprising: a lithium-based aluminosilicate composition, wherein a molar ratio of $Na_2O$ to $Li_2O$ in the lithium-based aluminosilicate composition is greater than or equal to 1; a glass-based substrate having opposing first and second surfaces defining a substrate thickness (t), wherein t is greater than or equal to 0.2 mm and less than or equal to 0.74 mm; and a stress profile comprising: a maximum compressive stress ($CS_{max}$) of greater than or equal to 450 MPa; a maximum central tension ($CT_{max}$) of greater than or equal to 40 MPa; a spike region extending from the first surface to a tail region; and the tail region extending to a center of the glass-based article; wherein the tail region comprises: a region of enhanced stress having a first average compressive stress ($CS_{avg-1}$) of greater than or equal to 100 MPa; and a FSM depth of layer ($DOL_{FSM}$) located at a depth of greater than or equal to 13 micrometers.

Another aspect is a glass-based article comprising: a lithium-based aluminosilicate composition; a glass-based substrate having opposing first and second surfaces defining a substrate thickness (t), wherein t is greater than or equal to 0.2 millimeters and less than or equal to 0.74 millimeter; potassium oxide ($K_2O$) having a non-zero concentration that varies from the first surface to a potassium depth of layer ($DOL_K$) and a stress profile comprising: a maximum compressive stress ($CS_{max}$) of greater than or equal to 450 MPa; a maximum central tension ($CT_{max}$) of greater than or equal to 40 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to the $DOL_K$ having a second average compressive stress ($CS_{avg-2}$) in a range of greater than or equal to 100 MPa to less than or equal to 170 MPa. wherein the $DOL_K$ is located at a depth of greater than or equal to 20 micrometers.

Other aspects provide consumer electronic products comprising: a housing having a front surface, a back surface, and side surfaces; electrical components at least partially within the housing, the electrical components comprising at least a controller, a memory, and a display, the display at or adjacent the front surface of the housing; and a cover disposed over the display; wherein at least a portion of at least one of the housing and the cover comprises the glass-based article of any embodiments herein.

A further aspect is a method of manufacturing a glass-based article comprising: exposing a glass-based substrate that comprises sodium oxide and lithium oxide in a base composition, the glass-based substrate having opposing first and second surfaces defining a substrate thickness (t), to an ion exchange treatment to form the glass-based article, the ion exchange treatment comprising: a first bath comprising a potassium salt and a sodium salt and a lithium salt; and a second bath comprising a potassium salt, a sodium salt, and optionally a lithium salt; wherein t is less than or equal to 0.74 mm and the substrate comprises a composition wherein a molar ratio of $Na_2O$ to $Li_2O$ in the lithium-based aluminosilicate composition is greater than or equal to 1; wherein the glass-based article comprises a stress profile comprising: a maximum compressive stress ($CS_{max}$) of greater than or equal to 450 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to a potassium depth of layer ($DOL_K$) having a second average compressive stress ($CS_{avg-2}$) of greater than or equal to 100 MPa; wherein the $DOL_K$ is located at a depth of greater than or equal to 20 micrometers.

BRIEF DESCRIPTION OF THE DRAWINGS

The accompanying figures, which are incorporated in and constitute a part of this specification, illustrate several embodiments described below.

FIG. 25B is for the depth of the article of up to 110 micrometers;

FIG. 26B is for a depth of up to 110 micrometers;

Figure 1A:
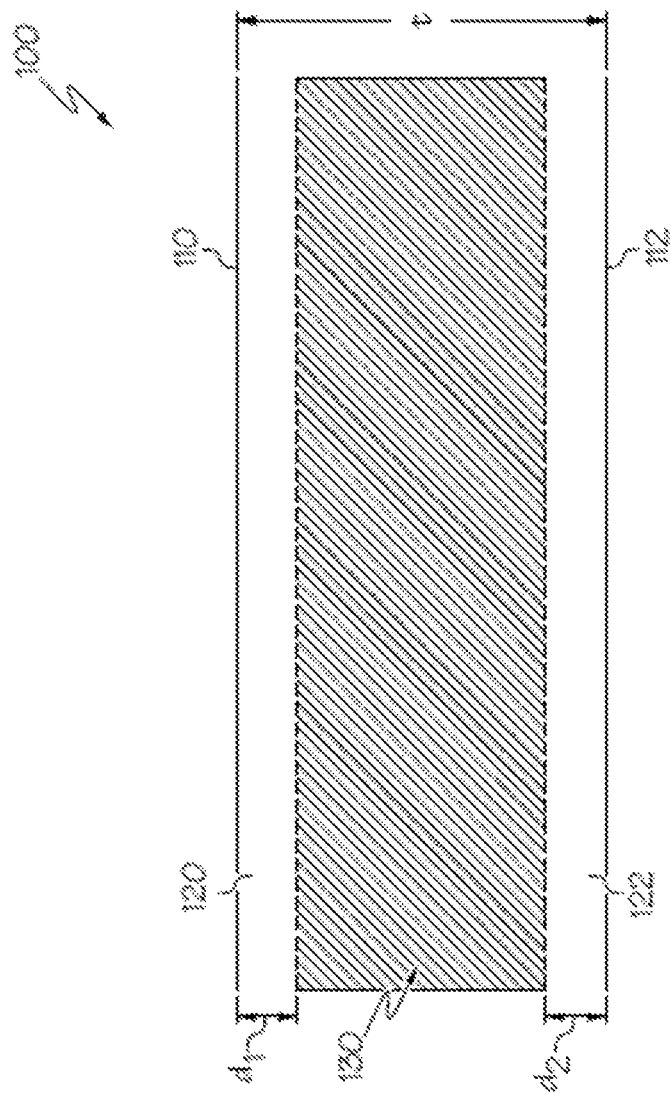
FIG. 1A schematically depicts a cross-section of a glass having compressive stress layers on surfaces thereof according to embodiments disclosed and described herein.

The accompanying drawings are included to provide a further understanding of the principles described, and are incorporated in and constitute a part of this specification. The drawings illustrate embodiments, and together with the description serve to explain, by way of example, principles and operation of those embodiments. It is to be understood that various features disclosed in this specification and in the drawings can be used in any and all combinations.

The embodiments, and the features of those embodiments, as discussed herein are exemplary and can be provided alone or in any combination with any one or more features of other embodiments provided herein without departing from the scope of the disclosure. Moreover, it is to be understood that both the foregoing general description and the following detailed description present embodiments of the disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

Herein, for purposes of explanation and not limitation, example embodiments disclosing specific details are set forth to provide a thorough understanding of various principles and aspects. However, it will be apparent to one having ordinary skill in the art, having had the benefit of the present disclosure, that the claimed subject matter may be practiced in other embodiments that depart from the specific details disclosed herein. Moreover, descriptions of well-known devices, methods and materials may be omitted so as not to obscure the description of various principles set forth herein. Finally, wherever applicable, like reference numerals refer to like elements.

DETAILED DESCRIPTION

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, for example laminates of glass and crystalline materials. Glass-based substrates according to one or more embodiments can be selected from alkali-aluminosilicate glass, alkali-containing borosilicate glass, alkali-containing aluminoborosilicate glass, and alkali-containing phosphosilicate glass.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a composition at the center of the glass article comprises the base composition.

Reference to "in chemical equilibrium" means that any diffusion of two or more alkali ions of the base composition of the substrate or the central composition of the article is less than about 10% into the IOX bath.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant, for example amounts less than 0.01 mol %. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." For example, "about 10 mol %" is intended to disclosed the about modified value and the value of exactly 10 mol %. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

Unless otherwise specified, all compositions described herein are expressed in terms of mole percent (mol %) on an oxide basis.

A "stress profile" is stress with respect to position of a glass-based article or any portion thereof. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. When used with the term "tensile", stress or central tension (CT) may be expressed as a positive value, i.e., CT=|CT|. Central tension (CT) refers to tensile stress in a central region or central tension region of the glass-based article. Maximum central tension (maximum CT or $CT_{max}$) occurs in the central tension region nominally at 0.5·t, where t is the inner thickness, which allows for variation from exact center of the location of the maximum tensile stress. Peak tension (PT) refers to maximum tension measured, which may or may not be at the center of the article.

A "knee" of a stress profile is a relatively sudden transition of the slope of the stress profile from steep to gradual. The depth of this transition can be called "knee depth", or simply "knee." Knee stress ($CS_{knee}$) is the stress at the point where the slope of the stress profile transitions from steep to gradual. $CS_{knee}$ may be determined from a refracted near-field (RNF)-measured stress profile. For stress profiles having enhanced regions of compressive stress disclosed herein, which are discussed for the inventive examples herein, $CS_{knee}$ can also be measured non-destructively from partial stress profiles obtained by measuring optical mode spectra (TM and TE) using prism coupling and employing an inverse-WKB method (discussed with respect to FIGS. 30-31), after statistical smoothing to eliminate artifacts associated with the stepwise-linear aspect of the inverse-WKB routine. A lower limit of the value of $CS_{knee}$ may be found as the value of CS at the depth of highest curvature of the smoothed profile in the vicinity of the knee. This is the value of CS on the gradual branch of the CS curve at the location where the profile slope starts increasing rapidly as depth decreases toward the surface. This location on the gradual branch has a depth that is generally equal to $DOL_{sp}$ or slightly higher (by up to 20% or 1-2 microns). The $CS_{knee}$ can be expected to be between that value of CS and a value of up to 20 MPa higher. For comparative Li-based glasses ion-exchanged in Na-containing baths and without the enhancement of the present disclosure, $CS_{knee}$ can be measured either from an RNF stress profile, or non-destructively by using the birefringence of the critical-angle transition measured in prism coupling. In one or more embodiments herein, upon exposure to two or more ion-exchange treatment steps (a K-enrichment step and at least one secondary IOX), the stress profile comprises a region of enriched potassium within which is a region of enhanced compressive stress. Reference to "enriched" or "enhanced" is with respect to a glass not exposed to a K-enrichment step. A range for CS may be reported for a region of enhanced compressive stress and/or a region of enriched potassium accordingly. An average compressive stress for each type of region may also be calculated. The average compressive stress in a region (e.g., $CS_{avg-1}$ in the region of enhanced stress and/or $CS_{avg-2}$ in the region of enriched potassium) can convey a character of such a profile. Moreover, a value for $CS_{knee}$ may be reported to characterize the enhanced stress. $CS_{knee}$ may have uncertainty as high as 20 MPa associated with measurement accuracy limitation.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, or a value substantially similar to that in the base glass composition, as can be determined by Glow Discharge-Optical Emission Spectroscopy (GD-OES)). In some embodiments, the DOL is given as the depth of exchange of the slowest-diffusing or largest ion introduced by an ion exchange (IOX) process. DOL with respect to potassium ($DOL_K$) is the depth at which the potassium content of the glass article reaches the potassium content of the underlying substrate. In some embodiments, $DOL_K$ can be determined by measuring depth of TE and TM index profiles via performing inverse-WKB (IWKB) on measured prism-coupling spectra (discussed with respect to FIGS. 30-31). Since IWKB extracts an index profile only to the depth (turning point) of the deepest detected bound mode, the end point of deeper of the TE and TM index profiles is preferable as the closest estimate of $DOL_K$. Spike depth of layer of ($DOL_{sp}$) where the bottom of the compressive stress spike is located may be determined from a statistically smoothed refracted near-field (RNF)-measured stress profile. For stress profiles having enhanced regions of compressive stress disclosed herein, which are discussed for the inventive examples herein, the spike is a region of high CS and high CS slope that extends form the surface to approximately the knee depth. A depth of the spike ($DOL_{sp}$) is measured using prism-coupling techniques modified to account for the presence of the CS-enhancement region and the denser discrete spectrum of optical modes associated with it. The value of $DOL_{sp}$ can be obtained a formula associating the depth of a linear index profile with the number of bound optical modes that such a profile supports, which is provided with the Examples herein.

As used herein, reference to $DOL_{FSM}$ means the DOL result measured by an FSM prism coupler with standard FSM-6000 software which calculates DOL based on the above mentioned formula for the depth of a linear index profile. RNF stress profiles may smoothed in accordance with statistical methods in order to account for variability in measurements. The $DOL_{FSM}$ is based on fringe counts/spectra based on measuring potassium concentration. $DOL_{FSM}$ results are based on an assumption that there is a linear potassium concentration in the tail region following the spike. The profiles of the present invention do not have a linear potassium concentration in the region following the spike, rather there is an enhanced potassium region. As a result, $DOL_{FSM}$ and $DOL_K$ differ.

Unless otherwise specified, CT and CS are expressed herein in Mega-Pascals (MPa), thickness is express in millimeters (mm) and DOC and DOL are expressed in microns (micrometers, or μm).

Compressive stress (including surface and/or peak CS, $CS_{max}$) are measured by surface stress meter (FSM) using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT, $CT_{max}$) or peak tension (PT, $PT_{max}$) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety.

General Overview of Properties of Glass-Based Articles

The present disclosure is directed to chemically strengthened cover glasses, and in particular, lithium-containing chemically strengthened cover glasses and glass-based articles. While reference is made to "glass" throughout this disclosure, it should be recognized that the same concepts are applicable to glass-based articles. For a given surface compressive stress ($CS_{max}$), increasing depth of compression (DOC) and/or knee stress $CS_{knee}$ aids in reducing fracture probability during drops on rough surfaces. While lithium-based glasses allow high DOC via fast sodium (Na) diffusion, and high $CS_{max}$ via shallow diffusion of potassium (K), generally there is a trade-off between having a spike with high $CS_{max}$ and adequate depth $DOL_{sp}$ or $DOL_K$, and having a high knee stress $CS_{knee}$. Such a trade-off is not present in Na-based glasses where $CS_{max}$ and $CS_{knee}$ can be independently controlled.

The trade-off between $CS_{knee}$ and $CS_{max}/DOL_{sp}$ can be problematic when a cover-glass sheet has a relatively small thickness, for example less than or equal to 0.6 mm, but especially less than or equal to 0.55 mm and greater than or equal to 0.05 mm. In such small thickness applications, increasing DOC may offer modest benefits, but in practice it is difficult to increase of DOC above about 20% of thickness when a substantial spike is also desired. Increasing the knee stress in such cases, thus, becomes a primary way to reduce the fracture probability during drops on rough surfaces. In particular, in 3D shaped cover glasses, contact with the rough surface tends to occur most often on the curved portion of the cover glass, and significant stresses occur during the contact event. Oftentimes fracture in such cases is initiated from flaws that are not particularly deep, e.g., flaws in the range 20-50 micrometers rather than 60-200 micrometers, but with relatively high levels of tensile stress occurring during the drop event, levels often exceeding 100 MPa. Methods for providing regions of enhanced compressive stress, specifically enriched potassium, would be beneficial. Regions of enhanced stress may be located at least at depth extending from the $DOL_{sp}$ (or slightly deeper, for example, $DOL_{sp}$ plus 1 micron) to a FSM depth of layer ($DOL_{FSM}$) having a first average compressive stress ($CS_{avg-1}$). In one or more embodiments, regions of enhanced stress are at depths of greater than or equal to 8 micrometers to less than or equal to 45 micrometers, including greater than or equal to 10 micrometers to less than or equal to 40 micrometers, and all values and subranges therebetween. Regions of enriched potassium may be defined as extending from the $DOL_{sp}$ (or slightly deeper, for example, $DOL_{sp}$ plus 1 micron, to) to a potassium depth of layer ($DOL_K$)having a second average compressive stress ($CS_{avg-2}$). In one or more embodiments, regions of enriched potassium are at depths of greater than or equal to 10 micrometers to less than or equal to 75 micrometers, including greater than or equal to 20 micrometers to less than or equal to 50 micrometers, and all values and subranges therebetween.

U.S. Patent Application Publication 2020/0002225 to common assignee improved stress profiles exemplified on 0.8 mm glass that have increased $CS_{knee}$ by use of K enrichment.

Methods and articles herein result in stress profiles that improve fracture resistance in oriented drops of 3D-shaped, 0.5 mm-thick cover glass, for next generation phones.

The examples herein differ from the examples of US2020/0002225 in the following aspects:

(1) The present disclosure focuses on thin glass, where the examples have a 0.5 mm thickness instead of 0.8 mm The problem of low $CS_{knee}$ is more problematic at 0.5 mm, which increases the significance of an increase in compressive stress in the region at 10 micrometers and deeper.

(2) The methods of K enrichment in the present disclosure differ from US2020/0002225. In US2020/0002225, the weight ratio of Li to Na in was the same as a weight ratio in a K-free bath that is equilibrated with the glass of a composition of: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$. More specifically, the weight ratio of $LiNO_3/NaNO_3$ in the bath was 0.205. Herein, in contrast, the weight ratio for $LiNO_3/NaNO_3$ is increased in the presence of a significant amount of $KNO_3$ in the bath (to produce the extended region of compressive stress immediately following the surface spike). Otherwise the glass substrate would be enriched with Na during the K enrichment step, leading to less desirable final profile (having lower CT and $CS_{knee}$) after finishing the subsequent steps of chemical strengthening that introduce the deep Na profile and help provide the large DOC that is one of the main benefits of Li-containing glasses. In the examples of the present disclosure, an increased weight ratio of $LiNO_3/NaNO_3$ of 0.273 was used when $KNO_3$ comprised 30% of the weight of the potassium-enrichment first-step bath, to avoid enriching the glass in Na during the K-enrichment step. This ratio of $LiNO_3$ to $NaNO_3$ was significantly higher (by 33%) compared to the equilibrium ratio for the $KNO_3$-free baths that was used in US2020/0002225, and using the higher ratio is beneficial in order to obtain the benefit of K enrichment without paying a price in terms of reduced total integrated stress, as estimated by a related reduction in CT. Compared to US2020/0002225, the present disclosure uses a different mixing weight ratio for the potassium-enrichment, partially equilibrated bath, of 30% $KNO_3$:55% $NaNO_3$:15% $LiNO_3$. The term "partially equilibrated" is used to signify that the bath is substantially equilibrated with respect to Li—Na ion exchange with the glass, but not equilibrated with respect to K—Na and K—Li exchange.

(3) The present disclosure provides a substantially wider range of examples of penetration of a deep potassium-enriched layer. Examples include potassium enrichment to depths of 13 micrometers, 27 micrometers, 36 micrometers, 51 micrometers, and 60-76 micrometers. These examples cover more fully the range of interest for boosting the fracture resistance over the problematic depth range 20-50 micrometers identified in experiments with oriented drops of test devices with 3-formed 0.5 mm thick cover glass on rough granite. Note that on thinner substrates for example 0.2-0.6 mm (exemplified by 0.5 mm in the present disclosure), extra penetration of K enrichment is beneficial, substantially beyond the target depth of boosting the CS, because the K enrichment tends to reduce the compression of the stress profile at depths comparable and higher than the depth of K-enriched region. For example, K enrichment to a depth of 27 micrometers was beneficial in order to achieve a net boost of CS in the profile up to depths of 20 micrometers or less when comparing to a reference profile that did not take advantage of the K-enrichment step; K enrichment to a depth of 36 micrometers is beneficial to boost the CS in a region extending up to about 25 micrometers. Similarly, K enrichment to 51 micrometers is beneficial to provide CS benefit up to a depth of 30 micrometers. Finally, K enrichment to a depth exceeding 60 micrometers is beneficial to provide net benefit in CS up to a depth of about 40 micrometers when comparing to the reference profile that does not take advantage of K enrichment. It is clear that the depth of K enrichment may be higher than the target depth of CS boost, by a factor most often ranging between 1.2 and 2, with the value of the factor increasing as the target depth of boosting CS increases. The examples of US2020/0002225 cover a relatively narrow range of depth of K enrichment, from 20 to 30 micrometers, which would provide limited depth of CS boost if applied to a thinner substrate like 0.5 mm. This depth range of K-enrichment also represents values that are a small fraction of the thickness t, from 0.025 t to 0.0375 t. The present disclosure covers K penetration up to about 76 micrometers, or 0.15 t. When the depth of K enrichment increases as a fraction of the thickness, it becomes even more beneficial to avoid Na enrichment of the substrate during the K-enrichment step.

(4) The present disclosure demonstrates a different method for validating that the bath composition for potassium enrichment is in partial equilibrium (e.g., leaves the Na:Li ratio in the glass substantially unchanged during the potassium enrichment step). This method is based on targeting a narrow range for the weight gain of the potassium enrichment step, and is cheaper and easier to implement. It is also not prone to errors (for example errors from inaccurate calibration of the equipment for chemical analysis).

(5) The avoidance of Na enrichment in that first step by using a beneficial bath composition, and a low-cost, robust method of verification, helps prevent a situation where the composition of the bath drifts from a non-equilibrium initial composition toward the equilibrium composition with the production of glass articles. Such drift can cause differences in final product parameters occurring between parts made using baths in different stages of this drift cycle, which differences could lead to yield issues.

(6) Some examples have higher CS, exceeding 1000 MPa, and even exceeding 1050 MPa or 1100 MPa, at the same time as having the high $CS_{knee}$. Such combinations of very high CS and high $CS_{knee}$ are unprecedented, and could become particularly valuable in the future, especially for relatively thin 3D formed cover glass articles.

The present disclosure sets forth a stress profile having a segment of increased compressive stress (enhanced CS), said segment occurring in a depth region from about 8 to about 80 micrometers, where the upper end of the region may be reduced to 70, 60, 50, 40, 30, 25, 20, or 15 micrometers depending on a trade-off between amount of benefit for mechanical strength and cost increase of process step (for example, increased ion exchange time) to implement it. The enhanced-CS region is generally disposed between the surface spike and the deep region that has potassium level equal to the baseline potassium level at the mid-thickness of the glass sheet. Another trade-off is between the depth of the enhanced-CS region and the DOC, which may be decreased when the depth of the enhanced-CS region is too large.

The enhanced-CS region may contain CS values above 100 MPa, above 110 MPa, 120 MPa, 130 MPa, 140 MPa, 150 MPa, and as much as 350 MPa and all ranges therebetween. In some cases the enhanced-CS region may contain CS above 200 MPa, and contain potassium and sodium that are simultaneously substantially above the baseline levels in the interior of the substrate. In some cases there is a trade-off between how high the CS enhancement is, and how much DOC is decreased as a result of this CS enhancement in the enhanced-CS region.

The enhanced-CS region helps prevent fracture when flaws with depths smaller than the depth of the enhanced-CS region are formed during drop events on a rough surface, and the cover glass experiences significant bending, causing the tips of these flaws to experience significant tension if the strengthening stress profile does not provide adequate compressive stress to prevent tension and fracture. It may also be possible for the enhanced-CS region to help reduce the probability of forming deep flaws, or the depth of flaws that form, in some cases.

Besides the region of enhanced CS, the current stress profile also has high depth of compression, as typical of state-of-the-art stress profiles in Li-containing glasses, has central tension preferably above 40 MPa, 45 MPa, 50 MPa, 55 MPa, 60 MPa, or 65 MPa, and may preferably have a surface spike of compressive stress having maximum compressive stress above 450 MPa, 500MPa, 550 MPa, 600 MPa, 650 MPa, or 700 MPa. In some examples, the maximum compressive stress in the spike may be higher than 800 MPa, and even higher than 1000 MPa, 1050 MPa, or 1100 MPa.

In some embodiments, the region of enhanced CS is formed in part by including a potassium-enrichment step of ion exchange in a bath having a mixture of potassium salt, sodium salt, and lithium salt, and the glass article is a Li-containing glass. In that potassium-enrichment step, the glass article is substantially not enriched in Na. In particular, it may be in equilibrium with the ion exchange bath with respect to ion exchange between Na and Li ions. This preserves the composition of the interior of the glass substantially unchanged during the formation of the potassium-enriched layer. In some embodiments, a very slight enrichment in Na may be acceptable, as part of normal variation of production conditions. In some embodiments, a slight intentional or unintentional enrichment in Li may be utilized, to boost the total stress of the final stress profile. The control of proper use of bath composition may be achieved efficiently via measuring the weight change of the glass samples after the potassium-enrichment step, or measuring the growth of the glass sheet. In both cases the target is a relatively small change in weight or size, corresponding mainly to the amount of K exchanged into the glass for Na and Li, without a significant contribution by Na exchanging for Li. If a boost in final stress is sought through a slight targeted Li enrichment occurring during the potassium enrichment step, then the $LiNO_3$ to $NaNO_3$ weight ratio in the bath may be increased by up to 50%, by swapping $LiNO_3$ for $NaNO_3$, and either keeping $KNO_3$ the same, or slightly increasing $KNO_3$, also at the expense of $NaNO_3$. In addition, the bath will benefit from regular replenishments a $LiNO_3$ enriched salt mixture, to keep the bath off-equilibrium so that the target Li enrichment of the glass is sustained from run to run.

In some embodiments, combinations of high spike CS, high $CS_{knee}$, and high DOC are provided, at the same time, which are normally not accessible in thin Li-based glass substrates via ion exchange where Na provides the high DOC while K provides the high spike CS. Such combinations can be used to mitigate some failure modes for example fracture from damage introduction combined with significant stress, such failure modes being dominant in some cases, for example thin (0.3-0.6 mm) 3D formed cover glass.

With reference to FIG. 1A, a glass has a thickness t and a first region under compressive stress (e.g., first and second compressive stress layers 120, 122 in FIG. 1A) extending from the surface to a depth of compression (DOC) of the glass and a second region (e.g., central region 130 in FIG. 1A) under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 1, the first compressive stress layer 120 extends from first surface 110 to a depth di and the second compressive stress layer 122 extends from second surface 112 to a depth dz. Together, these segments define a compression or CS of glass 100.

The compressive stress of both compressive stress layers (120, 122 in FIG. 1A) is balanced by stored tension in the central region (130) of the glass.

Figure 1B:
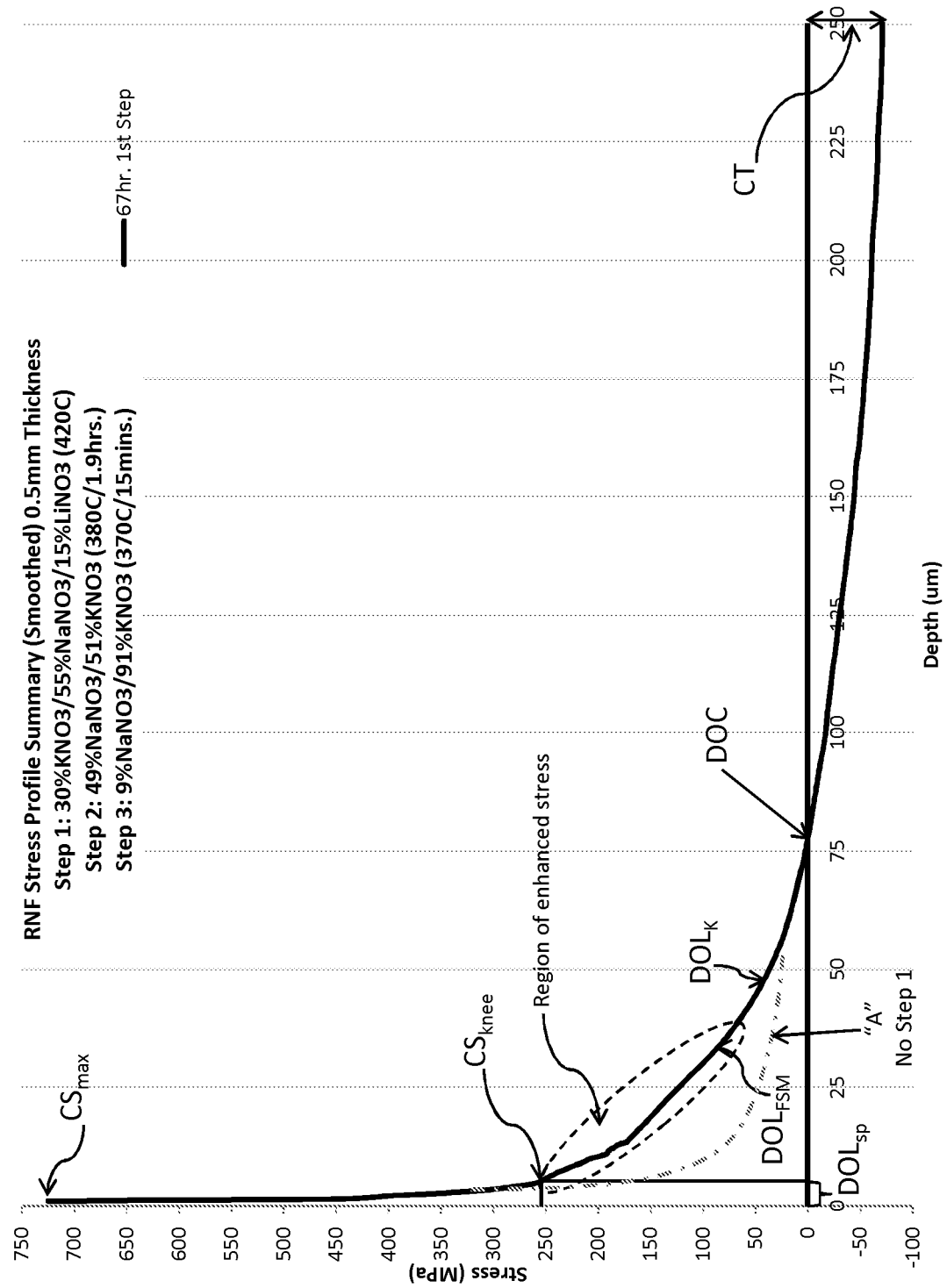
FIG. 1B provides a representative RNF-generated stress profile for one-half thickness of an article according to some embodiments disclosed herein (67 hour first step) and an excerpt of a representative comparative curve "A" showing a comparative stress profile where no first K-enrichment step occurred.

FIG. 1B is an exemplary, non-limiting RNF-generated stress profile for one-half thickness of an article according to some embodiments disclosed herein (67 hour first step) and an excerpt of a representative comparative curve "A" showing a comparative stress profile where no first K-enrichment step occurred. For the-67 hour first step stress profile and other stress profiles herein graphed for depths of up to one-half thickness of the article, it is understood that the stress profiles are symmetric. Stress profiles are generally considered symmetric when two-sided IOX treatment procedures and uniform substrate compositions are used. stress profile containing a spike region near the surface extending to a knee, and a tail region extending from the knee to deeper in the glass towards the center. The stress profile comprises: a maximum compressive stress ($CS_{max}$); an FSM-measured depth of layer ($DOL_{FSM}$); a depth of layer of the spike ($DOL_{sp}$), a stress of the knee ($CS_{knee}$), a depth of compression (DOC), which is the location where the stress is first zero inside the glass and changes sign from compression to tension, and a central tension (CT or $CT_{max}$) that is the stress at the center of the glass. A potassium depth of layer ($DOL_K$) can be determined as discussed above. In FIG. 1B, the convention is that compressive stress is positive and tension is negative for illustration purposes. A spike region extends from the surface to the $DOL_{sp}$ and a tail region extends from the $DOL_{sp}$ to a center of the article. A region of enhanced stress, enhanced with respect to comparative stress profile "A", which did not have a K-enrichment step, is located in the tail region. Also, a region of enriched potassium, enriched with respect to the comparative stress profile "A", which did not have a K-enrichment step, is also located in the tail region. Taking an average compressive stress ($CS_{avg-1}$) in the depth from $DOL_{sp}$ plus 1 micron to $DOL_{FSM}$ will provide a way to characterize the region of enhanced stress. It is understood that $DOL_{FSM}$ falls within the region of enhanced stress, but may not be an exact bound of this region. It is also understood that $DOL_{sp}$ may not be an exact bound of this region, so for calculation purposes, $CS_{avg-1}$ is taken from $DOL_{sp}$ plus 1 micron to $DOL_{FSM}$. Taking an average compressive stress ($CS_{avg-2}$) in the depth from $DOL_{sp}$ plus 1 micron to $DOL_K$ will provide a way to characterize the region of enriched potassium. It is understood that $DOL_K$ falls within the region of enriched potassium, but may not be an exact bound of this region. It is again understood that $DOLS_{sp}$, may not be an exact bound of this region, so for calculation purposes, $CS_{avg-2}$ is taken from $DOLS_{sp}$ plus 1 micron to $DOL_K$. All points of the stress profile located in the spike region comprise a tangent having a slope with an absolute value that is 20 MPa/micrometer or greater, and all points of the stress profile located in the tail region deeper than the $DOL_K$ comprise a tangent having a slope with an absolute value that is less than 20 MPa/micrometer.

Disclosed herein are lithium (Li)-containing glass-based articles of thickness t having improved stress profiles with enhanced regions of stress in the knee region below the surface.

In particular, advantageous stress profiles for thin Li-containing glass articles have a region of enhanced stress having a first average compressive stress ($CS_{avg-1}$) in a range of greater than or equal to 100 MPa and a FSM depth of layer ($DOL_{FSM}$) located at a depth of greater than or equal to 13 micrometers. in combination with one or any combination of the following: $CS_{max}$ of greater than or equal to 450 MPa, including greater than or equal to 500 MPa, greater than or equal to 550 MPa, greater than or equal to 600 MPa, greater than or equal to 650 MPa, and greater than or equal to 700 MPa, wherein t is greater than or equal to 0.2 millimeters and/or less than or equal to 0.74 millimeters, including all values and ranges therebetween, including less than or equal to 0.65 mm, less than or equal to 0 6 mm, less than or equal to 0.5 mm, less than or equal to 0.4 mm, and less than or equal to 0.3 mm.

In one or more embodiments, the glass-based articles comprise: a FSM depth of layer ($DOL_{FSM}$) of greater than or equal to 13 micrometers to less than or equal to 55 micrometers, including all values and subranges therebetween, for example greater than or equal to 15 micrometers to less than or equal to 50 micrometers, or greater than or equal to 20 micrometers to less than or equal to 45 micrometers, or greater than or equal to 22 micrometers to less than or equal to 40 micrometers, or greater than or equal to 25 micrometers to less than or equal to 35 micrometers.

In one or more embodiments, glass-based articles comprise a $DOL_{sp}$ of greater than or equal to 3 micrometers to less than or equal to 20 micrometers, including all values and subranges therebetween, for example greater than or equal to 5 micrometers to less than or equal to 19 micrometers, greater than or equal to 6 micrometers to less than or equal to 12 micrometers, greater than or equal to 6.2 micrometers to less than or equal to 8 micrometers, greater than or equal to 10.5 micrometers to less than or equal to 15 micrometers, or from greater than or equal to 11 micrometers to less than or equal to 15 micrometers, or from greater than or equal to 8 micrometers to less than or equal to 15 micrometers, or from greater than or equal to 8.5 micrometers to less than or equal to 14.5 micrometers, or from greater than or equal to 9 micrometers to less than or equal to 14 micrometers, or from greater than or equal to 9.5 micrometers to less than or equal to 13.5 micrometers, or from greater than or equal to 10 micrometers to less than or equal to 13 micrometers, or from greater than or equal to 10.5 micrometers to less than or equal to 12.5 micrometers, or from greater than or equal to 11 micrometers to less than or equal to 12 micrometers.

In one or more embodiments, glass-based articles comprise a $DOL_K$ of greater than or equal to 20 micrometers to less than or equal to 75 micrometers, including all values and subranges therebetween, for example greater than or equal to 22 micrometers to less than or equal to 70 micrometers, or greater than or equal to 25 micrometers to less than or equal to 65 micrometers, or greater than or equal to 30 micrometers to less than or equal to 60 micrometers, or greater than or equal to 35 micrometers to less than or equal to 55 micrometers, or greater than or equal to 40 micrometers to less than or equal to 50 micrometers.

In one or more embodiments, the glass-based articles comprise: a region of enhanced stress having an average compressive stress ($CS_{avg-1}$) of greater than or equal to 100 MPa and/or less than or equal to 220 MPa, and all values and subranges therebetween. In one or more embodiments, the glass-based articles comprise: a region of enriched potassium having an average compressive stress ($CS_{avg-2}$) of greater than or equal to 100 MPa and/or less than or equal to 170 MPa, and all values and subranges therebetween.

In one or more embodiments, the glass-based articles comprise: a knee compressive stress ($CS_{knee}$) of greater than or equal to 160 MPa and/or less than or equal to 300 MPa, and all values and subranges therebetween, including greater than or equal to 165 MPa and/or less than or equal to 295 MPa.

In one or more embodiments, the glass-based articles comprise: a maximum central tension ($CT_{max}$) of greater than or equal to 40 MPa and/or less than or equal to a value of $3/\sqrt{t}$ MPa where t is measured in millimeters, and all values and subranges therebetween.

In one or more embodiments, the glass-based articles comprise: a depth of compression (DOC) of greater than or equal to 0.12·t and/or less than or equal to 0.25·t, and all values and subranges therebetween.

Stress profiles may comprise: a spike region extending from the first surface to a tail region; and a tail region extending to a center of the glass-based article; wherein all points of the stress profile located in the spike region comprise a tangent having a slope with an absolute value that is 20 MPa/micrometer or greater, and all points of the stress profile located in the tail region comprise a tangent having a slope with an absolute value that is less than the absolute values of the slopes of the tangents of the spike region.

In the glass-based articles, there is a metal oxide having a non-zero concentration that varies from the first surface to a depth of layer (DOL) with respect to the metal oxide. In one or more embodiments, the metal oxide having a non-zero concentration that varies from the first surface is potassium, having a $DOL_K$. A stress profile is generated due to the non-zero concentration of the metal oxide(s) that varies from the first surface. The non-zero concentration may vary along a portion of the article thickness. In some embodiments, the concentration of the metal oxide is non-zero and varies, along a thickness range from 0·t to about 0.3·t. In some embodiments, the concentration of the metal oxide, for example potassium, is non-zero and varies along a thickness range from 0·t to about 0.050·t, or from 0·t to about 0.0.25·t, or from 0·t to about 0.020·t, or from 0·t to about 0.0175·t, or from 0·t to about 0.015·t, or from 0·t to about 0.0125·t, or from 0·t to about 0.010·t. In some embodiments the variation in concentration may be continuous along the above-referenced thickness ranges. Variation in concentration may include a change in metal oxide concentration of at least about 0.2 mol % from the surface to the DOL, for example $DOL_K$. In some embodiments the change in metal oxide concentration may be at least about 0.3 mol %, or at least about 0.4 mol %, or at least about 0.5 mol % from the surface to the DOL, for example $DOL_K$. This change may be measured by known methods in the art including microprobe.

In some embodiments, the variation in concentration may be continuous along thickness segments in the range from about 10 micrometers to about 30 micrometers. In some embodiments, the concentration of the metal oxide decreases from the first surface to a value at a point between the first surface and the second surface and increases from that value to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, to the size of the monovalent ions that are exchanged into the glass for smaller monovalent ions. In such glass-based articles, the area at or near the surface comprises a greater CS due to the greater amount of larger ions (for example, K+ ions) at or near the surface. Furthermore, the slope of the stress profile typically decreases with distance from the surface due to the nature of the concentration profile achieved due to chemical diffusion from a fixed surface concentration.

In one or more embodiments, the metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a value at a point between the first and second surfaces. At that point, the concentration of the metal oxide is the least along the entire thickness t; however the concentration may also be non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the metal oxide may be determined from a baseline amount of the metal oxide in the glass-based substrate that is ion exchanged to form the glass-based article.

In one or more embodiments, all points of the stress profile located in the spike region comprise a tangent having a slope with an absolute value that is 20 MPa/micrometer or greater.

In one or more embodiments, the glass-based articles comprise a maximum compressive stress ($CS_{max}$, nominally at the first surface) that is greater than or equal to 450 MPa. For example, $CS_{max}$ is greater than or equal to 450 MPa and less than or equal to 1700 MPa, greater than or equal to 500 MPa to less than or equal to 1600 MPa, greater than or equal to 550 MPa to less than or equal to 1400 MPa, greater than or equal to 600 MPa to less than or equal to 1200 MPa, greater than or equal to 650 MPa to less than or equal to 1000 MPa, greater than or equal to 700 MPa to less than or equal to 950 MPa, greater than or equal to 700 MPa to less than or equal to 900 MPa, greater than or equal to 700 MPa to less than or equal to 850 MPa, greater than or equal to 700 MPa to less than or equal to 800 MPa, or about 750 MPa, and all values and subranges therebetween.

In one or more embodiments, the glass-based articles comprise a thickness of greater than or equal to 0.02 millimeters to less than or equal to 0.74 millimeters, including all values and ranges therebetween, including less than or equal to 0.65 mm, less than or equal to 0.6 mm, less than or equal to 0.5 mm, less than or equal to 0.4 mm, and less than or equal to 0.3 mm In one or more embodiments, the glass-based articles comprise a base composition having a molar ratio of $Na_2O$ to $Li_2O$ of greater than or equal to 1 and less than or equal to 1.8, for example greater than or equal to 1.4, or greater than or equal to 1.5, or greater than or equal to 1.6, and/or less than or equal to 1.7, including all values and subranges therebetween, including 1, 1.14, 1.56, and 1.69.

Glass-Based Substrates

Examples of glasses that may be used as substrates may include alkali-alumino silicate glass compositions or alkali-containing aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size.

In some embodiments, the substrates may comprise a lithium-containing alkali aluminosilicate glass. In some embodiments, the lithium-containing alkali aluminosilicate glass has a composition including, in mol %, $SiO_2$ in an amount in the range from about 60% to about 75%, $Al_2O_3$ in an amount in the range from about 12% to about 20%, $B_2O_3$ in an amount in the range from about 0% to about 5%, $Li_2O$ in an amount in the range from about 2% to about 8%, $Na_2O$ in an amount greater than about 4%, MgO in an amount in the range from about 0% to about 5%, ZnO in an amount in the range from about 0% to about 3%, CaO in an amount in the range from about 0% to about 5%, and $P_2O_5$ in a non-zero amount; wherein the glass substrate is ion-exchangeable and is amorphous, wherein the total amount of $Al_2O_3$ and $Na_2O$ in the composition is greater than about 15 mol %. In one or more embodiments, the amount of $Na_2O$ in is greater than or equal to 4% and less than or equal to 12%.

In embodiments, the glass-based substrates may be formed from any composition capable of forming the stress profiles. In some embodiments, the glass-based substrates may be formed from the glass compositions described in U.S. application Ser. No. 16/202,691 titled "Glasses with Low Excess Modifier Content," filed Nov. 28, 2018, the entirety of which is incorporated herein by reference. In some embodiments, the glass articles may be formed from the glass compositions described in U.S. application Ser. No. 16/202,767 titled "Ion-Exchangeable Mixed Alkali Aluminosilicate Glasses," filed Nov. 28, 2018, the entirety of which is incorporated herein by reference.

The glass-based substrates may be characterized by the manner in which it may be formed. For instance, the glass-based substrates may be characterized as float-formable (i.e., formed by a float process), down-drawable and, in particular, fusion-formable or slot-drawable (i.e., formed by a down draw process for example a fusion draw process or a slot draw process). In embodiments, the glass-based substrates may be roll formed.

A glass-based substrate may be prepared by floating molten glass on a bed of molten metal, typically tin to produce a float glass characterized by smooth surfaces and uniform thickness. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further, annealed to reduce internal stress, and optionally polished.

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. Down-drawn glass-based substrates may be drawn to a thickness of less than about 2 mm. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article, which includes a fusion line at or near the center of the article and that can be detected by microscopy. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot and/or nozzle and is drawn downward as a continuous glass article and into an annealing region.

Ion Exchange (IOX) Treatment

Chemical strengthening of glass substrates having base compositions is done by placing the ion-exchangeable glass substrates in a molten bath containing cations (K+, Na+, Ag+, etc) that diffuse into the glass while the smaller alkali ions (Na+, Li+) of the glass diffuse out into the molten bath. The replacement of the smaller cations by larger ones creates compressive stresses near the top surface of glass. Tensile stresses are generated in the interior of the glass to balance the compressive stresses.

With respect to ion exchange processes, they may independently be a thermal-diffusion process or an electro-diffusion process. Further additional strengthening treatments may be selected from the group consisting of: ion exchange, thermal annealing, thermal tempering, and combinations thereof.

After an ion exchange process is performed, it should be understood that a composition at the surface of a glass-based article may be different than the composition of the as-formed glass-based substrate (i.e., the glass-based object before it undergoes an ion exchange process). This results from one type of alkali metal ion in the as-formed glass-based substrate, for example, for example $Li^+$ or $Na^+$, being replaced with larger alkali metal ions, for example, for example $Na^+$ or $K^+$, respectively. However, the glass composition at or near the center of the depth of the glass-based article will, in embodiments, still have the composition of the as-formed glass-based substrate.

In one or more embodiments, partially-equilibrated baths for potassium enrichment are used. The partially-equilibrated bath for potassium enrichment has the property that it provides potassium ions to the glass in exchange for Na and Li ions, but does not change molar concentrations of $Na_2O$ and $Li_2O$ beyond the depth of the potassium-enriched layer. This means that there is no net exchange of Na ions for Li ions between the bath and the glass, so the bath can be considered in equilibrium with respect to Na—Li exchange, but not in equilibrium with respect to K—Na and K—Li exchange. The bath may be deemed partially equilibrated with the glass, and the ion exchange process can be called partially equilibrated. The partially equilibrated bath has a process-cost advantage owing to the partial equilibrium. The bath has essentially unlimited life because it only loses potassium ions due to ion exchange and salt volume due to dragout (salt extracted from the bath due to adhesion to the surfaces of the glass and the fixtures for glass immersion in the bath). In most cases these losses can be replaced by adding $KNO_3$ to the bath to recover the target volume of the bath. If $KNO_3$ content of the bath becomes a bit too high and disturbs slightly the partial equilibrium of Li—Na exchange, the ion exchange brings the bath back to equilibrium. Hence, the bath composition is self-correcting, which makes the bath preferred when lowering manufacturing complexity and cost is preferred.

Some embodiments comprise a process for enriching a near-surface layer of a glass-based article with potassium ion (K) by use of a first bath in which a potassium salt is $KNO_3$, which is present in an amount of greater than or equal to 30% by weight, a sodium salt is $NaNO_3$, and a lithium salt is $LiNO_3$. In addition, a weight ratio of $LiNO_3$ to $NaNO_3$ in the first bath can be adjusted based on glass composition. For glasses with a base composition having a molar ratio of $Na_2O$ to $Li_2O$ of 1.69, a preferred weight ratio of $LiNO_3$ to $NaNO_3$ in the first bath is 0.273 or 0.273±0.1%. For glasses with a base composition having a molar ratio of $Na_2O$ to $Li_2O$ of 1.14, a preferred weight ratio of $LiNO_3$ to $NaNO_3$ in the first bath is 0.68 or 0.38±0.1%. For glasses with a base composition having a molar ratio of $Na_2O$ to $Li_2O$ of 1, a preferred weight ratio of $LiNO_3$ to $NaNO_3$ in the first bath is 0.858±0.1%.

In some of the examples it is preferred that the bath not be partially equilibrated, but rather enrich the glass in Li, while forming the K-enriched layer near the surface. In this case the glass experiences lower weight gain than the prescription weight gain of the partially-equilibrated process. The enrichment of the glass with Li allows obtaining higher levels of compressive stress at depth beyond the K-enrichment layer during the following steps of chemical strengthening that involve Na diffusion into the glass. Also, higher center tension is possible in this way, an indicator of higher integral of compressive stress over the compressive-stress layer. Such Li- and K-enriching process step may be pushed to result in a weight loss, where the lower weight gain is a negative weight gain. The salt selected to obtain such enrichment via ion exchange is selected in such a way that the weight change of the article is kept within a desired range after such ion exchange, which indicates that only potassium ions are being exchanged into the article (as significant weight gain would be expected if there were a substantial sodium (Na) enrichment in the average chemical composition of the article at the expense of lithium (Li); and significant weight loss would be expected if there were a substantial Li enrichment in the average chemical composition of the article at the expense of Na) where t is the thickness or the article or substrate in mm. A preferred weight gain is preferably less than or equal to about 0.1(1+ 0.02/t)%, where t is in millimeters, including less than or equal to about 0.05(1+0.02/t)%, or even 0%. A preferred weight loss is less than or equal to 0.3%, 0.25%, 0.21%, or even 0.20%. Using a convention that weight loss is a negative weight gain, in one or more embodiments, a value of weight gain of the glass-based substrate is in a range of greater than or equal to −0.3% (or −0.25%, −0.21%, or −0.20%) to less than or equal to 0.1(1+0.02/t)%, wherein t is measured in millimeters.

Some embodiments comprise the use of specific mixtures of salts comprising, for example, a mixture of K-enriching nitrates including $KNO_3$, $LiNO_3$, and $NaNO_3$, for achieving the K enrichment of the glass article with limited or no change in the Na to Li ratio in the interior of the glass (e.g., at depths larger than about 0.010·t). An example K-enriching composition for a lithium-based glass is 55 wt. % $NaNO_3$, 15 wt. % $LiNO_3$, and 30 wt. % $KNO_3$, which without being limiting, is advantageously used with a glass substrate whose base composition has a molar ratio of $Na_2O$ to $Li_2O$ of less than or equal to 1.7, or of greater than 1.

In one or more embodiments, a method of manufacturing a glass-based article comprises: exposing a glass-based substrate that comprises sodium oxide and lithium oxide in a base composition, the glass-based substrate having opposing first and second surfaces defining a substrate thickness (t), to an ion exchange treatment to form the glass-based article, the ion exchange treatment comprising: a first bath comprising a potassium salt and a sodium salt and a lithium salt; and a second bath comprising a potassium salt, a sodium salt, and optionally a lithium salt; wherein t is less than or equal to 0.74 mm and the substrate comprises a composition wherein a molar ratio of $Na_2O$ to $Li_2O$ in the lithium-based aluminosilicate composition is greater than or equal to 1; wherein the glass-based article comprises a stress profile comprising: a maximum compressive stress ($CS_{max}$) of greater than or equal to 450 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to a potassium depth of layer ($DOL_K$) having a second average compressive stress ($CS_{avg-2}$) of greater than or equal to 100 MPa; wherein the $DOL_K$ is located at a depth of greater than or equal to 20 micrometers. In an embodiment, in the first bath: the potassium salt is $KNO_3$, which is present in an amount of greater than or equal to 30% by weight, the sodium salt is $NaNO_3$, the lithium salt is $LiNO_3$, and a weight ratio of $LiNO_3$ to $NaNO_3$ in the first bath is 0.273±0.1%. In an embodiment, after exposure to the first bath, an absolute value of weight gain of the glass-based substrate is less than or equal to 0.1(1+0.02/t), wherein t is measured in millimeters. In an embodiment, the ion exchange treatment further comprises a third bath comprising a potassium salt and a sodium salt wherein content of the potassium salt in the third bath is greater than or equal to 90% by weight. In an embodiment, the first bath comprises: 20-60 wt. % $NaNO_3$, 10-20 wt. % $LiNO_3$, and 25-60 wt. % $KNO_3$, wherein content of the $NaNO_3$, $LiNO_3$, and $KNO_3$ totals 100%, and the glass substrate comprises a base composition having a molar ratio of $Na_2O$ to $Li_2O$ of greater than or equal to 1. In a detailed embodiment, the first bath comprises: 50-60 wt. % $NaNO_3$, 10-20 wt. % $LiNO_3$, and 25-35 wt. % $KNO_3$, wherein content of the $NaNO_3$, $LiNO_3$, and $KNO_3$ totals 100%, and the glass substrate comprises a base composition having a molar ratio of $Na_2O$ to $Li_2O$ of greater than or equal to 1.3. In another detailed embodiment, the first bath comprises: 20-30 wt. % $NaNO_3$, 10-20 wt. % $LiNO_3$, and 55-60 wt. % $KNO_3$, wherein content of the $NaNO_3$, $LiNO_3$, and $KNO_3$ totals 100%, and the glass substrate comprises a base composition having a molar ratio of $Na_2O$ to $Li_2O$ of greater than or equal to 1 and less than or equal to 1.3.

End Products

Figure 2A:
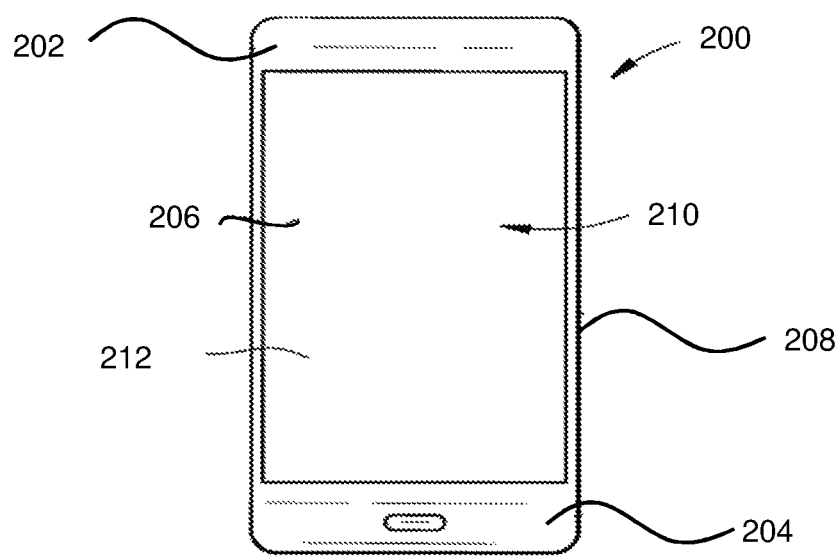
FIG. 2A is a plan view of an exemplary electronic device incorporating any of the glass-based articles disclosed herein.
Figure 2B:
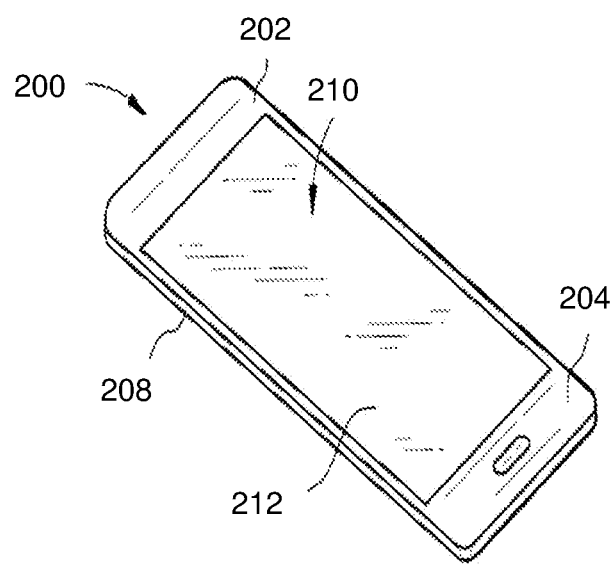
FIG. 2B is a perspective view of the exemplary electronic device of FIG. 2A.

The glass-based articles disclosed herein may be incorporated into another article for example an article with a display (or display articles) (e.g., consumer electronics, including mobile phones, tablets, computers, watches, navigation systems, and the like), architectural articles, transportation articles (e.g., automobiles, trains, aircraft, sea craft, etc.), appliance articles, or any article that may benefit from some transparency, scratch-resistance, abrasion resistance or a combination thereof. FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover plate 212 at or over the front surface of the housing such that it is over the display. In some embodiments, the at least a portion of cover plate 212 may include any of the glass-based articles disclosed herein. In some embodiments, at least a portion of the housing 202 may include any of the glass-based articles disclosed herein.

EXAMPLES

Various embodiments will be further clarified by the following examples. In the Examples, prior to strengthening, the Examples are referred to as "substrates". After being subjected to strengthening, the Examples are referred to as "articles" or "glass-based articles".

Examples are based on the following composition. Substrates using Composition B in these examples were 0.5 mm thick by 50 millimeters by 50 millimeters.

Composition B was a lithium-based glass-based substrate having the following base composition: 64.13 mol % $SiO_2$, 15.98 mol % $Al_2O_3$, 10.86 mol % $Na_2O$, 0.03 mol % $K_2O$, 6.42 mol % $Li_2O$, 0.08 mol % MgO, 1.17 mol % ZnO, 0.04 mol % $SnO_2$, 1.24 mol % $P_2O_5$, and 0.02 mol % CaO. The base composition had a molar ratio of $Na_2O$ to $Li_2O$ of 1.69, which is greater than 1.0, for example greater than or equal to 1.1, or greater than or equal to 1.2, or greater than or equal to 1.3.

Composition C was a lithium-based glass-based substrate having the following base composition: 63.7 mol % $SiO_2$, 16.18 mol % $Al_2O_3$, 0.39 mol % $B_2O_3$, 2.64 mol % $P_2O_5$, 8.04 mol % $Li_2O$, 8.1 mol % $Na_2O$, 0.33 mol % MgO, 0.53 mol % $K_2O$, and 0.05 mol % $SnO_2$. The base composition had a molar ratio of $Na_2O$ to $Li_2O$ of 1.

Composition D was a lithium-based glass-based substrate having the following base composition: 58.66 mol % $SiO_2$, 17.85 mol % $Al_2O_3$, 4.22 mol % $B_2O_3$, 1.47 mol % $P_2O_5$, 7.67 mol % $Li_2O$, 8.72 mol % $Na_2O$, 1.19 mol % MgO, 0.1 mol % $TiO_2$, 0.07 mol % $K_2O$, and 0.04 mol % $SnO_2$. The base composition had a molar ratio of $Na_2O$ to $Li_2O$ of 1.14.

Central tension (CT) was measured by scattering polarimetry using a SCALP-5 made by Glasstress Co., Estonia.

In the following "Reported FSM stress ($CS_{max}$)" and "Reported FSM DOL ($DOL_{FSM}$)" were measured by a FSM-6000 LE from Orihara, Japan. FSM measurement allows for the maximum CS ($CS_{max}$) occurring at the surface, and the CS decreases monotonically with depth, such that the maximum CS at the surface can be found from measurements of the mode spectra using prism coupling. The $CS_{max}$ was reported for a 590 nm wavelength. The reported FSM maximum CS is then given by $$CS_{max} = \frac{n_{surf}^{TM} - n_{surf}^{TE}}{SOC}.$$

The surface indices $n_{surf}^{TM}$ and $n_{surf}^{TE}$ in the transverse magnetic (TM) and transverse electric (TE) polarization states are found from the positions of the first two fringes in the TM and TE mode spectra measured by prism coupling. The FSM software uses:

$$n_{surf}^{TM}(FSM) = n_1^{TM} + 0.9 \times (n_1^{TM} - n_2^{TM}) \text{ and}$$

$$n_{surf}^{TE}(FSM) = n_1^{TE} + 0.9 \times (n_1^{TE} - n_2^{TE})$$

which represents a good approximation for a generic case when significant effects of stress relaxation and/or post-immersion diffusion may be present.

In the following, reference to surface stress ($CS_{surface}$) modifies the FSM software by using a different coefficient to allow for glasses for which ion exchange was performed at a temperature below 400° C. (negligible stress relaxation), and when post-ion-exchange cooling was fast (e.g., significant post-immersion diffusion was avoided), which can be accurately approximated as a linear distribution from the surface to the depth of the second mode (turning point of the second mode). In this case, the following modification is used in the $CS_{max}$ equation to calculate $CS_{surface}$, wherein "(lin)" stands for linear approximation:

$$n_{surf}^{TM}(\text{lin}) = n_1^{TM} + 1.317 \times (n_1^{TM} - n_2^{TM})$$

$$n_{surf}^{TE}(\text{lin}) = n_1^{TE} + 1.317 \times (n_1^{TE} - n_2^{TE}).$$

For the inventive examples herein, the value of $DOL_{sp}$ was obtained by the following formula:

$$DOL_{sp} = \frac{\lambda}{\sqrt{n \Delta n}} \frac{N - 0.25}{1.8856}$$

Wherein $\lambda$ is the measurement wavelength, N is the fringe count at the measurement polarization, n is approximately the average refractive index in the middle of the measured spectrum, and $\Delta n$ is the refractive index increment between the surface (maximum) index and the lowest index in the assumed index profile. Usually it is acceptable to assume that the average index n is equal to the base glass index.

Non-destructive measurement of $CS_{knee}$. For the inventive examples herein, the $CS_{knee}$ was measured non-destructively from partial stress profiles obtained by measuring optical mode spectra (TM and TE) using prism coupling and employing an inverse-WKB method (discussed with respect to FIGS. 30-31), after statistical smoothing to eliminate artifacts associated with the stepwise-linear aspect of the inverse-WKB routine. The lower limit of the value of $CS_{knee}$ was found as the value of CS at the depth of highest curvature of the smoothed profile in the vicinity of the knee. This is the value of CS on a gradual branch of the CS curve at the location where the profile slope starts increasing rapidly as depth decreases toward the surface. This location has depth that is generally equal to $DOL_{sp}$ or slightly higher (by up to 20% or 1-2 microns). The $CS_{knee}$ can be expected to be between that value of CS and a value of up to 20 MPa higher. For comparative Li-based glasses ion-exchanged in Na-containing baths and without the enhancement of the present disclosure, $CS_{knee}$ was measured either from an RNF stress profile, or non-destructively by using the birefringence of the critical-angle transition measured in prism coupling.

Calculation of $CS_{avg-1}$ and $CS_{avg-2}$. For the examples herein, relying on either an RNF profile (compressive stress versus depth) sampled every 0.25 micrometers or an IWKB (compressive stress versus depth) profile sampled every 0.2 micrometers, $CS_{avg-1}$ is taken as an average of all of the sampled compressive stress points from $DOL_{sp}$ plus 1 micron to $DOL_{FSM}$. For the examples herein, relying on either an RNF profile (compressive stress versus depth) sampled every 0.25 micrometers or an IWKB (compressive stress versus depth) profile sampled every 0.2 micrometers, $CS_{avg-2}$ is taken as an average of all of the sampled compressive stress points from $DOL_{sp}$ plus 1 micron to $DOL_K$.

Process of Preparation

The process for creating improved stress profiles comprising regions of enhanced stress included one or more of the steps as follows. Glass substrate samples had Composition B and dimensions of: thickness 0.5 mm by 50 millimeters by 50 millimeters. Mixed-salt baths consisted of: potassium nitrate ($KNO_3$), sodium nitrate ($NaNO_3$) and lithium nitrate ($LiNO_3$). The salt bath concentrations for all of the following salt mixtures are specified by weight percentages, unless explicitly said otherwise.

A first ion exchange (IOX) step, which was a K-enrichment step, was a two-sided ion exchange in a bath made up of: 30% $KNO_3$, 15% $LiNO_3$, and 55% $NaNO_3$. Samples were washed in deionized water (DI), wiped clean with acetone, and weighed with a high precision scale prior to starting the first IOX step. Different samples were ion exchanged for different time points including: 1.5, 8, 15, 30 and 67 hours, as noted, in the first step bath at 420° C. and then individually characterized. These samples were preheated for 10 to 15 minutes to be close to the ion exchange temperature prior to being placed in the salt bath. Cleaning after the first IOX step included completely washing the samples with deionized water to remove all residual salt and then wiped clean with a cloth soaked in acetone.

Characterization after the first IOX step included weight gain measurements using a high precision scale, and prism coupling stress measurements completed using the FSM 6000 to determine the compressive stress (CS), knee stress ($CS_{knee}$) and $DOL_{FSM}$.

A second ion exchange (IOX) step was a two-sided ion exchange in a bath made up of either 49% $NaNO_3$/51% $KNO_3$ or 36% $NaNO_3$/64% $KNO_3$ at 380° C. for different time points including: 1.25, 1.5, or 1.92 hours, as noted. These samples were preheated inside the oven for a short period of time to ensure no profile change during the second IOX step. Cleaning after second IOX step included completely washing the samples with deionized water to remove all residual salt and then wiped clean with a cloth soaked in acetone.

As will be shown in the following, the 49% $NaNO_3$/51% $KNO_3$ second IOX step bath showed better results in comparison to the 36% $NaNO_3$/64% $KNO_3$ bath, which resulted in further study of the 49% $NaNO_3$/51% $KNO_3$ second IOX step bath. Additional samples underwent the 49% $NaNO_3$/51% $KNO_3$ second IOX step bath at two different time points: 1.25 hours and 1.92 hours at the same temperature of 380° C. The additional 1.25 hour second IOX step bath had multiple time points that had undergone a first IOX step having a bath of: 30% KNO$_3$, 15% LiNO$_3$, and 55% NaNO$_3$ which were 8 hours, 15 hours and 67 hours. The additional 1.92 hours second IOX step bath had multiple time points that had undergone a first IOX step having a bath of 30% KNO$_3$, 15% LiNO$_3$, and 55% NaNO$_3$ which were 8 hours, 15 hours, 30 hours and 67 hours. All time points that underwent first and second IOX steps also went through a final thirds IOX step having a bath of: 9% NaNO$_3$/91% KNO$_3$ at 370° C. for 15 minutes that was exactly the same for all conditions and described in the next few paragraphs.

Characterization after the second IOX step included weight gain measurements using a high precision scale, SCALP to measure central tension (CT), and prism coupling stress measurements using the FSM 6000 to determine the compressive stress (CS), knee stress (CS$_{knee}$), and DOL$_{FSM}$. Depth of compression (DOC) was calculated for the samples that underwent the 1.25 hour and 1.92 hour second IOX step having a bath of: 49% NaNO$_3$/51% KNO$_3$ by the SCALP technique using an SLP-1000 instrument.

A third ion exchange (IOX) step was a two-sided ion exchange in a bath made up of either: 9% NaNO$_3$/91% KNO$_3$ at 370° C. for 15 minutes or 100% KNO$_3$ at 380° C. for 12 minutes, as noted. The samples that went through both the 49% NaNO$_3$/51% KNO$_3$ and 36% NaNO$_3$/64% KNO$_3$ bath as a second IOX step also went through the final third IOX step. The samples were preheated inside the oven for a short period of time to ensure no profile change during the final step. Cleaning after third step ion exchange included completely washing the samples with deionized water to remove all residual salt and then wiped clean with a cloth soaked in acetone.

Characterization after the third IOX step included weight gain measurements using a high precision scale, SCALP to measure central tension (CT), refracted near field (RNF) to measure birefringence and stress profiles, and prism coupling stress measurements completed using the FSM 6000 to determine the compressive stress (CS), knee stress (CS$_{knee}$), and DOL$_{FSM}$. Depth of compression (DOC) was calculated for the samples that underwent the 36% NaNO$_3$/64% KNO$_3$ second step bath, the two time points of 1.25 hour and 1.92 hour in the 49% NaNO$_3$/51% KNO$_3$ bath for a 2nd step and then all of those same samples that went through the final step of 9% NaNO$_3$/91% KNO$_3$ by using the SLP-1000 instrument. These measurements were used to determine the overall stress profile and mechanical properties for each of the samples.

Na, K, and Li are mentioned in the data tables in ratios, where the salts being used were nitrate salts and the amounts were in weight ratios.

Example 1

Summary of substrate: 0.5 mm thickness and composition B. Summary of conditions: first step IOX (30% KNO$_3$/55% NaNO$_3$/15% LiNO$_3$) at 420° C. for varying times. Analyses after first step IOX: weight gain (grams and percentage), reported FSM stress (CS$_{max}$) (MPa) and reported FSM DOL (DOL$_{FSM}$) (µm) are provided in Table 1. Absolute weight gain was obtained as a difference of the 6-measurement averages of the weights before and after ion exchange, wherein the single-measurement precision was limited by the scale at 0.0001 g. The precision of the absolute weight gain is thus estimated at 0.00006 g or 0.06 mg. The specific weight gain per unit exposed are is given after dividing the absolute weight gain in mg by the total exposed area during ion exchange (both sides of the specimen) in cm$^2$. For most specimens in the present disclosure where the specific weight gain per unit area is given, the specimen was a square with a side of 5 cm, so the total exposed area on two sides was 50 cm$^2$, ignoring the negligible area of the edge since thickness was typically 0.5 mm The estimated precision of the specific weight gain per unit exposed area is 0.0012 mg/cm$^2$. The precision of fractional weight gains is then about 0.002% for 0.5 mm samples, 0.0025% for 0.4 mm samples, and 0.0014% for 0.7 mm samples. The fractional weight gain values are rounded to 0.001% in the tables below.

TABLE 1

| First Step IOX only Sample ID | Time (hr.) | Weight Gain (g) | Weight Gain (mg/cm$^2$) | Weight Gain (%) | Reported FSM Stress (CS$_{max}$) (MPa) | Reported FSM DOL (DOL$_{FSM}$) (µm) |
|---|---|---|---|---|---|---|
| S2A | 1.5 | 0.0005 | 0.010 | 0.016 | 153 | 10.0 |
| S2B | 1.5 | — | — | — | 153 | 10.0 |
| S2C | 1.5 | — | — | — | 157 | 10.0 |
| S2D | 1.5 | — | — | — | 153 | 10.0 |
| S2E | 1.5 | — | — | — | 157 | 9.9 |
| P13 | 8 | 0.0008 | 0.016 | 0.027 | 133 | 24.6 |
| P14 | 8 | 0.0009 | 0.019 | 0.031 | 137 | 25.3 |
| P15 | 8 | 0.0008 | 0.016 | 0.026 | 154 | 25.3 |
| P16 | 8 | 0.0008 | 0.015 | 0.025 | 137 | 25.8 |
| P17 | 8 | 0.0009 | 0.018 | 0.030 | 137 | 25.3 |
| P4 | 15 | 0.0012 | 0.023 | 0.038 | 146 | 32.8 |
| P5 | 15 | 0.0010 | 0.021 | 0.035 | 155 | 32.7 |
| P6 | 15 | 0.0013 | 0.026 | 0.042 | 155 | 32.8 |
| P7 | 15 | 0.0013 | 0.026 | 0.042 | 164 | 32.6 |
| P1 | 30 | 0.0017 | 0.033 | 0.055 | 155 | 43.6 |
| P2 | 30 | 0.0018 | 0.036 | 0.060 | 151 | 43.7 |
| P3 | 30 | 0.0018 | 0.036 | 0.059 | 142 | 43.9 |
| P8 | 67 | 0.0026 | 0.052 | 0.086 | 143 | 61.6 |
| P9 | 67 | 0.0027 | 0.054 | 0.089 | 155 | 57.9 |
| P10 | 67 | 0.0019 | 0.038 | 0.062 | 155 | 61.4 |
| P11 | 67 | 0.0027 | 0.053 | 0.088 | 164 | 61.5 |
| P12 | 67 | 0.0025 | 0.051 | 0.084 | 155 | 61.5 |

The data of Table 1 shows that the weight gains are limited to small values not exceeding significantly the weight-gain contribution of the K-enrichment of the glass, such that any component of weight gain due to Na exchanging for Li is negligible or negative. The K-enrichment was achieved without compromising the ability of the glass specimen to acquire a stress distribution with high CT during subsequent ion-exchange steps as a result of undesirable Na-enrichment and Li-depletion. Therefore, the prescribed bath at 420° C. was optimized for proper K-enrichment of this glass to the desired depth. The surface CS was substantially unchanged with increasing time of K-enrichment, indicating relatively low stress relaxation at the prescribed temperature. K-enrichment to depths exceeding 60 microns was demonstrated, as suggested by the FSM-DOL values.

Example 2

Various samples of Example 1 were further treated with a second step IOX. In summary, Example 2 samples were processed as follows: first step IOX (30% KNO$_3$/55% NaNO$_3$/15% LiNO$_3$) at 420° C. for varying times; and second step IOX (36% NaNO$_3$/64% KNO$_3$) at 380° C. for 1.5 hours. Analyses after second step IOX: reported FSM stress (CS$_{max}$) (MPa), reported FSM DOL (DOL$_{FSM}$) (µm), surface stress (CS$_{surface}$) (MPa), and SCALP CT (MPa) are provided in Table 2.

TABLE 2

| First & second step (36Na:64K/1.5 hrs) IOX Sample ID | $1^{st}$ STEP Time (hr.) | Cumulative Weight Gain (g) | Weight Gain (mg/cm$^2$) | Cumulative Weight Gain (%) | Reported FSM Stress ($CS_{max}$) (MPa) | Reported FSM DOL ($DOL_{FSM}$) (µm) | Surface Stress ($CS_{surface}$) (MPa) | $CS_{knee}$ (MPa) | SCALP CT (MPa) |
|---|---|---|---|---|---|---|---|---|---|
| REF A | 0 | 0.1625 | 3.250 | 0.540 | 533 | 11.5 | 582 | 122 | 64.6 |
| P14 | 8 | 0.0138 | 0.276 | 0.457 | 535 | 21.4 | 534 | 245 ± 15 | 63.1 |
| P5 | 15 | 0.1325 | 2.650 | 0.438 | 546 | 26.3 | 524 | 237.5 ± 12.5 | 61.5 |
| P2 | 30 | 0.1300 | 2.600 | 0.430 | 550 | 34.6 | 539 | 247.5 ± 12.5 | 62.2 |
| P9 | 67 | 0.1282 | 2.564 | 0.424 | 560 | 47.7 | 560 | 255 ± 15 | 64.8 |

Table 2 demonstrates that the inventive process of chemical strengthening comprising a K-enrichment step in a properly designed bath allowed significant increase in $CS_{knee}$ (compare specimens P14, P5, P2, and P9 with reference specimen A), while having similar surface CS and without significant loss of area in the stress profile as signified by the CT values being comparable to that of the reference specimen. Another valuable benefit was that the cumulative growth of the part due to ion exchange was reduced significantly compared to the reference which is valuable to reduce problems with warp and dimensional specifications occurring with ion exchange. The rate of Li-poisoning of the Na-enriching bath was also reduced in proportion of the weight gain. In the present examples the poisoning of the bath having weight ratio of NaNO$_3$ to KNO$_3$ at 36:64 was reduced by about 20% as a result of incorporating the inventive K-enrichment step.

Example 3

Various samples of Example 1 were further treated with a second step IOX. In summary, Example 3 samples were processed as follows: first step IOX (30% KNO$_3$/55% NaNO$_3$/15% LiNO$_3$) at 420° C. for varying times; and second step IOX (49% NaNO$_3$/51% KNO$_3$) at 380° C. for varying times. Analyses after second step IOX: reported FSM stress ($CS_{max}$) (MPa), reported FSM DOL ($DOL_{FSM}$) (µm), surface stress ($CS_{surface}$) (MPa), and SCALP CT (MPa) are provided in Table 3.1 (1.25 hours second step), Table 3.2 (1.5 hours second step), and Tables 3.3-3.4 (1.92 hours second step).

TABLE 3.1

| First & second step (49Na:51K/1.25 hrs) IOX Sample ID | $1^{st}$ STEP Time (hr.) | Cumulative Weight Gain (g) | Weight Gain (mg/cm$^2$) | Cumulative Weight Gain (%) | Reported FSM Stress ($CS_{max}$) (MPa) | Reported FSM DOL ($DOL_{FSM}$) (µm) | Surface Stress ($CS_{surface}$) (MPa) | $CS_{knee}$ (MPa) | SCALP CT (MPa) |
|---|---|---|---|---|---|---|---|---|---|
| REF B | 0 | 0.1520 | 3.040 | 0.506 | 482 | 7 | 548 | 150 ± 10 | 65.2 |
| P15 | 8 | 0.1270 | 2.540 | 0.421 | 493 | 23.3 | 498 | 230 ± 10 | 63.2 |
| P6 | 15 | 0.2134 | 4.268 | 0.409 | 493 | 28 | 499 | 245 ± 20 | 58.9 |
| P10 | 67 | 0.1128 | 2.256 | 0.373 | 509 | 54.8 | 514 | 220-260245 ± 20 | 64.1 |

Similarly to Table 2, Table 3.1 demonstrates how the inventive process has allowed a significant boost of $CS_{knee}$ without significant loss in CS and CT, but for an example bath having higher NaNO$_3$/KNO$_3$ weight ratio of 49/51, and shorter immersion time of 1.25 hours instead of 1.5 hours. The inventive preferred partially-equilibrated bath composition allows the benefit of higher CS knee to be obtained over a range of Na-enriching baths and diffusion times. The rate of poisoning of the Na-enriching bath was again reduced by about 20% in the present examples.

TABLE 3.2

| First & second step (49Na:51K/1.5 hrs) IOX Sample ID | $1^{st}$ STEP Time (hr.) | Cumulative Weight Gain (g) | Weight Gain (mg/cm$^2$) | Cumulative Weight Gain (%) | Reported FSM Stress ($CS_{max}$) (MPa) | Reported FSM DOL ($DOL_{FSM}$) (µm) | Surface Stress ($CS_{surface}$) (MPa) | $CS_{knee}$ (MPa) | SCALP CT (MPa) |
|---|---|---|---|---|---|---|---|---|---|
| REF C | 0 | 0.1713 | 3.426 | 0.568 | 488 | 8.1 | 537 | 141 | 70.9 |
| S2A | 1.5 | 0.1523 | 3.046 | 0.503 | 481 | 12.2 | 526 | 113 | 65.7 |
| P13 | 8 | 0.1405 | 2.810 | 0.456 | 495 | 22.8 | 493 | 235 ± 10 | 63.8 |
| P4 | 15 | 0.1380 | 2.760 | 0.456 | 476 | 29.1 | 477 | 245 ± 20 | 64.5 |
| P1 | 30 | 0.0134 | 0.267 | 0.442 | 493 | 40.4 | 495 | 245 ± 15 | 65.4 |
| P8 | 67 | 0.1317 | 2.634 | 0.453 | 509 | 56.9 | 547 | — | 65.6 |

Similarly to Table 3.1, Table 3.2 demonstrates how the inventive process has allowed a significant boost of $CS_{knee}$ without significant loss in CS and CT, this time for Na enrichment time of 1.5 hours. The benefit of reduced rate of poisoning of the Na-enrichment bath is again evident.

Table 4-A demonstrates that the inventive K-enrichment step provides for even larger increase in $CS_{knee}$ when a high-CS profile was obtained by a final ion-exchange step in a bath that was predominantly $KNO_3$ enriching (for the example glass composition, a bath with 9% $NaNO_3$ and 91%

TABLE 3.3

| First & second step (49Na:51K/1.92 hrs) IOX Sample ID | 1st STEP Time (hr.) | Cumulative Weight Gain (g) | Weight Gain (mg/cm²) | Cumulative Weight Gain (%) | Reported FSM Stress ($CS_{max}$) (MPa) | Reported FSM DOL ($DOL_{FSM}$) (μm) | Surface Stress ($CS_{surface}$) (MPa) | $CS_{knee}$ (MPa) | SCALP CT (MPa) |
|---|---|---|---|---|---|---|---|---|---|
| REF D | 0 | 0.0187 | 0.373 | 0.515 | 474 | 8.1 | 516 | 136 | 67.7 |
| P16 | 8 | 0.0159 | 0.319 | 0.527 | 481 | 22.8 | 482 | 220 ± 10 | 65.3 |
| P7 | 15 | 0.0154 | 0.308 | 0.508 | 482 | 27.2 | 482 | 235 ± 15 | 66.8 |
| P3 | 30 | 0.0152 | 0.303 | 0.501 | 482 | 38.8 | 481 | 240 ± 20 | 66.4 |
| P11 | 67 | 0.0145 | 0.290 | 0.480 | 500 | 50.7 | 501 | 240 ± 10 | 68 |

Table 3.3 demonstrates that the inventive process provides for the significant increase in $CS_{knee}$, and by extending the time in the Na-enrichment step a high CT can be achieved, very similar to the maximum CT of the reference process observed as REF C of Table 3.2. Even with the longer ion exchange time, there is still a benefit in terms of reduced bath poisoning rate (e.g., weight gain of about 0.50% compared to 0.57% for REF C).

$KNO_3$ provided a good demonstration, allowing surface CS about 800 MPa). Again, the increased stress in the vicinity of the knee point was obtained without a significant reduction in CT even when the depth of K enrichment is significant, exceeding 60 microns in one of the examples. The benefit of reduced growth and hence reduced ion-exchange warp is also evident, based on the reduction in total weight gain relative to the reference process, said reduction being about 20%.

TABLE 3.4

| First & second step (49Na:51K/1.92 hrs) IOX Sample ID | Time (hr.) | Reported FSM Stress ($CS_{max}$) (MPa) | Reported FSM DOL ($DOL_{FSM}$) (μm) | Surface Stress ($CS_{surface}$) (MPa) | $CS_{knee}$ (MPa) | SCALP CT (MPa) |
|---|---|---|---|---|---|---|
| REF E | 0 | 496 | 10 | 519 | 136 | 69.8 |
| P17 | 8 | 485 | 22.9 | 521 | 220 ± 10 | 65.6 |
| P12 | 67 | 507 | 53.3 | 544 | 240 ± 10 | 70.3 |

Example 4

Samples of Example 2 were further treated with a third step IOX. In summary, Example 4 samples were processed as follows: first step IOX (30% $KNO_3$/55% $NaNO_3$/15% $LiNO_3$) at 420° C. for varying times; second step IOX (36% $NaNO_3$/64% $KNO_3$) at 380° C. for 1.5 hours; and third step IOX (9% $NaNO_3$/91% $KNO_3$ at 370° C. for 15 minutes). Analyses after third step IOX: reported FSM stress ($CS_{max}$) (MPa), reported FSM DOL ($DOL_{FSM}$) (μm), surface stress ($CS_{surface}$) (MPa), $CS_{knee}$ (MPa), and SCALP CT (MPa) are provided in Table 4-A.

Example 5

Samples of Example 3 were further treated with a third step IOX. In summary, Example 5 samples were processed as follows: first step IOX (30% $KNO_3$/55% $NaNO_3$/15% $LiNO_3$) at 420° C. for varying times; second step IOX (49% $NaNO_3$/51% $KNO_3$) at 380° C. for times as noted; and third step IOX (9% $NaNO_3$/91% $KNO_3$ at 370° C. for 15 minutes)

TABLE 4-A

| First & second step (36Na:64K/1.5 hrs) & third step (9Na:91K/15 min.) IOX Sample ID | 1st STEP Time (hr.) | Cumulative Weight Gain (g) | Weight Gain (mg/cm²) | Cumulative Weight Gain (%) | Reported FSM Stress ($CS_{max}$) (MPa) | Reported FSM DOL ($DOL_{FSM}$) (μm) | Surface Stress ($CS_{surface}$) (MPa) | $CS_{knee}$ (MPa) | SCALP CT (MPa) |
|---|---|---|---|---|---|---|---|---|---|
| REF A | 0 | 0.0175 | 0.350 | 0.582 | 736 | 7.9 | 795 | 110 ± 10 | 68.3 |
| P14 | 8 | 0.0150 | 0.300 | 0.496 | 688 | 20.3 | 676 | 230 ± 10 | 63.8 |
| P5 | 15 | 0.0144 | 0.288 | 0.476 | 656 | 25.6 | 641 | 230 ± 10 | 65.1 |
| P2 | 30 | 0.0142 | 0.284 | 0.469 | 634 | 33.8 | 620 | 230 ± 10 | 66 |
| P9 | 67 | 0.0140 | 0.279 | 0.462 | 691 | 41.7 | 686 | 230 ± 10 | 66 | or (100% KNO$_3$ at 370° C. for 12 minutes), as noted. Analyses after third step IOX: reported FSM stress (CS$_{max}$) (MPa), reported FSM DOL (DOL$_{FSM}$) (μm), surface stress (CS$_{surface}$) (MPa), CS$_{knee}$ (MPa), and SCALP CT (MPa) are provided in Table 5.1 (1.25 hours second step and 9Na/91K-15 min. third step), Table 5.2 (1.5 hours second step and 9Na/91K-15 min. third step), Table 5.3 (1.92 hours second step and 9Na/91K-15 min. third step), and Table 5.4 (1.92 hours second step and 100K-12 min third step).

TABLE 5.1

| First & second step (49Na:51K/1.25 hrs) & third step (9Na:91K/15 min.) IOX Sample ID | 1$^{st}$ STEP Time (hr.) | Cumulative Weight Gain (g) | Weight Gain (mg/cm$^2$) | Cumulative Weight Gain (%) | Reported FSM Stress (CS$_{max}$) (MPa) | Reported FSM DOL (DOL$_{FSM}$) (μm) | Surface Stress (CS$_{surface}$) (MPa) | CS$_{knee}$ (MPa) | SCALP CT (MPa) |
|---|---|---|---|---|---|---|---|---|---|
| REF B | 0 | 0.0165 | 0.330 | 0.549 | 754 | 6.3 | 825 | 125 ± 10 | 68.3 |
| P15 | 8 | 0.0139 | 0.277 | 0.459 | 739 | 18.9 | 722 | 240 ± 10 | 63.7 |
| P6 | 15 | 0.0135 | 0.270 | 0.446 | 719 | 25 | 711 | 240 ± 10 | 62.1 |
| P10 | 67 | 0.0124 | 0.248 | 0.410 | 731 | 42.7 | 710 | 240 ± 10 | 66.8 |

TABLE 5.2

| First & second step (49Na:51K/1.5 hrs) & third step (9Na:91K/15 min.) IOX Sample ID | 1$^{st}$ STEP Time (hr.) | Cumulative Weight Gain (g) | Weight Gain (mg/cm$^2$) | Cumulative Weight Gain (%) | Reported FSM Stress (CS$_{max}$) (MPa) | Reported FSM DOL (DOL$_{FSM}$) (μm) | Surface Stress (CS$_{surface}$) (MPa) | CS$_{knee}$ (MPa) | SCALP CT (MPa) |
|---|---|---|---|---|---|---|---|---|---|
| REF C | 0 | 0.0178 | 0.357 | 0.591 | 741 | 6.6 | 823 | 110 ± 10 | 66.8 |
| S2A | 1.5 | 0.0162 | 0.325 | 0.536 | 725 | 11.4 | 804 | 210 ± 10 | 65 |
| P13 | 8 | 0.0151 | 0.301 | 0.498 | 734 | 19.7 | 724 | 240 ± 10 | 65.9 |
| P4 | 15 | 0.0147 | 0.294 | 0.485 | 669 | 26.4 | 660 | 240 ± 10 | 65 |
| P1 | 30 | 0.0142 | 0.284 | 0.470 | 678 | 34.1 | 672 | 240 ± 10 | 66.6 |
| P8 | 67 | 0.0141 | 0.281 | 0.454 | 729 | 47.5 | 721 | 240 ± 10 | 67.6 |

TABLE 5.3

| First & second step (49Na:51K/1.92 hrs) & third step (9Na:91K/15 min.) IOX Sample ID | 1$^{st}$ STEP Time (hr.) | Cumulative Weight Gain (g) | Weight Gain (mg/cm$^2$) | Cumulative Weight Gain (%) | Reported FSM Stress (CS$_{max}$) (MPa) | Reported FSM DOL (DOL$_{FSM}$) (μm) | Surface Stress (CS$_{surface}$) (MPa) | CS$_{knee}$ (MPa) | SCALP CT (MPa) |
|---|---|---|---|---|---|---|---|---|---|
| REF D | 0 | 0.0198 | 0.395 | 0.651 | 735 | 8.6 | 825 | 110 ± 5 | 69.7 |
| P16 | 8 | 0.0170 | 0.339 | 0.562 | 734 | 19.6 | 711 | 240 ± 15 | 65.6 |
| P7 | 15 | 0.0165 | 0.329 | 0.544 | 719 | 24.9 | 712 | 240 ± 15 | 66.7 |
| P3 | 30 | 0.0160 | 0.320 | 0.528 | 679 | 32.5 | 654 | 240 ± 15 | 68.4 |
| P11 | 67 | 0.0151 | 0.302 | 0.500 | 725 | 41.9 | 720 | 240 ± 15 | 70.8 |

Similar to Table 4-A, Tables 5.1, 5.2, and 5.3 show that the inventive process can deliver higher CS$_{knee}$ than the reference process when CS is raised by a high-KNO$_3$ final step, this time in a process having higher Na percentage in the Na-enrichment step. At shorter times of Na-enrichment (such as 1.25 hours in Table 5.1), there may be a somewhat significant CT reduction relative to the reference process not comprising the K-enrichment step. It is again seen that the increase in time of the Na-enrichment step allows the inventive process to deliver the CS$_{knee}$ boost without substantial loss in CT, as demonstrated by the examples of Table 5.2 and especially of Table 5.3).

TABLE 5.4

| First & second step (49Na:51K/1.92 hrs) & third step (100K/12 min.) IOX Sample ID | Time (hr.) | Reported FSM Stress ($CS_{max}$) (MPa) | Reported FSM DOL ($DOL_{FSM}$) (μm) | Surface Stress ($CS_{surface}$) (MPa) | $CS_{knee}$ (MPa) | SCALP CT (MPa) |
|---|---|---|---|---|---|---|
| REF E | 0 | 982 | 7.4 | 1146 | 103 | 71.9 |
| P17 | 8 | 1128 | 16.7 | 1206 | 260 ± 20 | 70.8 |
| P12 | 67 | 1203 | 51.0 | 1219 | 260 ± 20 | 74 |

Table 5.4 shows that the boost in $CS_{knee}$ delivered by the inventive process was present even when the surface CS is maximally raised by immersion in a bath providing only the large alkali ions (K-ions), in this case a $KNO_3$-only bath having no $NaNO_3$. The high CS and $CS_k$ were obtained without any substantial loss in CT compared to the reference case not comprising the K-enrichment first step.

Example 6—Analysis

Figure 3:
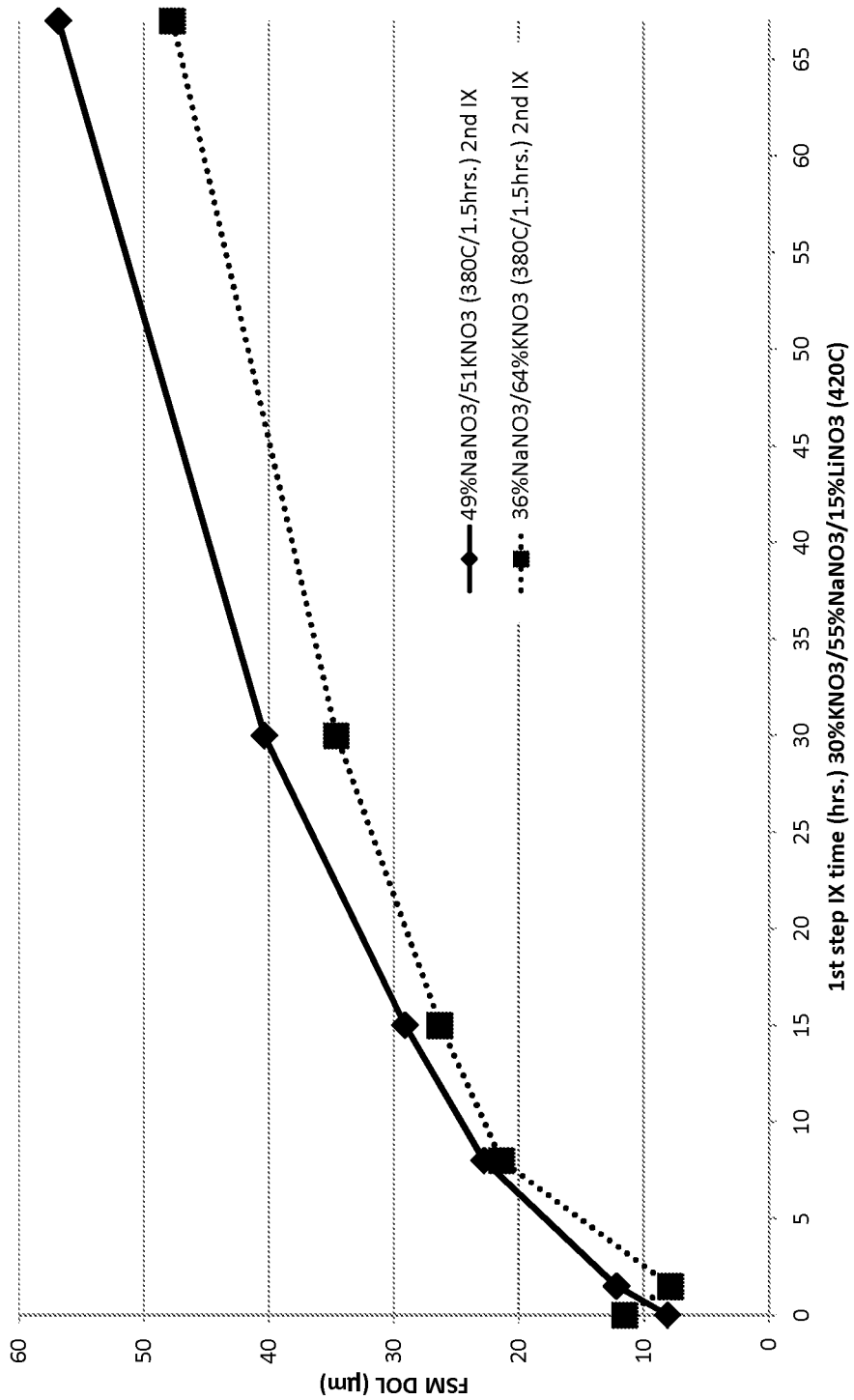
FIG. 3 is a graph of FSM depth of layer ($DOL_{FSM}$) versus first IOX step time (hrs.) and for two different second IOX step bath compositions according to some embodiments disclosed herein.

Comparison of two IOX steps and differing second IOX bath compositions. FIG. 3 is a graph of FSM depth of layer ($DOL_{FSM}$) versus first IOX step time (hrs.) and for two different second IOX step bath compositions. In FIG. 3, the $DOL_{FSM}$ of Tables 2 and 3.2 are graphed. The data in the graph shows that the longer the sample remained in the first step bath, the higher the $DOL_{FSM}$. The graph also indicates a higher $DOL_{FSM}$ in the 49% $NaNO_3$/51% $KNO_3$ bath in comparison to the 36% $NaNO_3$/64% $KNO_3$ bath.

Figure 4:
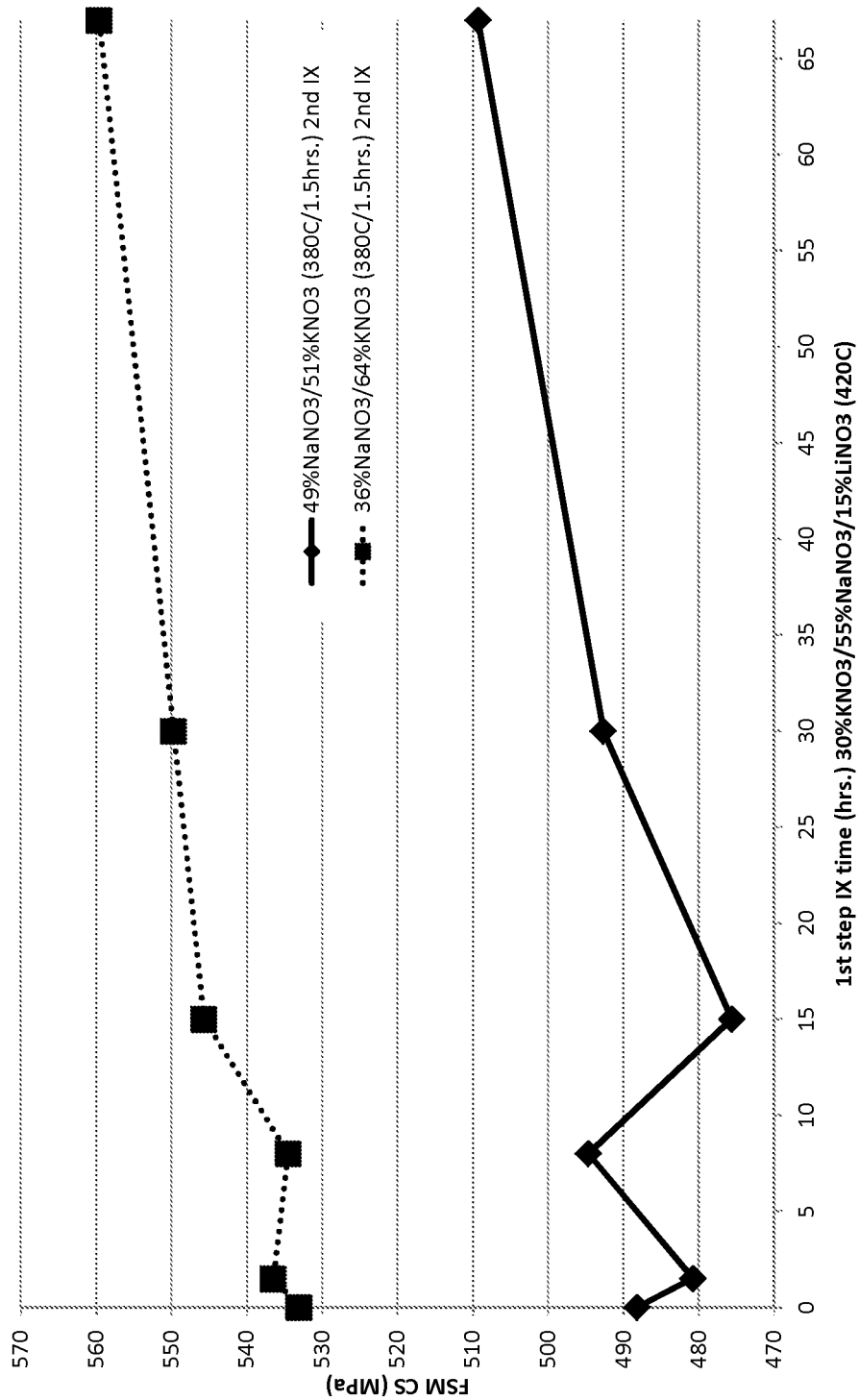
FIG. 4 is a graph of reported FSM Stress ($CS_{max}$) versus first IOX step time (hrs.) and for two different second IOX step bath compositions according to some embodiments disclosed herein.

In FIG. 4, the reported FSM Stress ($CS_{max}$) of Tables 2 and 3.2 are graphed. The data in the graph shows that the compressive stress at the surface as measured by FSM remained comparable for all first step time points after going through either 2nd step bath condition. The graph also indicates a higher compressive stress at the surface for the 36% $NaNO_3$/64% $KNO_3$ bath in comparison to the 49% $NaNO_3$/51% $KNO_3$.

Figure 5:
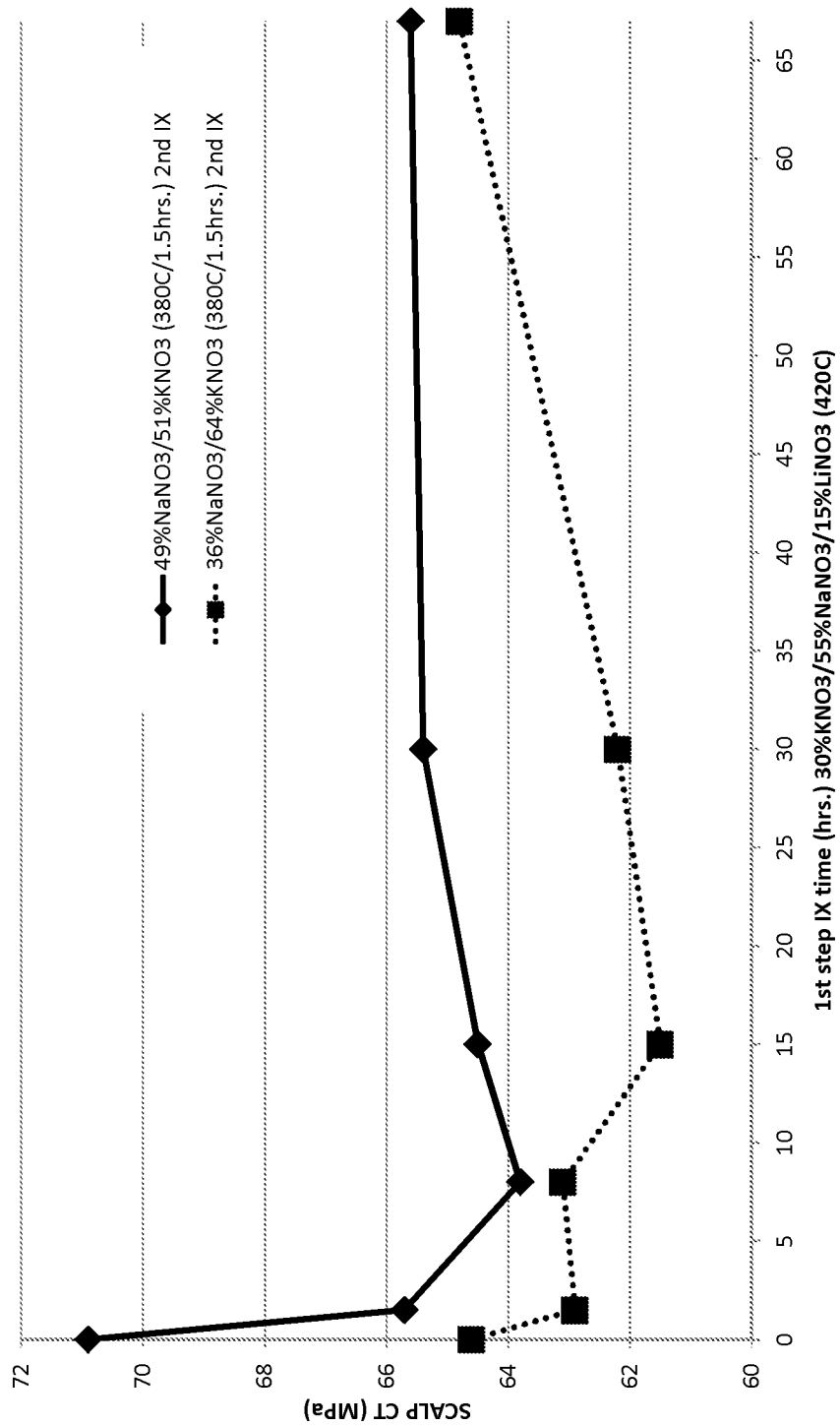
FIG. 5 is a graph of SCALP central tension (CT) versus first IOX step time (hrs.) and for two different second IOX step bath compositions according to some embodiments disclosed herein.

In FIG. 5, the SCALP central tension (CT) of Tables 2 and 3.2 are graphed. The data in the graph shows that the central tension is higher for all samples in the 49% $NaNO_3$/51% $KNO_3$ in comparison to the 36% $NaNO_3$/64% $KNO_3$ bath. There is an initial loss of CT of 5.2 MPa comparing the reference to the 1.5 hour 1st step sample that underwent the 49% $NaNO_3$/51% $KNO_3$ bath.

Figure 6:
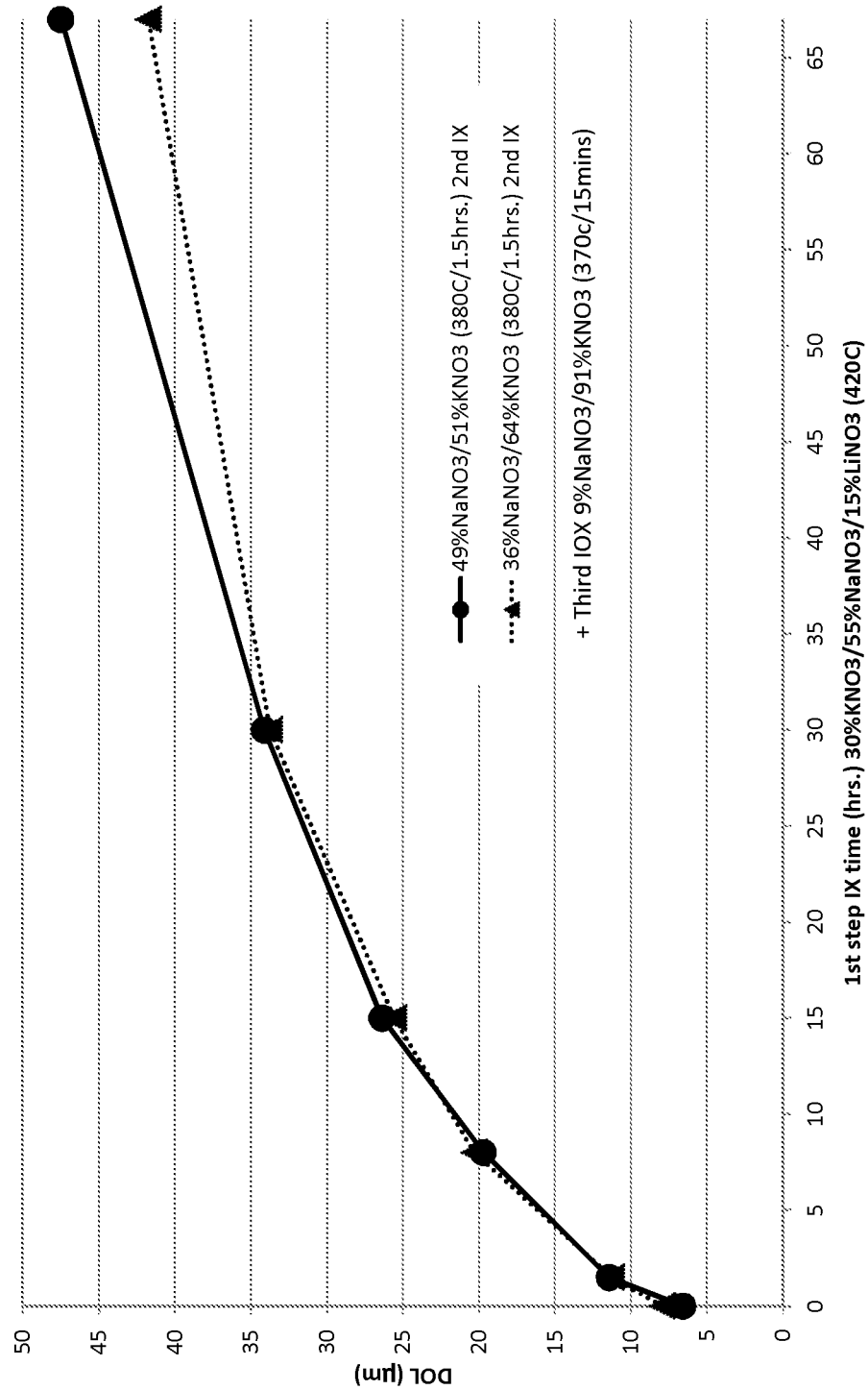
FIG. 6 is a graph of FSM depth of layer ($DOL_{FSM}$) versus first IOX step time (hrs.) and for two different second IOX step bath compositions and the same third IOX step according to some embodiments disclosed herein.

Comparison of three IOX steps and differing second IOX bath compositions. FIG. 6 is a graph of FSM depth of layer ($DOL_{FSM}$) versus first IOX step time (hrs.) and for two different second IOX step bath compositions and including a same third IOX step. In FIG. 6, the $DOL_{FSM}$ of Tables 4 and 5.2 are graphed. The data in the graph shows that the longer the sample remained in the first step bath the higher the reported $DOL_{FSM}$ for both second and third step ion exchange. The graph also shows that the 49% $NaNO_3$/51$KNO_3$ bath reports a higher $DOL_{FSM}$ after the 9% $NaNO_3$/91% $KNO_3$ in comparison to the second step bath for the final first step time point of 67 hours.

Figure 7:
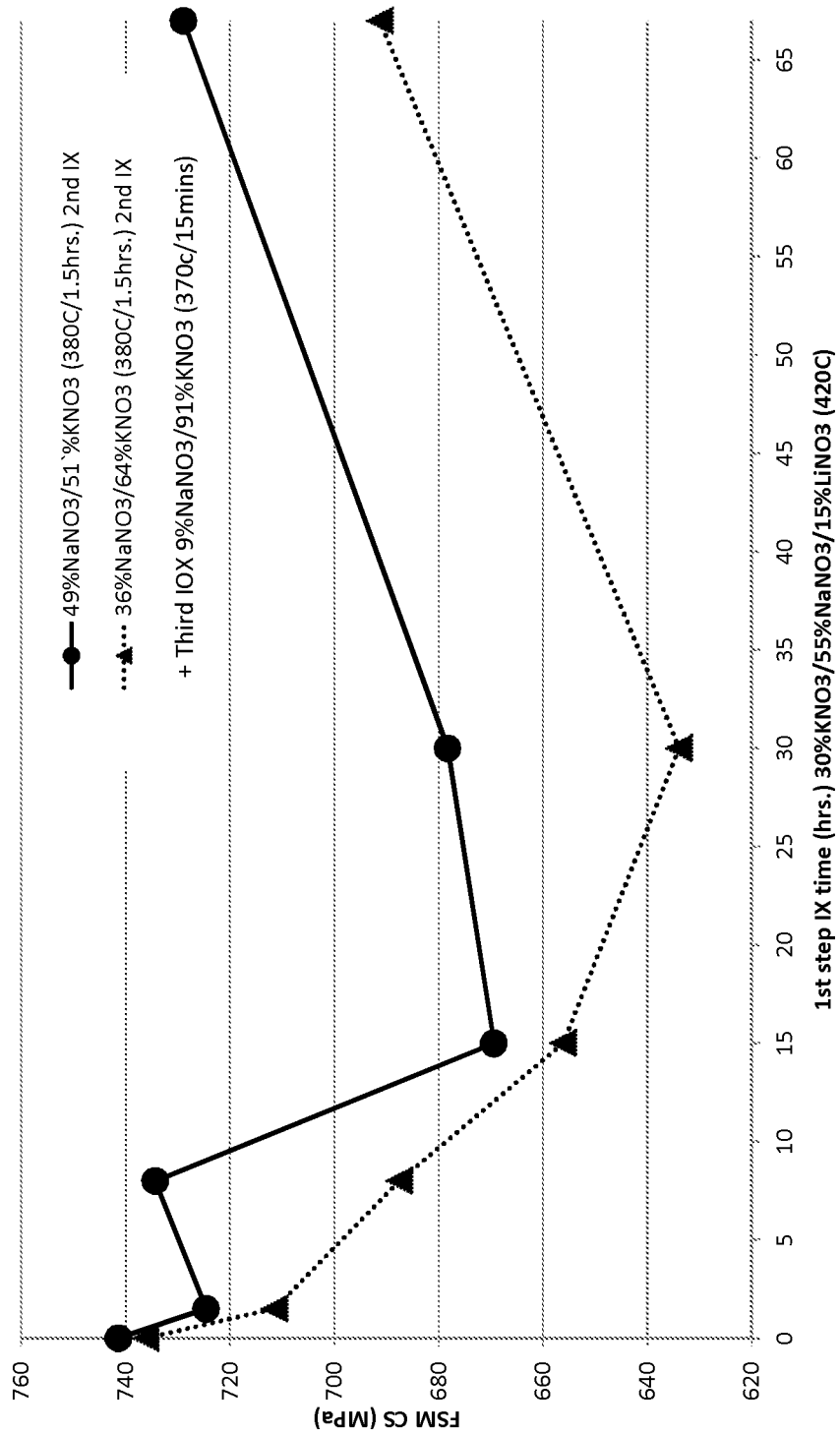
FIG. 7 is a graph of reported FSM Stress ($CS_{max}$) versus first IOX step time (hrs.) and for two different second IOX step bath compositions and the same third IOX step according to some embodiments disclosed herein.

In FIG. 7, the reported FSM Stress ($CS_{max}$) of Tables 4 and 5.2 are graphed. The data in the graph shows that the compressive stress at the surface as measured by FSM shows an initial drop and then increases for the 67 hour first step time point. The graph also indicates a higher compressive stress at the surface for the 49% $NaNO_3$/51% $KNO_3$ bath after the final step.

Figure 8:
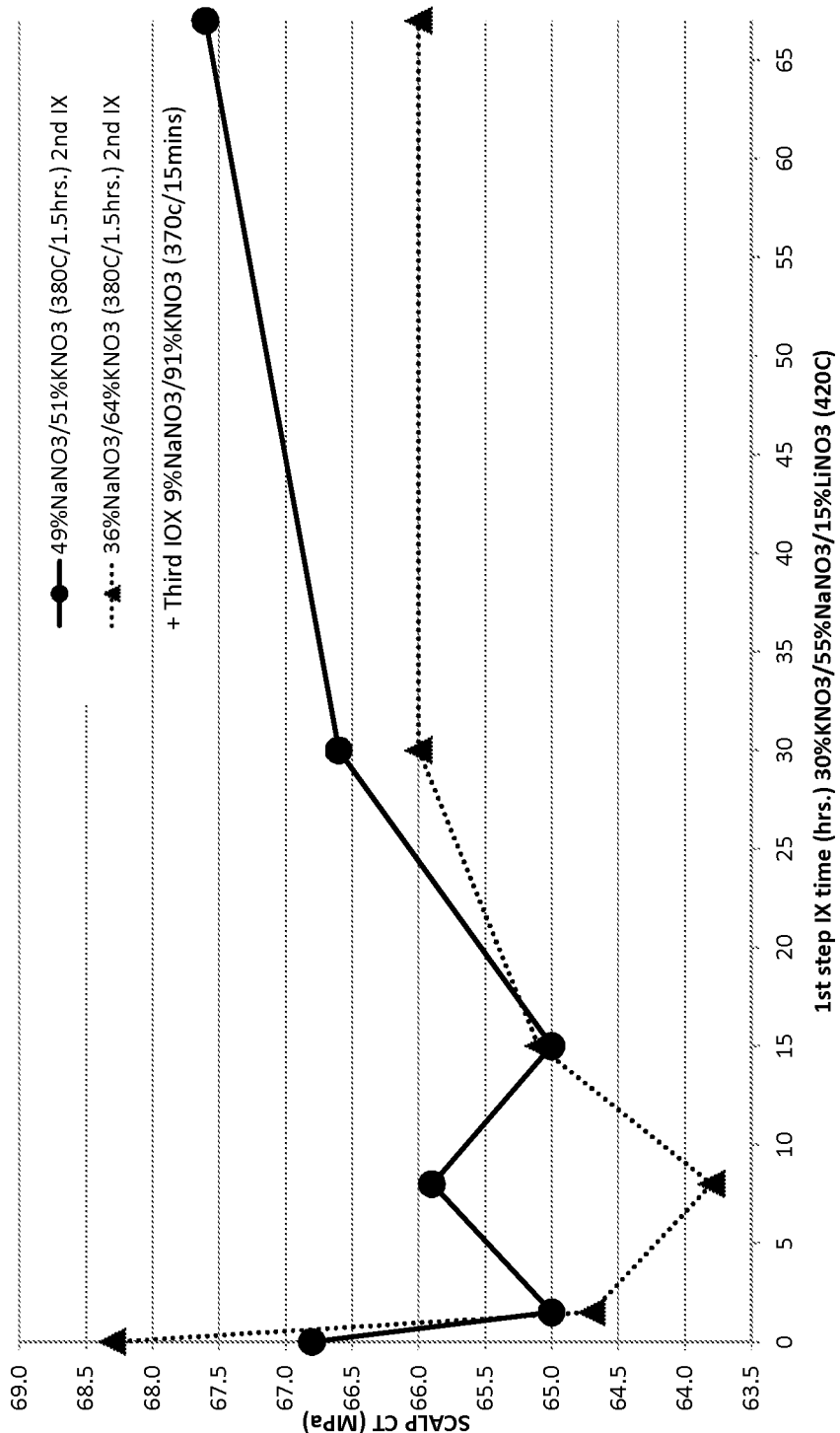
FIG. 8 is a graph of SCALP central tension (CT) versus first IOX step time (hrs.) and for two different second IOX step bath compositions and the same third IOX step according to some embodiments disclosed herein.

In FIG. 8, the SCALP central tension (CT) of Tables 4 and 5.2 are graphed. The data in the graph shows that the central tension has an initial drop in CT for the 49% $NaNO_3$/51% $KNO_3$ reference sample and it slowly gains CT back after the 67 hour first step time point.

Figure 9:
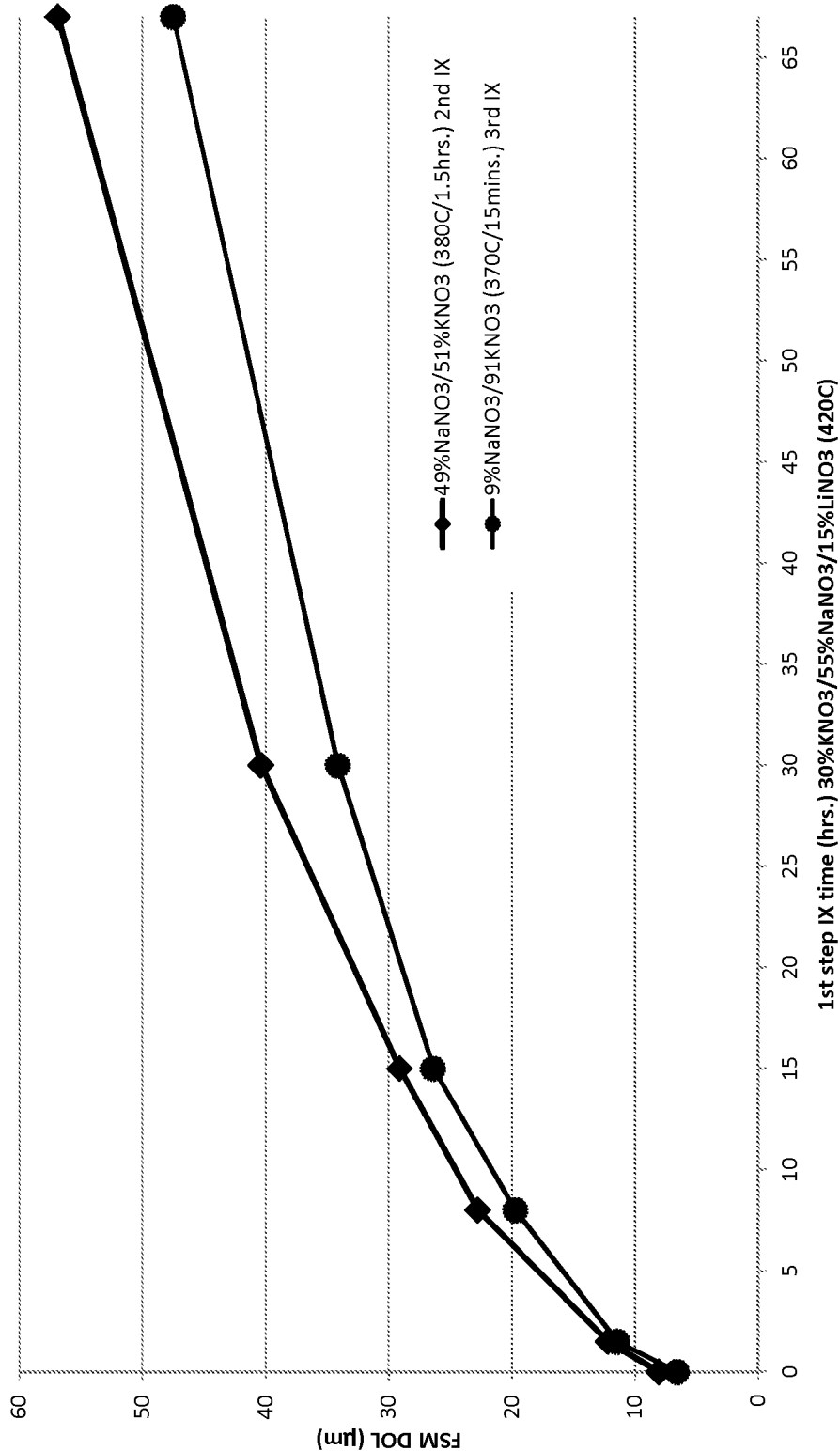
FIG. 9 is a graph of FSM depth of layer ($DOL_{FSM}$) versus first IOX step time (hrs.) and for a second IOX step bath and a third IOX step according to some embodiments disclosed herein.

Comparison of second and third IOX steps. FIG. 9 is a graph of FSM depth of layer ($DOL_{FSM}$) versus first IOX step time (hrs.) and for a second IOX step bath and a third IOX step. In FIG. 9, the $DOL_{FSM}$ of Tables 3.2 and 5.2 are graphed. The data in the graph shows that the longer the sample remained in the first step bath the higher the reported $DOL_{FSM}$ for both 2nd and third step ion exchange. The graph also shows a lower $DOL_{FSM}$ after the 9% $NaNO_3$/91% $KNO_3$ in comparison to the second step bath.

Figure 10:
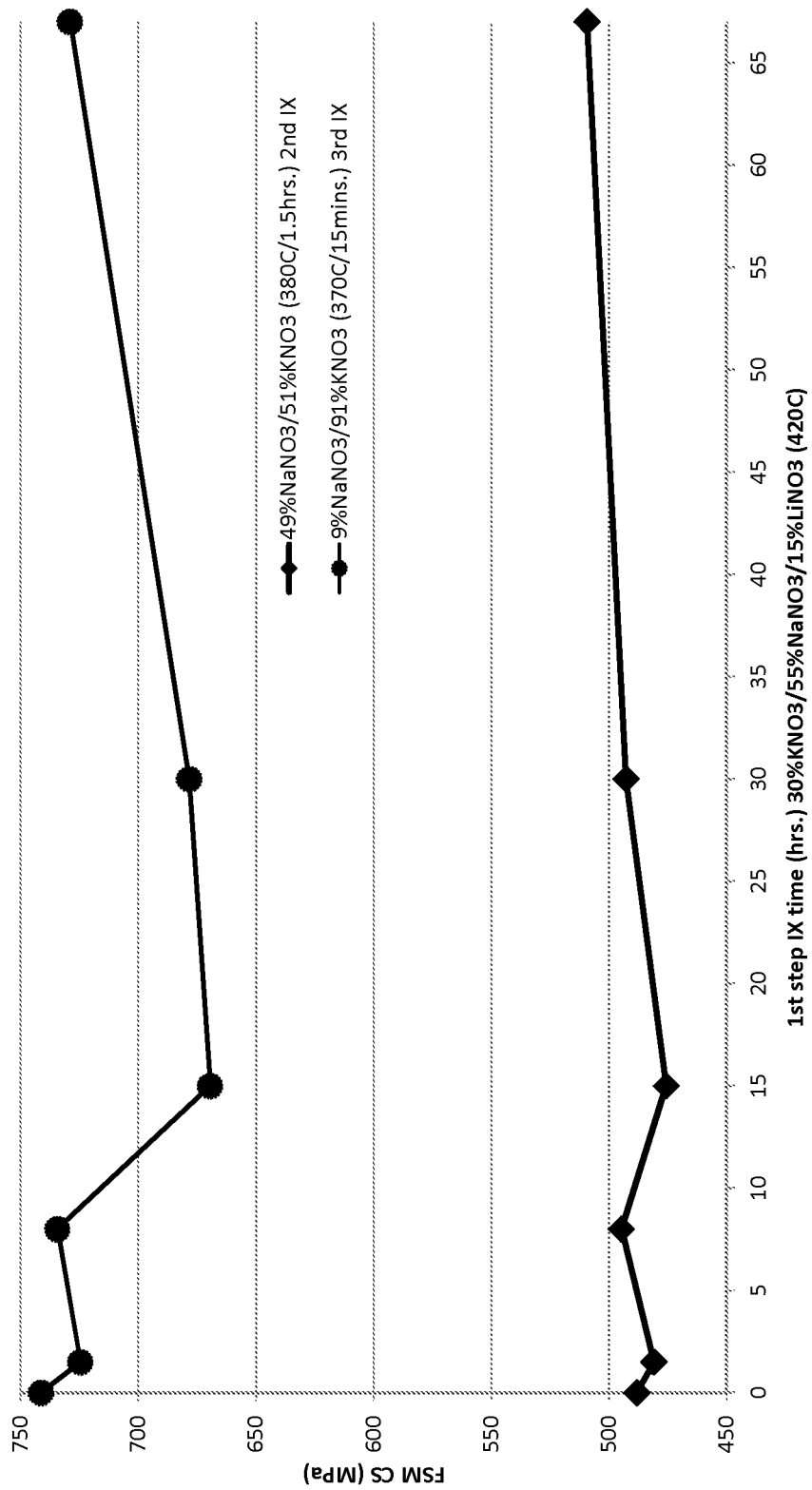
FIG. 10 is a graph of reported FSM Stress ($CS_{max}$) versus first IOX step time (hrs.) and for a second IOX step bath and a third IOX step according to some embodiments disclosed herein.

In FIG. 10, the reported FSM Stress ($CS_{max}$) of Tables 3.2 and 5.2 are graphed. The data in the graph shows that the compressive stress at the surface as measured by FSM remained comparable for all first step time points after going through the 49% $NaNO_3$/51% $KNO_3$ second step bath condition. The graph also indicates a higher compressive stress at the surface after the final step of 9% $NaNO_3$/91% $KNO_3$.

Figure 11:
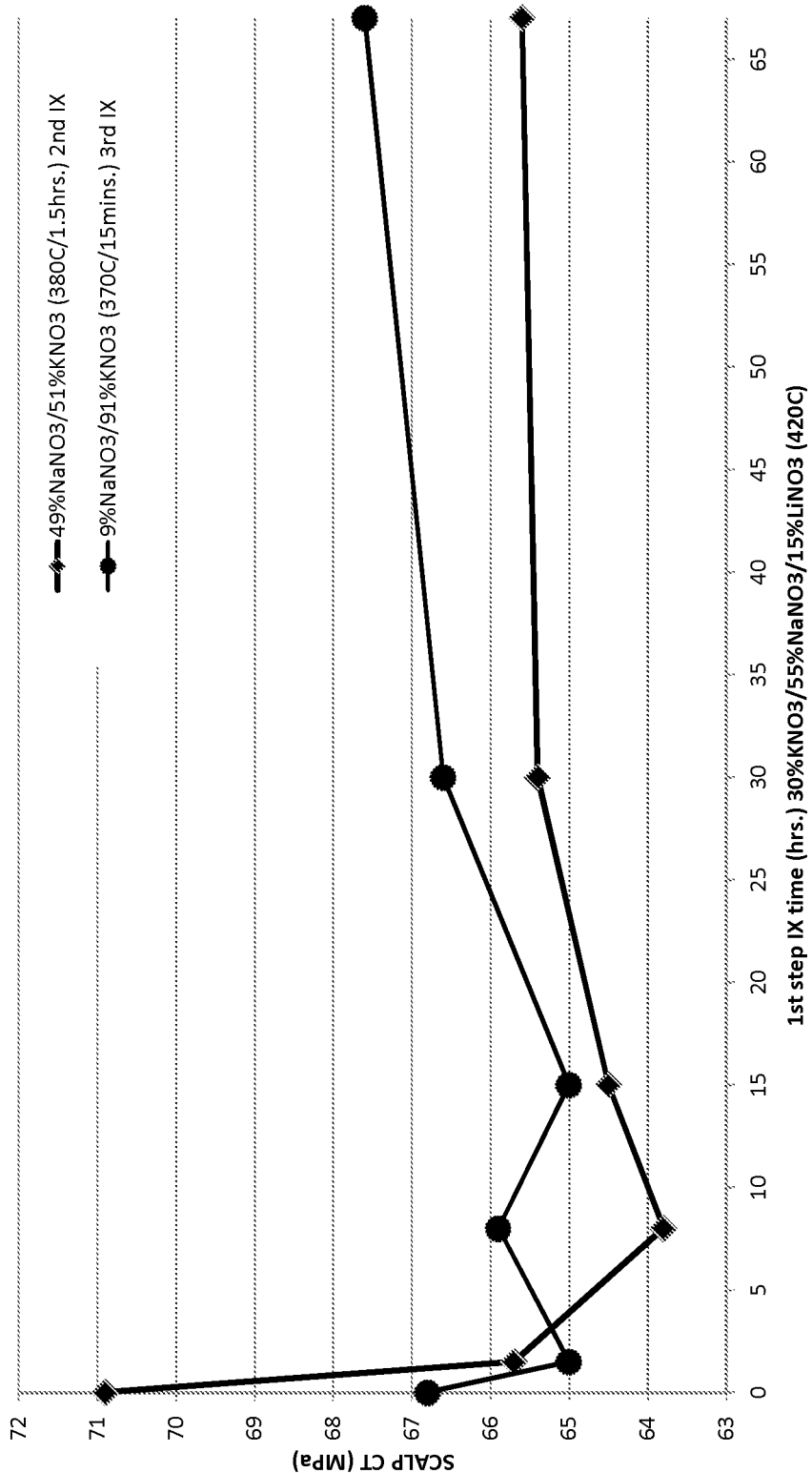
FIG. 11 is a graph of SCALP central tension (CT) versus first IOX step time (hrs.) and for a second IOX step bath and a third IOX step according to some embodiments disclosed herein.

In FIG. 11, the SCALP central tension (CT) of Tables 3.2 and 5.2 are graphed. The data in the graph shows that the central tension after the final step decreased 4 MPa for the reference sample. There was an increase in CT after the final step for all time points after 1.5 hours.

Figure 12:
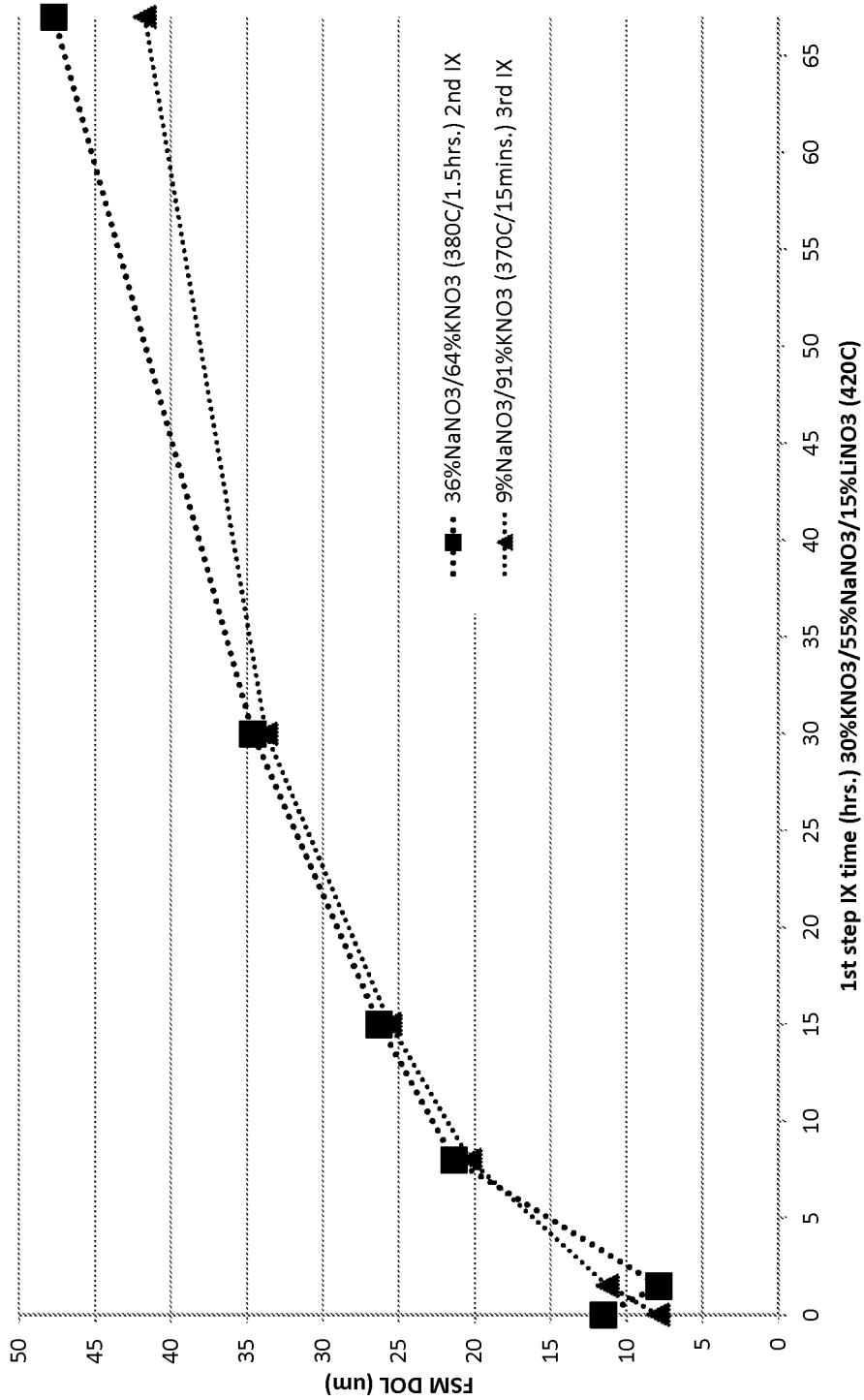
FIG. 12 is a graph of FSM depth of layer ($DOL_{FSM}$) versus first IOX step time (hrs.) and for a second IOX step bath and a third IOX step according to some embodiments disclosed herein.

FIG. 12 is a graph of FSM depth of layer ($DOL_{FSM}$) versus first IOX step time (hrs.) and for a second IOX step bath and a third IOX step. In FIG. 12, the $DOL_{FSM}$ of Tables 2 and 4 are graphed. The data in the graph shows that the longer the sample remained in the first step bath the higher the reported $DOL_{FSM}$ for both second and third step ion exchange. The graph also shows a lower $DOL_{FSM}$ after the 9% $NaNO_3$/91% $KNO_3$ in comparison to the second step bath for the final time point of the first step IOX of 67 hours.

Figure 13:
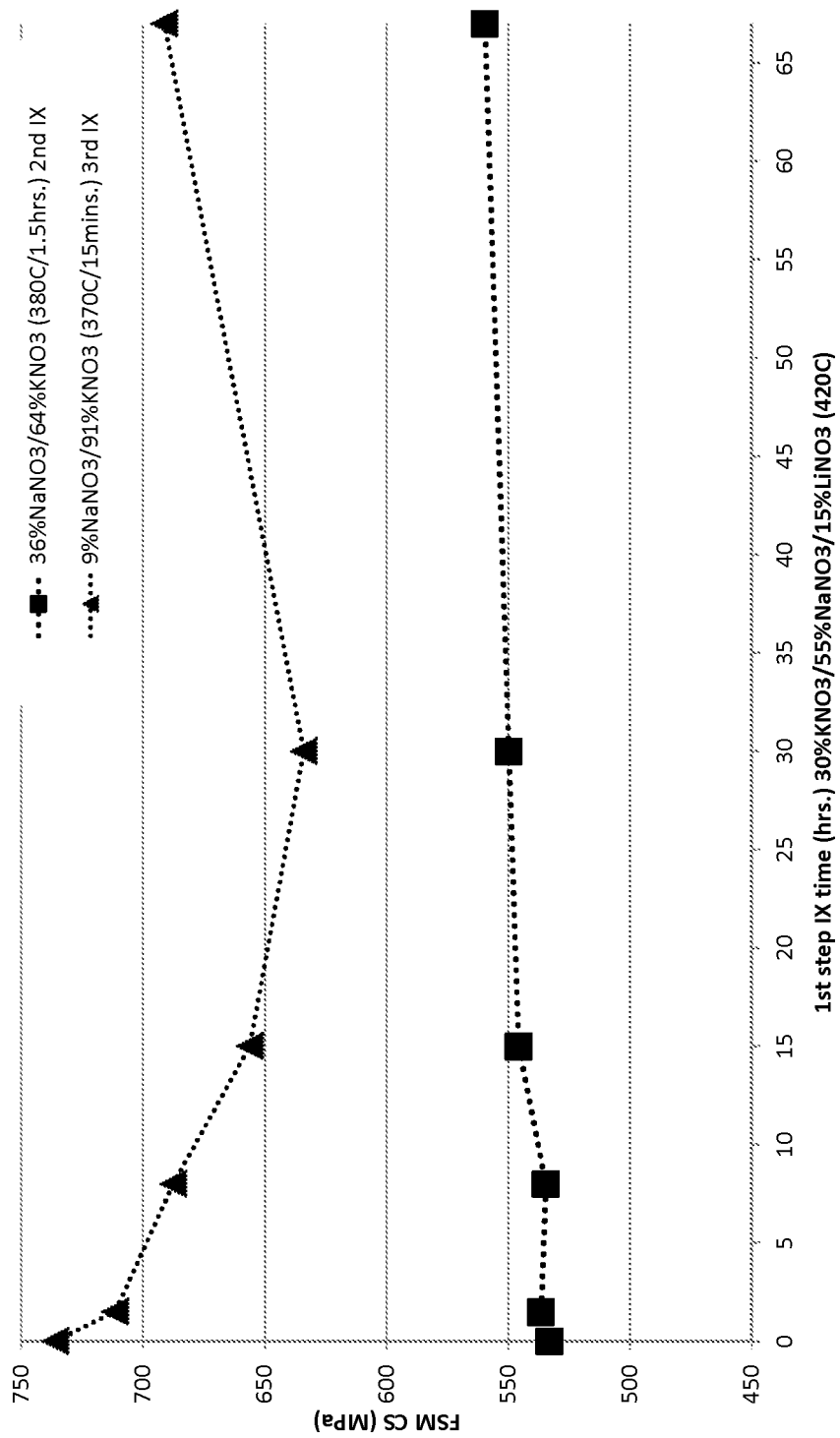
FIG. 13 is a graph of reported FSM Stress ($CS_{max}$) versus first IOX step time (hrs.) and for a second IOX step bath and a third IOX step according to some embodiments disclosed herein.

In FIG. 13, the reported FSM Stress ($CS_{max}$) of Tables 2 and 4 are graphed. The data in the graph shows that the compressive stress at the surface remained comparable for all first step time points after going through the 36% $NaNO_3$/64% $KNO_3$ second step bath condition. The graph also indicates a higher compressive stress at the surface after the final step of 9% $NaNO_3$/91% $KNO_3$.

Figure 14:
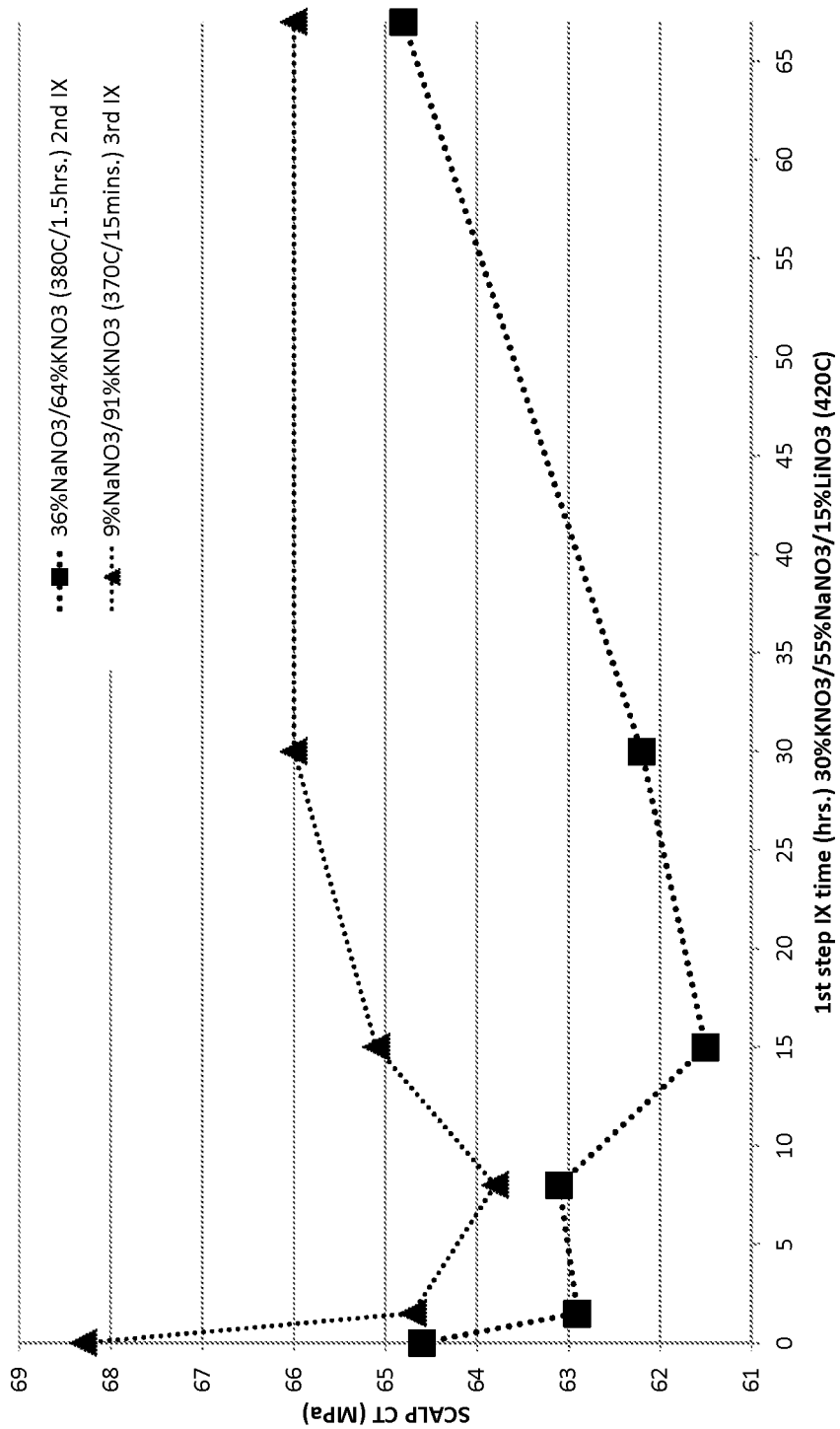
FIG. 14 is a graph of SCALP central tension (CT) versus first IOX step time (hrs.) and for a second IOX step bath and a third IOX step according to some embodiments disclosed herein.

In FIG. 14, the SCALP central tension (CT) of Tables 2 and 4 are graphed. The data in the graph shows there is an increase in CT after the final step for all time points including the reference sample.

Figure 15:
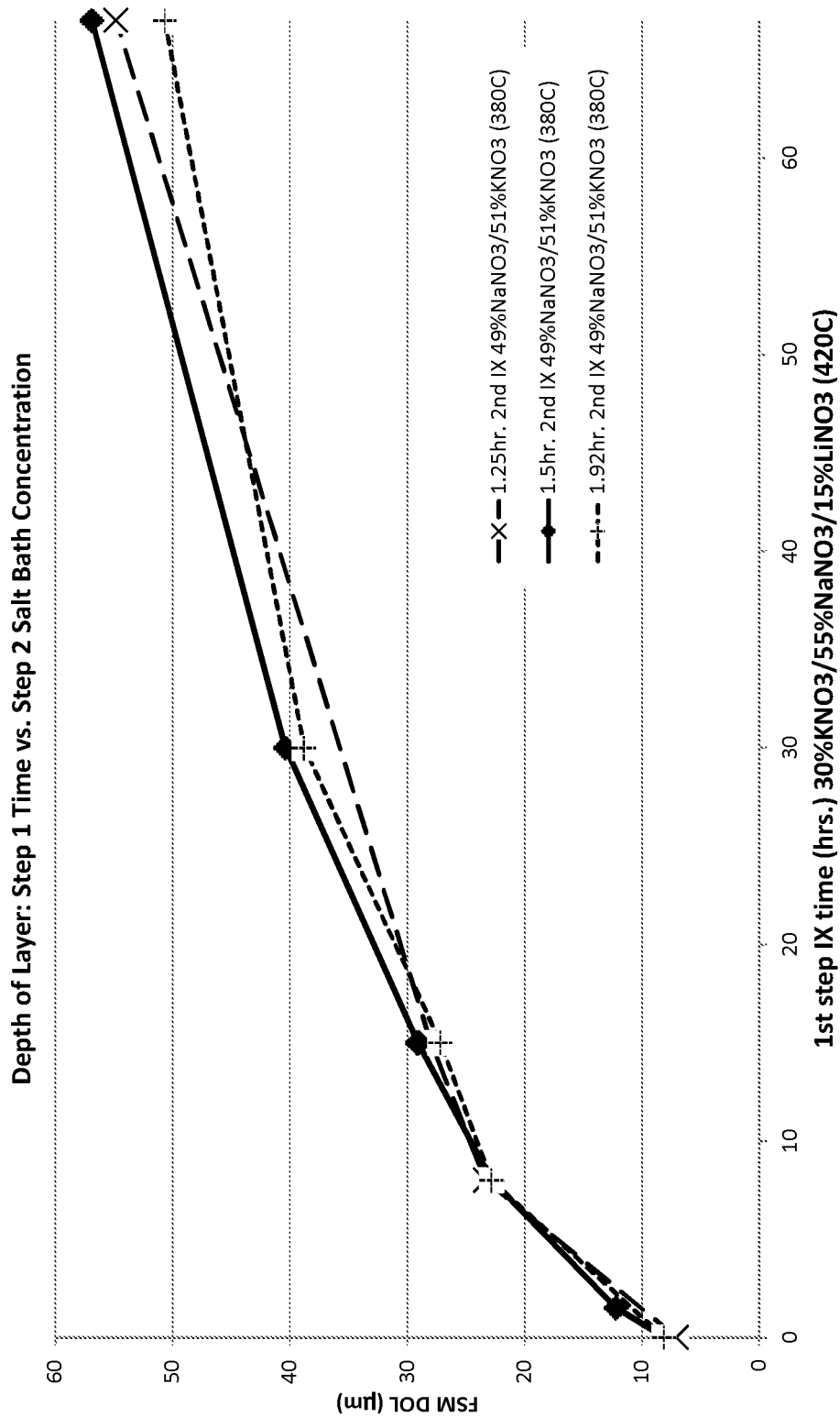
FIG. 15 is a graph of FSM depth of layer ($DOL_{FSM}$) versus first IOX step time (hrs.) and for a second IOX step bath of three different durations according to some embodiments disclosed herein.

Comparison of two IOX steps and differing second IOX bath durations. FIG. 15 is a graph of FSM depth of layer ($DOL_{FSM}$) versus first IOX step time (hrs.) and for three different second IOX step bath durations. In FIG. 15, the $DOL_{FSM}$ of Tables 3.1, 3.2, and 3.3 are graphed. The data in the graph shows that the longer the sample remained in the first step bath, the higher the $DOL_{FSM}$. The graph also indicates a higher $DOL_{FSM}$ for the 1.5 hour samples in the 49% NaNO$_3$/51% KNO$_3$ bath. The reported DOL$_{FSM}$ trend is similar for all second step IX time points.

Figure 16:
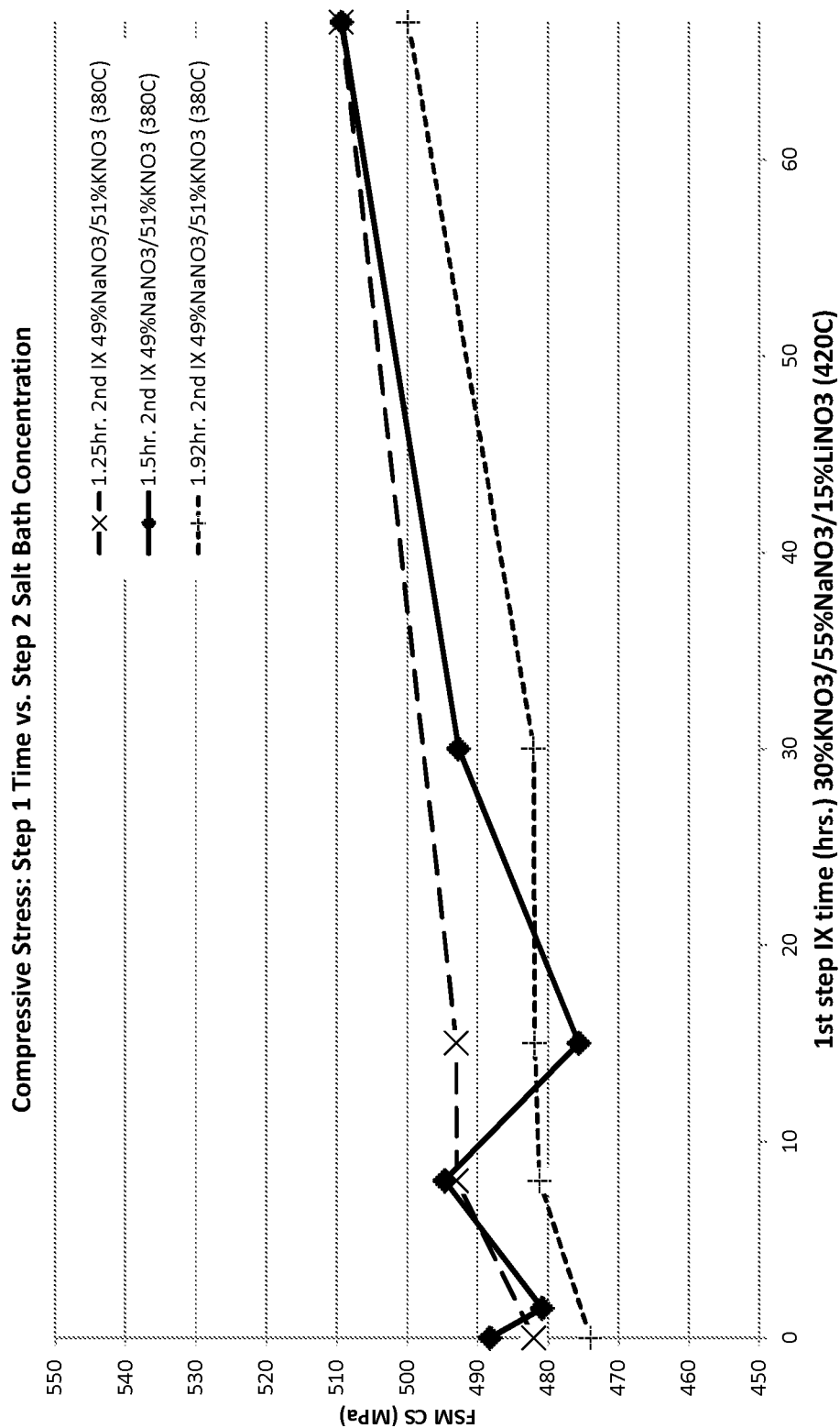
FIG. 16 is a graph of reported FSM Stress ($CS_{max}$) versus first IOX step time (hrs.) and for a second IOX step bath of three different durations according to some embodiments disclosed herein.

In FIG. 16, the reported FSM Stress (CS$_{max}$) of Tables 3.1, 3.2, and 3.3 are graphed. The data in the graph shows comparable compressive stress as measured by FSM for all of the different time points going through the second step bath of 49% NaNO$_3$/51% KNO$_3$.

Figure 17:
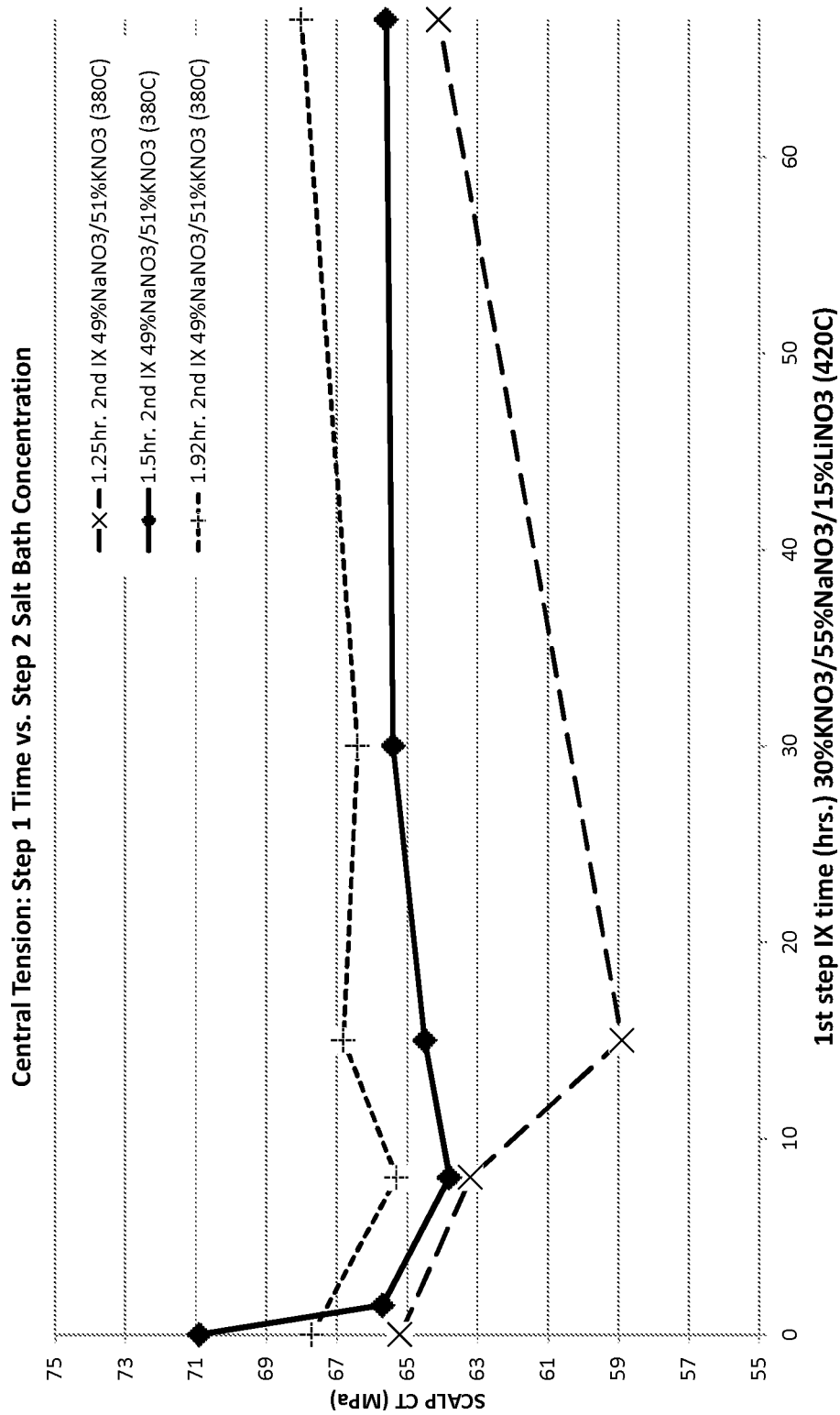
FIG. 17 is a graph of SCALP central tension (CT) versus first IOX step time (hrs.) and for a second IOX step bath of three different durations according to some embodiments disclosed herein.

In FIG. 17, the SCALP central tension (CT) of Tables 3.1, 3.2, and 3.3 are graphed. The data in the graph shows that the central tension is highest for all of the first step time points that have undergone the 1.92 hour second step bath of 49% NaNO$_3$/51% KNO$_3$.

Figure 18:
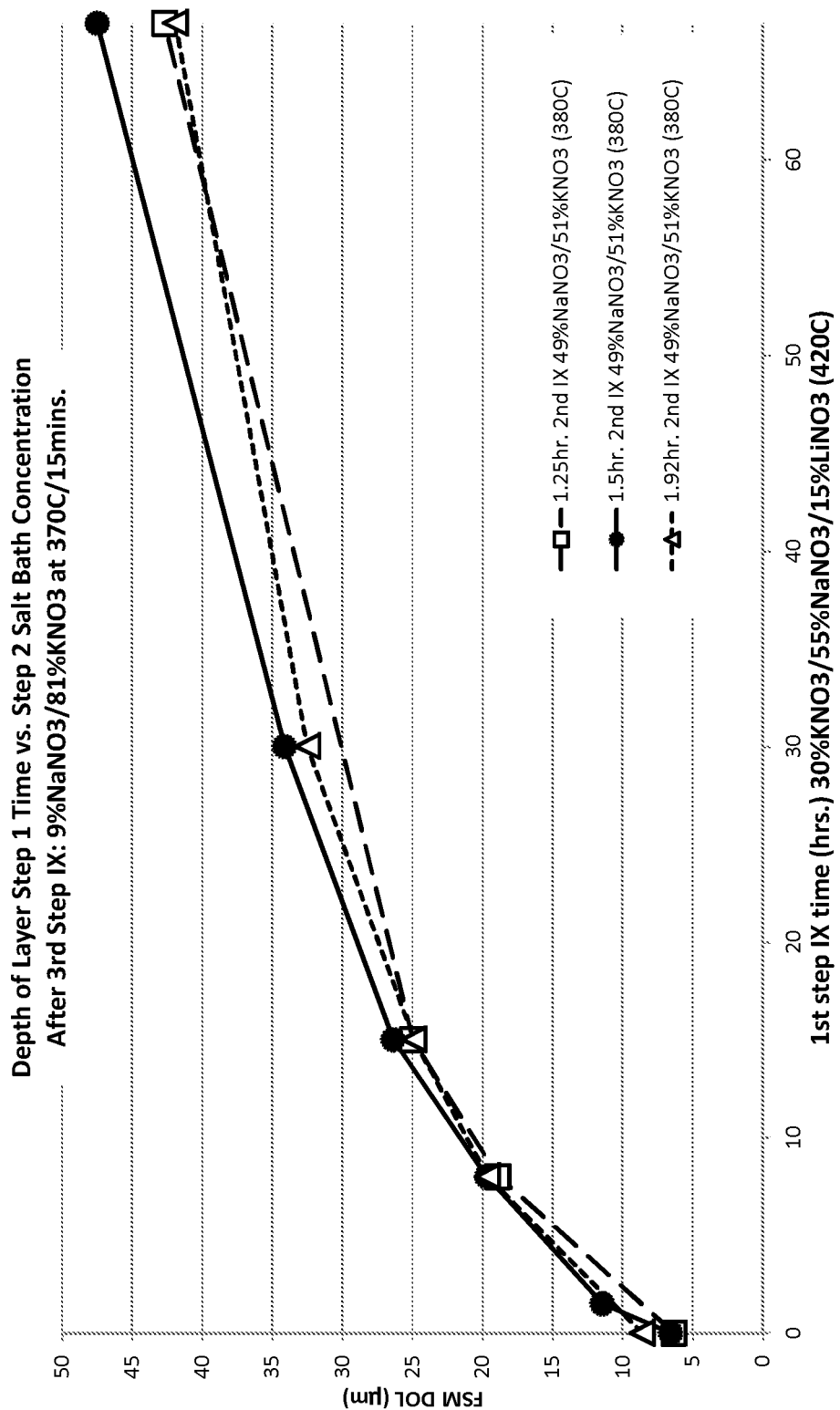
FIG. 18 is a graph of FSM depth of layer ($DOL_{FSM}$) versus first IOX step time (hrs.) and for a second IOX step bath of three different durations and a same third IOX step according to some embodiments disclosed herein.

Comparison of three IOX steps and differing second IOX bath durations. FIG. 18 is a graph of FSM depth of layer (DOL$_{FSM}$) versus first IOX step time (hrs.) and for three different second IOX step bath durations and including a same third IOX step. In FIG. 18, the DOL$_{FSM}$ of Tables 5.1, 5.2, and 5.3 are graphed. The data in the graph shows that the longer the sample remained in the first step bath the higher the reported DOL$_{FSM}$ after the third step ion exchange for all samples that went through different second step IX time points. The graph also shows that the samples that went through the 1.5 hour time point in the 49% NaNO$_3$/51KNO$_3$ second bath reports a higher DOL$_{FSM}$ after the third step of 9% NaNO$_3$/91% KNO$_3$ in comparison to the other time points.

Figure 19:
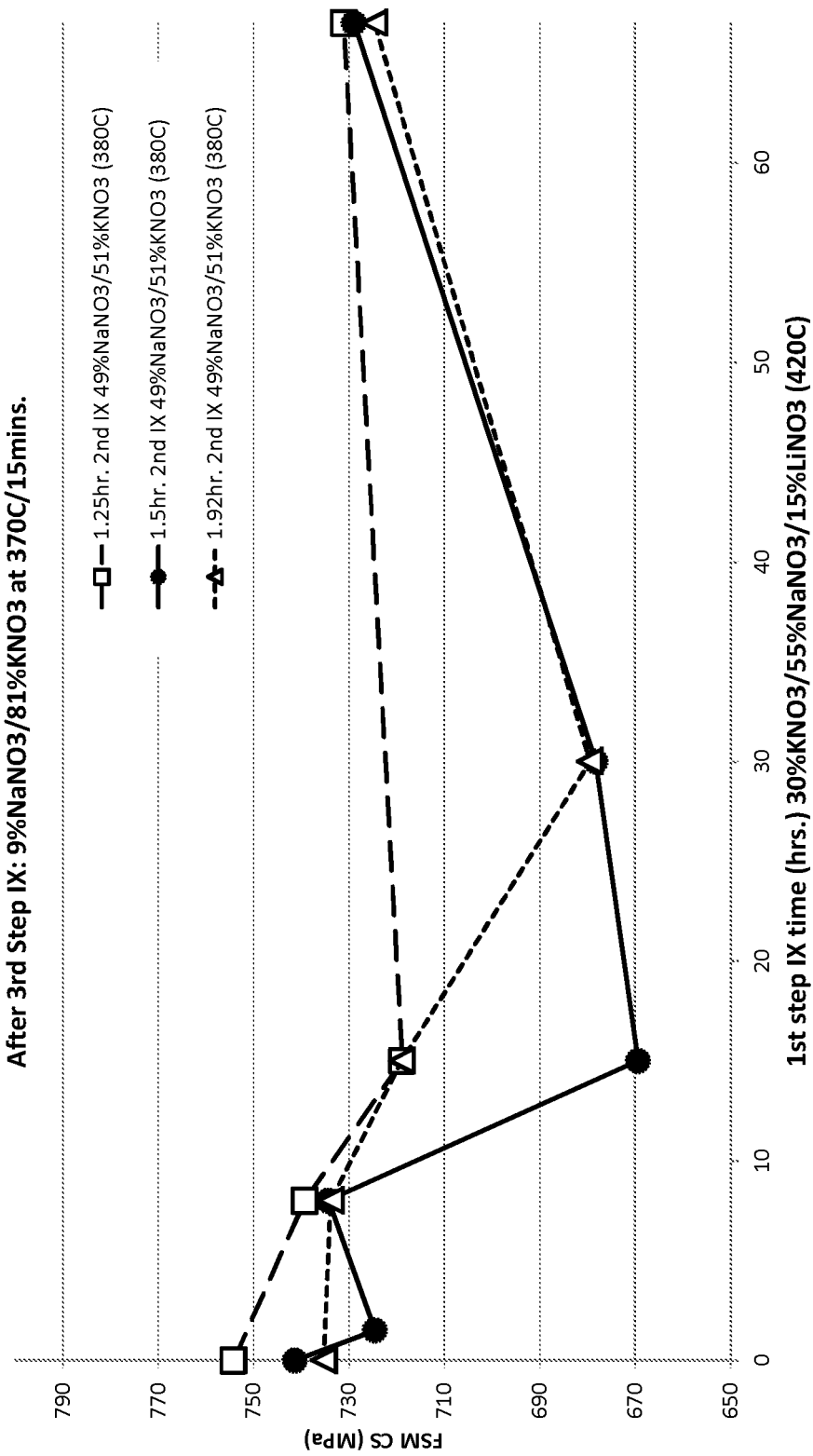
FIG. 19 is a graph of reported FSM Stress ($CS_{max}$) versus first IOX step time (hrs.) and for a second IOX step bath of three different durations and a same third IOX step according to some embodiments disclosed herein.

In FIG. 19, the reported FSM Stress (CS$_{max}$) of Tables 5.1, 5.2, and 5.3 are graphed. The data in the graph shows comparable compressive stress at the surface as measured by FSM for all of the different time points going through the second step bath of 49% NaNO$_3$/51% KNO$_3$ and then the final step of 9% NaNO$_3$/91% KNO$_3$. There is a drop in CS for the 15 hour and 30 hour first step time points that went through a 1.5 hour second step and the 30 hour time point that went through the 1.92 hour second step. This could be due to the FSM 6000 protocol to use 590 nm wavelength. It is understood that using, for example, a 365 nm wavelength, the CS would show a value more comparable to the reference sample.

Figure 20:
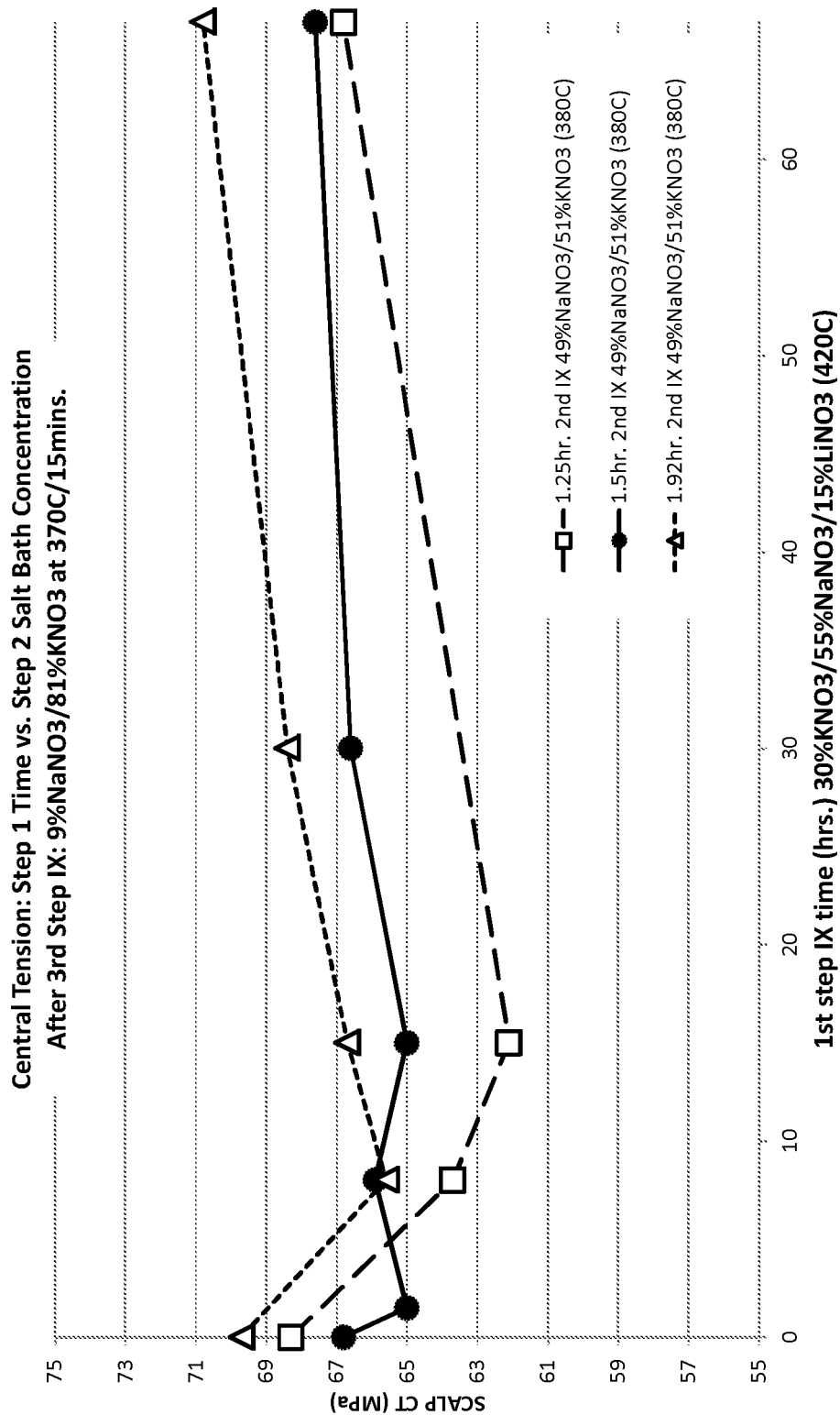
FIG. 20 is a graph of SCALP central tension (CT) versus first IOX step time (hrs.) and for a second IOX step bath of three different durations and a same third IOX step according to some embodiments disclosed herein.

In FIG. 20, the SCALP central tension (CT) of Tables 5.1, 5.2, and 5.3 are graphed. The data in the graph shows comparable central tension for all of the different time points going through the second step bath of 49% NaNO$_3$/51% KNO$_3$ and then the final step of 9% NaNO$_3$/91% KNO$_3$. The data in the graph shows that the central tension highest for all of the first step time points except the 8 hour time point that have undergone the 1.92 hour second step bath of 49% NaNO$_3$/51% KNO$_3$.

Figure 21:
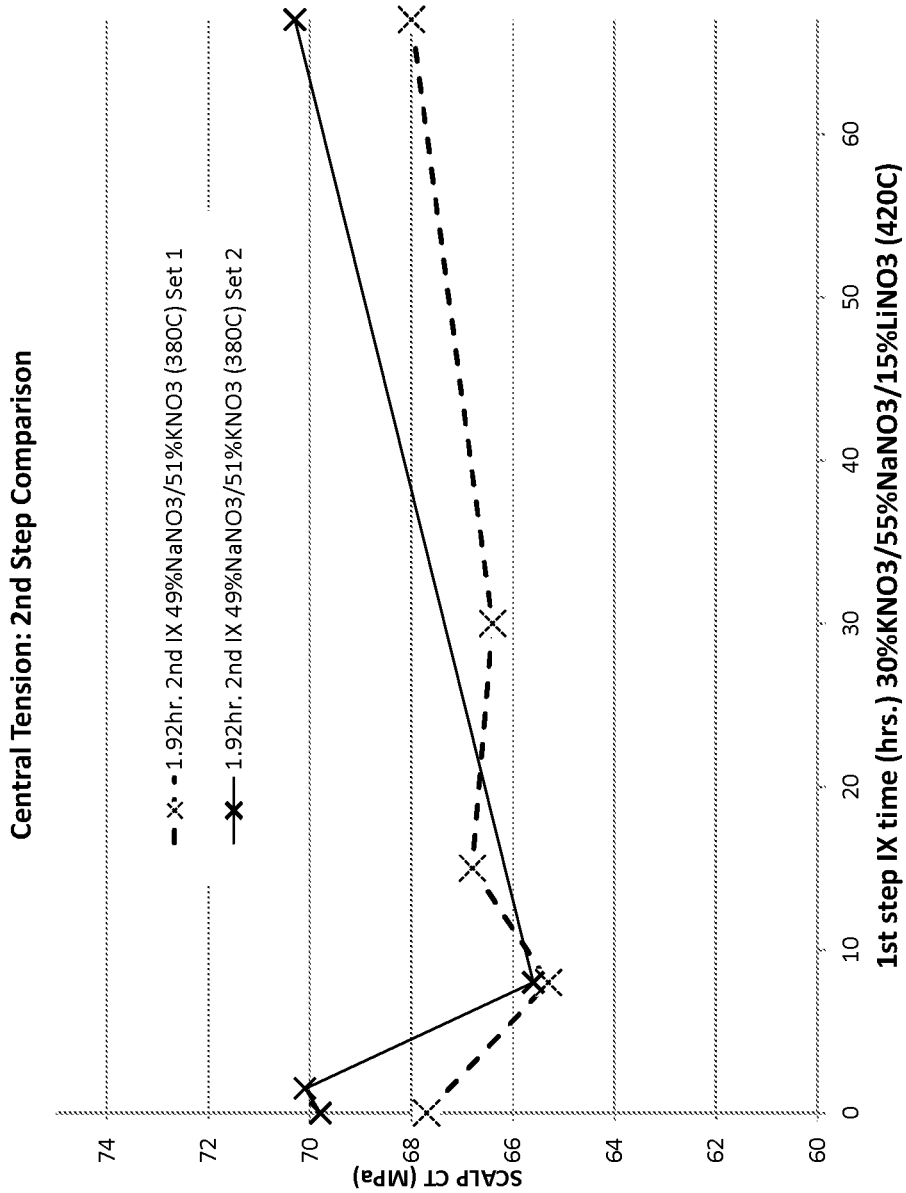
FIG. 21 is a graph of SCALP central tension (CT) versus first IOX step time (hrs.) and for a second IOX step bath according to some embodiments disclosed herein.

Comparison the same two IOX steps. FIG. 21 is a graph of SCALP central tension (CT) of Tables 3.3 and 3.4.

Figure 22:
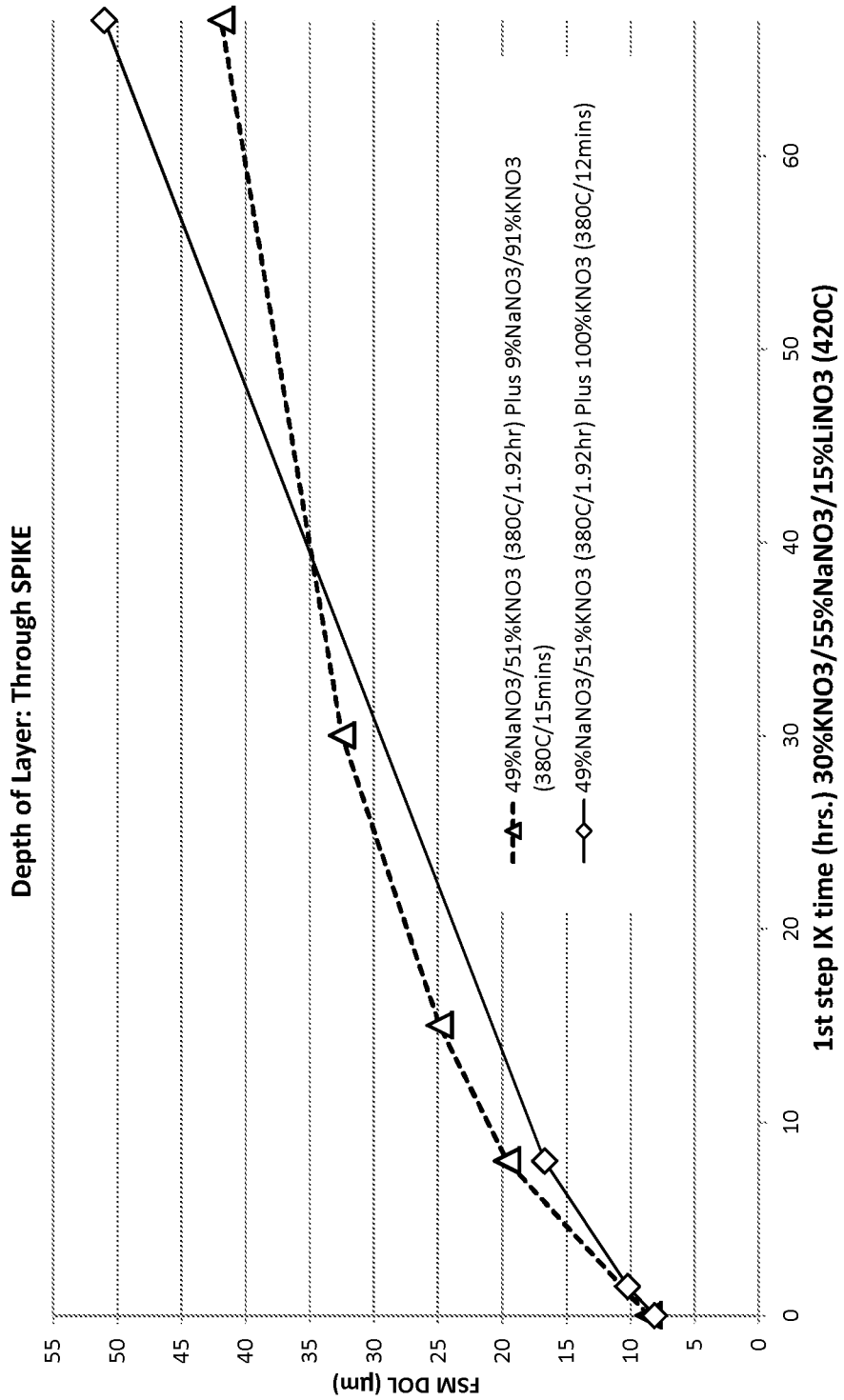
FIG. 22 is a graph of FSM depth of layer ($DOL_{FSM}$) versus first IOX step time (hrs.) and for a second IOX step bath and a differing third IOX steps according to some embodiments disclosed herein.

Comparison of three IOX steps and differing third IOX bath compositions and durations. FIG. 22 is a graph of FSM depth of layer (DOL$_{FSM}$) versus first IOX step time (hrs.) and for the same second IOX step and including differing third IOX steps. In FIG. 22, the DOL$_{FSM}$ of Tables 5.3 and 5.4 are graphed.

Figure 23:
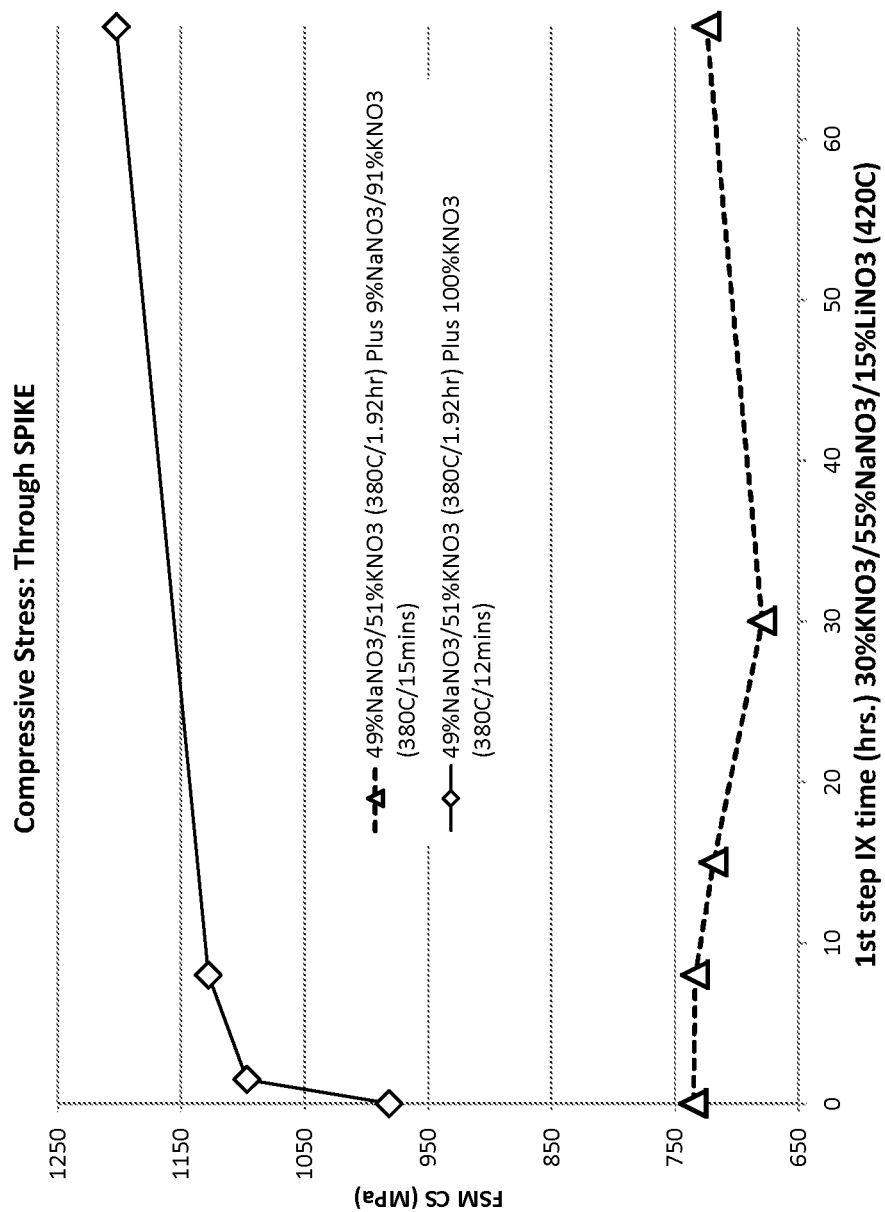
FIG. 23 is a graph of reported FSM Stress ($CS_{max}$) versus first IOX step time (hrs.) and for a second IOX step bath and a differing third IOX steps according to some embodiments disclosed herein.

In FIG. 23, the reported FSM Stress (CS$_{max}$) of Tables 5.3 and 5.4 are graphed.

Figure 24:
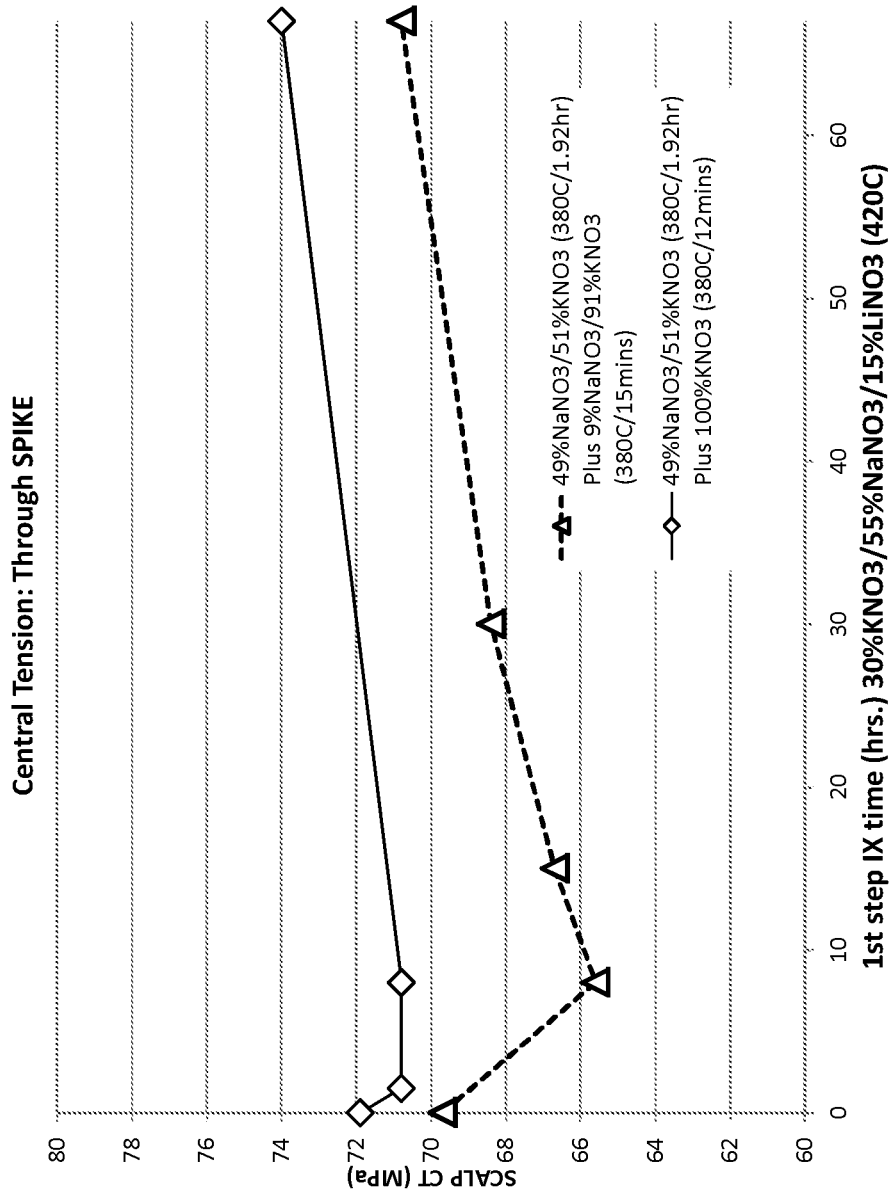
FIG. 24 is a graph of SCALP central tension (CT) versus first IOX step time (hrs.) and for a second IOX step bath and a differing third IOX steps according to some embodiments disclosed herein.

In FIG. 24, the SCALP central tension (CT) of Tables 5.3 and 5.4 are graphed.

Figure 25A:
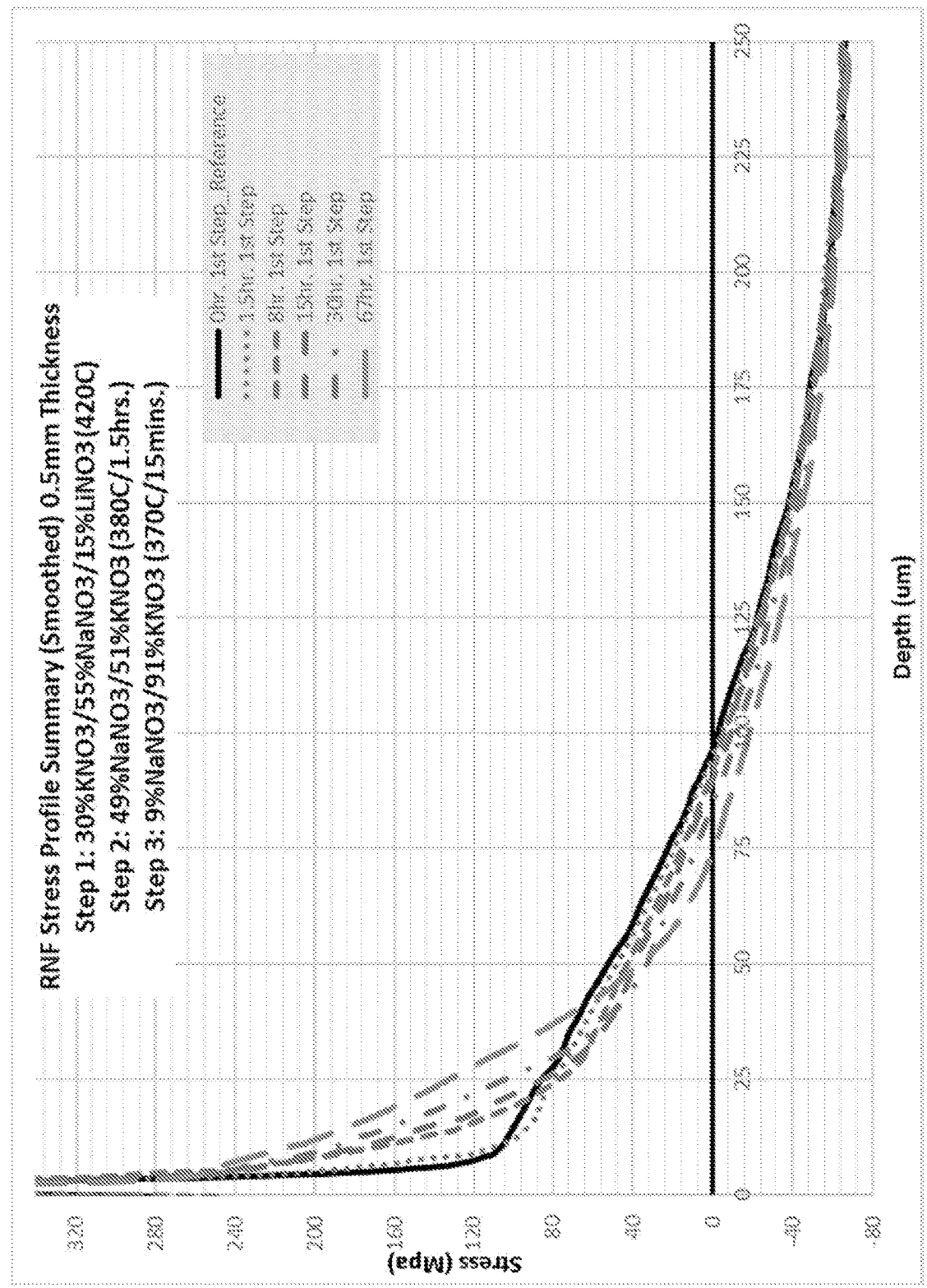
FIGS. 25A and 25B are graphs of a stress profile according to some embodiments disclosed herein, FIG. 25A graphs stress (MPa) versus a depth of up to one-half the thickness of articles.
Figure 25B:
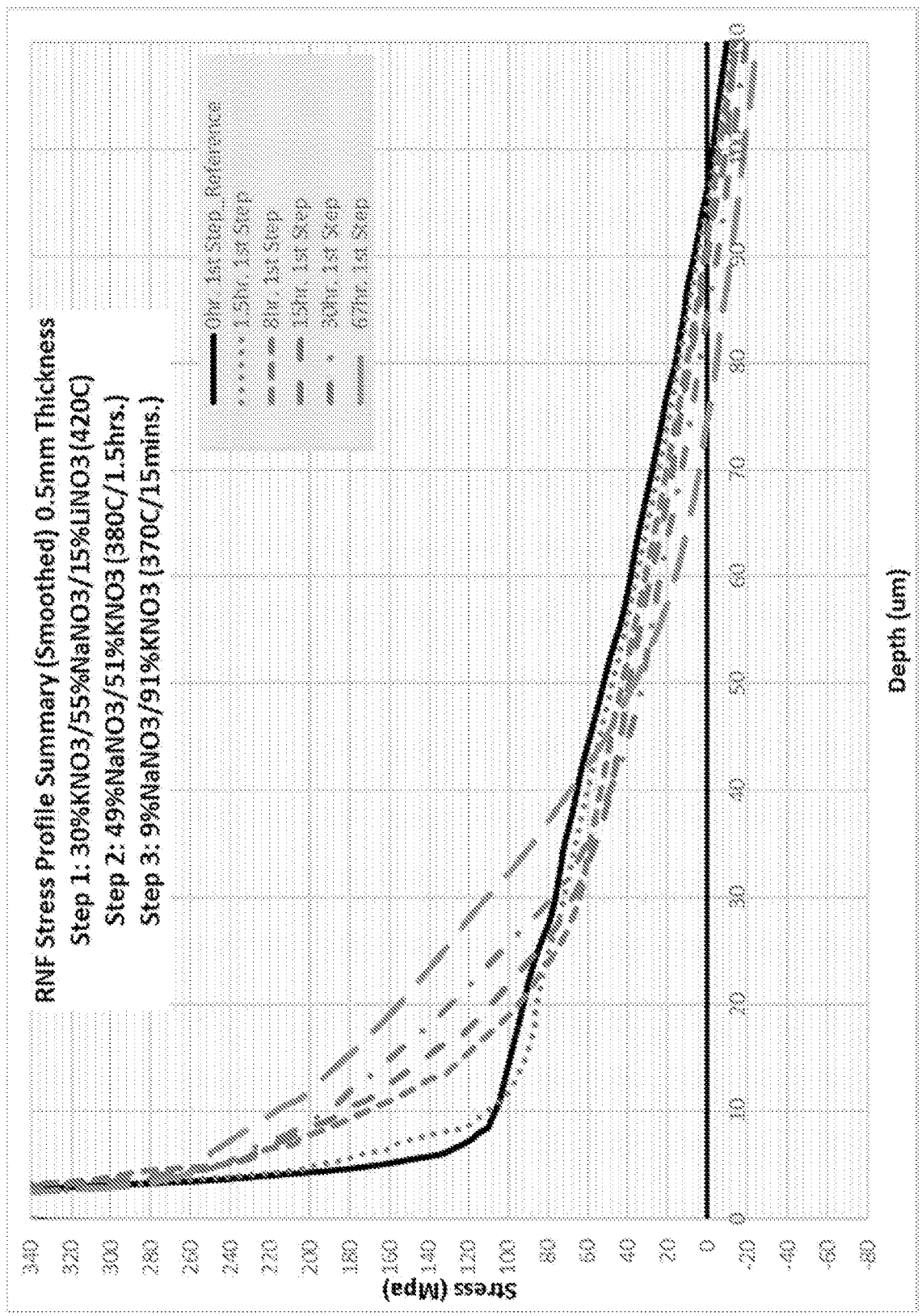

Stress profiles. FIGS. 25A and 25B are graphs of a stress profile according to the samples of Table 5.2. FIG. 25A graphs stress (MPa) versus a depth of up to one-half the thickness of articles, and FIG. 25B is for the depth of the article of up to 110 micrometers. The stress profiles of FIGS. 25A and 25B are RNF-generated and smoothed profiles. The data in the graph shows that the Na profile is deeper at the surface the longer the first step ion exchange is.

Table 5.2.1-A provides depth of layer of the spike (DOL$_{sp}$), knee stress (CS$_{knee}$), depth of compression (DOC), a first average compressive stress (CS$_{avg-1}$) in the region of enhanced stress, potassium depth of layer (DOL$_K$) and a second average compressive stress (CS$_{avg-2}$) in the region of enriched potassium are determined and summarized in. DOL$_K$ was derived from an inverse-WKB method and TM and TE index profiles discussed with respect to FIGS. 30-31. Table 5.2.1-B is a summary of CS$_{avg-1}$ over a specified depth.

TABLE 5.2.1-A

| First & second step (49Na:51K/1.5 hrs) & third step (9Na:91K/15 min.) IOX Sample ID | 1$^{st}$ STEP Time (hr.) | Spike DOL (DOL$_{sp}$) (µm) | DOC (µm) | First Average compressive stress (CS$_{avg-1}$) over DOL$_{sp}$ + 1 µm to DOL$_{FSM}$ | Potassium DOL (DOL$_K$) (µm) | Second Average compressive stress (CS$_{avg-2}$) over DOL$_{sp}$ + 1 µm to DOL$_K$ |
|---|---|---|---|---|---|---|
| REF C | 0 | — | 94-97 | — | — | — |
| S2A | 1.5 | 5.8 | 93-96 | 125 | 12-14 | 123 |
| P13 | 8 | 6.8 | 90-93 | 137 | 27-31 | 119 |
| P4 | 15 | 7.2 | 88-91 | 131 | 32-34 | 117 |
| P1 | 30 | 7.4 | 82-85 | 126 | 46 | 101 |
| P8 | 67 | 7.4 | 73-76 | 123 | 67-70 | 85 |

TABLE 5.2.1-B

| First & second step (49Na:51K/1.5 hrs) & third step (9Na:91K/15 min.) IOX | REF C | P13 | P4 | P1 | P8 |
|---|---|---|---|---|---|
| 1$^{st}$ STEP Time (hr.) | 0 | 8 | 15 | 30 | 67 |
| Depth range (µm) | CS$_{avg-1}$ | CS$_{avg-1}$ | CS$_{avg-1}$ | CS$_{avg-1}$ | CS$_{avg-1}$ |
| 8-20 | 101 | 137 | 150 | 166 | 190 |
| 10-20 | 99 | 127 | 142 | 159 | 183 |
| 12-20 | 98 | 118 | 134 | 153 | 176 |
| 8-25 | 97 | 122 | 135 | 152 | 176 |
| 10-25 | 96 | 113 | 127 | 145 | 170 |
| 12-25 | 94 | 106 | 120 | 139 | 164 |
| 8-30 | 93 | 110 | 121 | 138 | 164 |
| 10-30 | 92 | 102 | 114 | 131 | 158 |
| 12-30 | 90 | 96 | 108 | 125 | 152 |
| 8-35 | 90 | | 110 | 125 | 152 |
| 10-35 | 88 | | 104 | 119 | 146 |
| 12-35 | 87 | | 98 | 113 | 141 |

TABLE 5.2.1-B-continued

| First & second step (49Na:51K/1.5 hrs) & third step (9Na:91K/15 min.) IOX | REF C | P13 | P4 | P1 | P8 |
|---|---|---|---|---|---|
| 8-40 | 87 | | | 114 | 140 |
| 10-40 | 85 | | | 108 | 135 |
| 12-40 | 84 | | | 103 | 129 |
| 8-45 | 83 | | | | 129 |
| 10-45 | 82 | | | | 124 |
| 12-45 | 80 | | | | 119 |

Figure 26A:
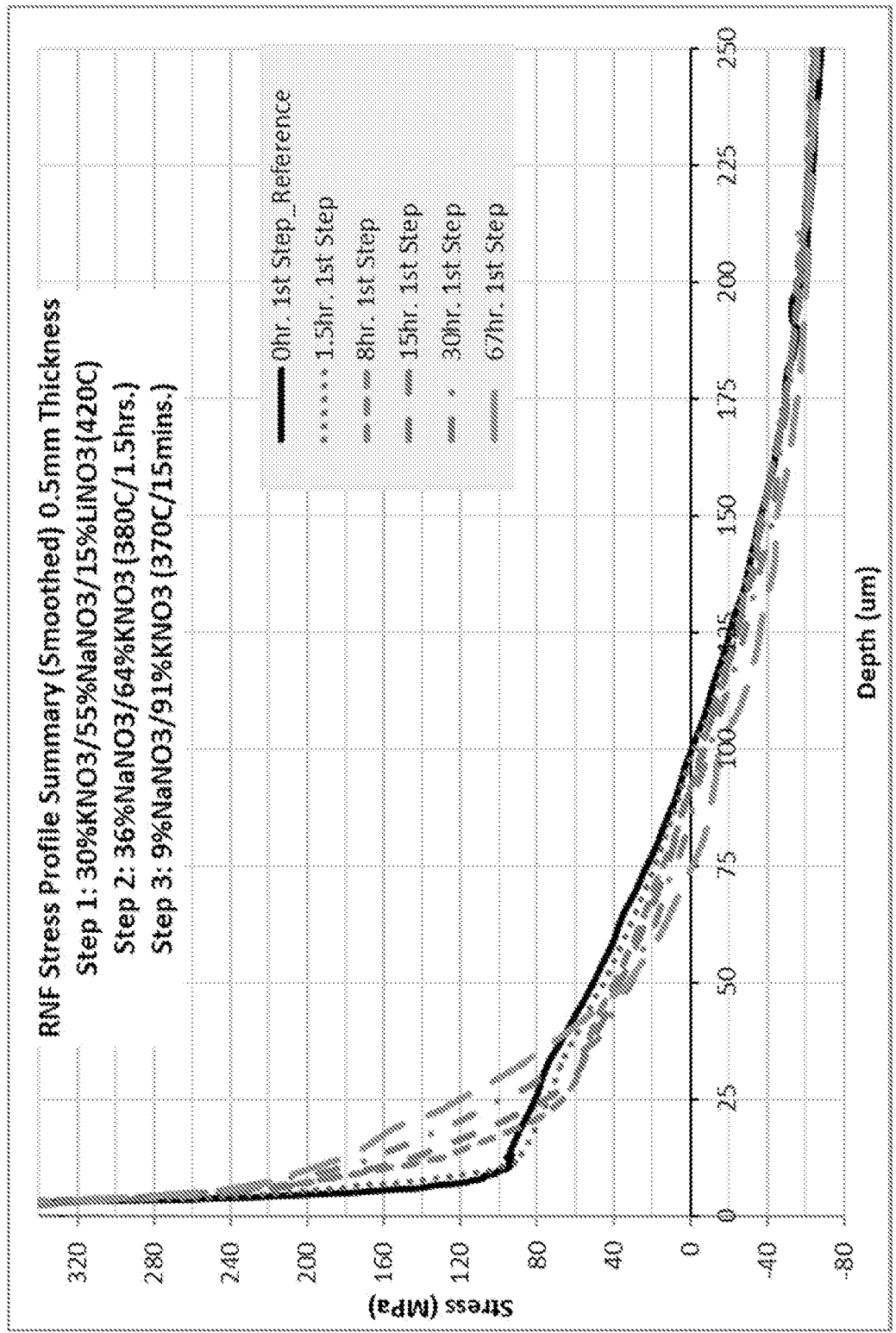
FIGS. 26A and 26B are graphs of a stress profile according to some embodiments disclosed herein, FIG. 26A graphs stress (MPa) versus a depth of up to one-half the thickness of articles.
Figure 26B:
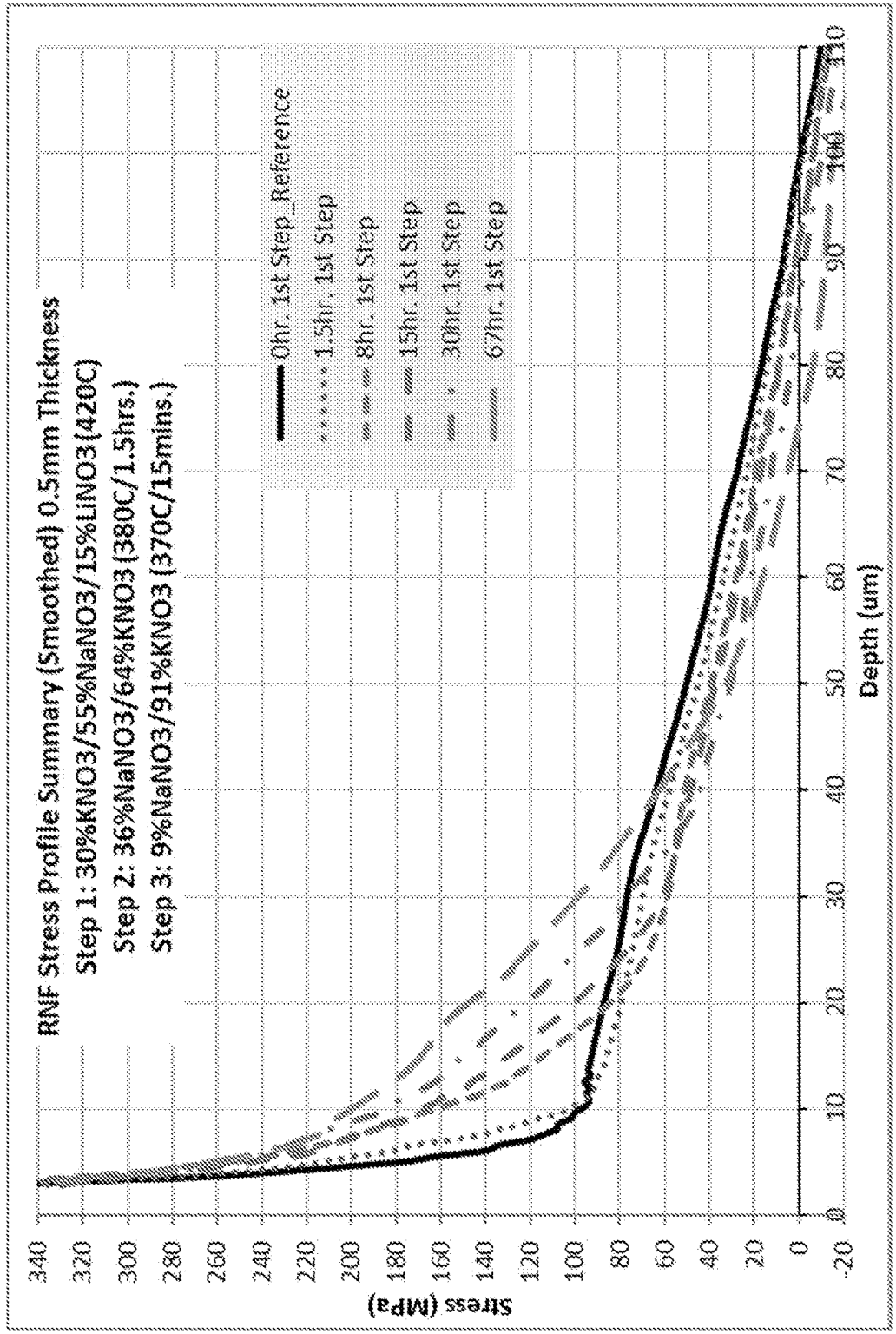

FIGS. 26A and 26B are graphs of a stress profile according to the samples of Table 4. FIG. 26A graphs stress (MPa) versus a depth of up to one-half the thickness of articles, and FIG. 26B is for the depth of the article of up to 110 micrometers. The stress profiles of FIGS. 26A and 26B are RNF-generated and smoothed profiles. The data in the graph shows that the Na profile is deeper at the surface the longer the first step ion exchange is.

Table 4.1-A provides depth of layer of the spike ($DOL_{sp}$), knee stress ($CS_{knee}$), depth of compression (DOC), a first average compressive stress ($CS_{avg-1}$) in the region of enhanced stress, potassium depth of layer ($DOL_K$) and a second average compressive stress ($CS_{avg-2}$) in the region of enriched potassium. $DOL_K$ was derived from an inverse-WKB method and TM and TE index profiles discussed with respect to FIGS. 30-31. Table 4.1-B is a summary of $CS_{avg-1}$ over a specified depth.

TABLE 4.1-A

| First & second step (36Na:64K/1.5 hrs) & third step (9Na:91K/15 min.) IOX Sample ID | 1st STEP Time (hr.) | Spike DOL ($DOL_{sp}$) (µm) | DOC (µm) | First Average compressive stress ($CS_{avg-1}$) over $DOL_{sp}$ + 1 µm to $DOL_{FSM}$ | Potassium (K) DOL ($DOL_K$) (µm) | Second Average compressive stress ($CS_{avg-2}$) over $DOL_{sp}$ + 1 µm to $DOL_K$ |
|---|---|---|---|---|---|---|
| REF A | 0 | — | 97-100 | — | — | — |
| S2B | 1.5 | 6.0 | 96-99 | 117 | 12-13 | 114 |
| P14 | 8 | 7.0 | 90-93 | 124 | 27-30 | 106 |
| P5 | 15 | 7.2 | 90-93 | 122 | 35-37 | 98 |
| P2 | 30 | 7.5 | 84-87 | 120 | 45-46 | 97 |
| P9 | 67 | 7.3 | 72-75 | 125 | 67-71 | 78 |

TABLE 4.1-B

| First & second step (36Na:64K/ 1.5 hrs) & third step (9Na:91K/15 min.) IOX | REF A | P14 | P5 | P2 | P9 |
|---|---|---|---|---|---|
| 1st STEP Time (hr.) | 0 | 8 | 15 | 30 | 67 |
| Depth range (µm) | $CS_{avg-1}$ | $CS_{avg-1}$ | $CS_{avg-1}$ | $CS_{avg-1}$ | $CS_{avg-1}$ |
| 8-20 | 94 | 126 | 139 | 159 | 177 |
| 10-20 | 92 | 116 | 130 | 151 | 171 |
| 12-20 | 91 | 108 | 123 | 144 | 166 |
| 8-25 | 91 | 111 | 124 | 145 | 164 |
| 10-25 | 89 | 102 | 116 | 137 | 158 |
| 12-25 | 88 | 95 | 110 | 131 | 153 |
| 8-30 | 88 | 100 | 111 | 131 | 151 |
| 10-30 | 87 | 92 | 104 | 125 | 146 |
| 12-30 | 86 | 86 | 98 | 119 | 141 |
| 8-35 | 86 | | 101 | 119 | 140 |
| 10-35 | 84 | | 95 | 113 | 134 |
| 12-35 | 83 | | 89 | 108 | 129 |
| 8-40 | 83 | | | 109 | 129 |
| 10-40 | 81 | | | 103 | 124 |
| 12-40 | 80 | | | 97 | 119 |
| 8-45 | 80 | | | | 119 |
| 10-45 | 78 | | | | 114 |
| 12-45 | 77 | | | | 109 |

Figure 27:
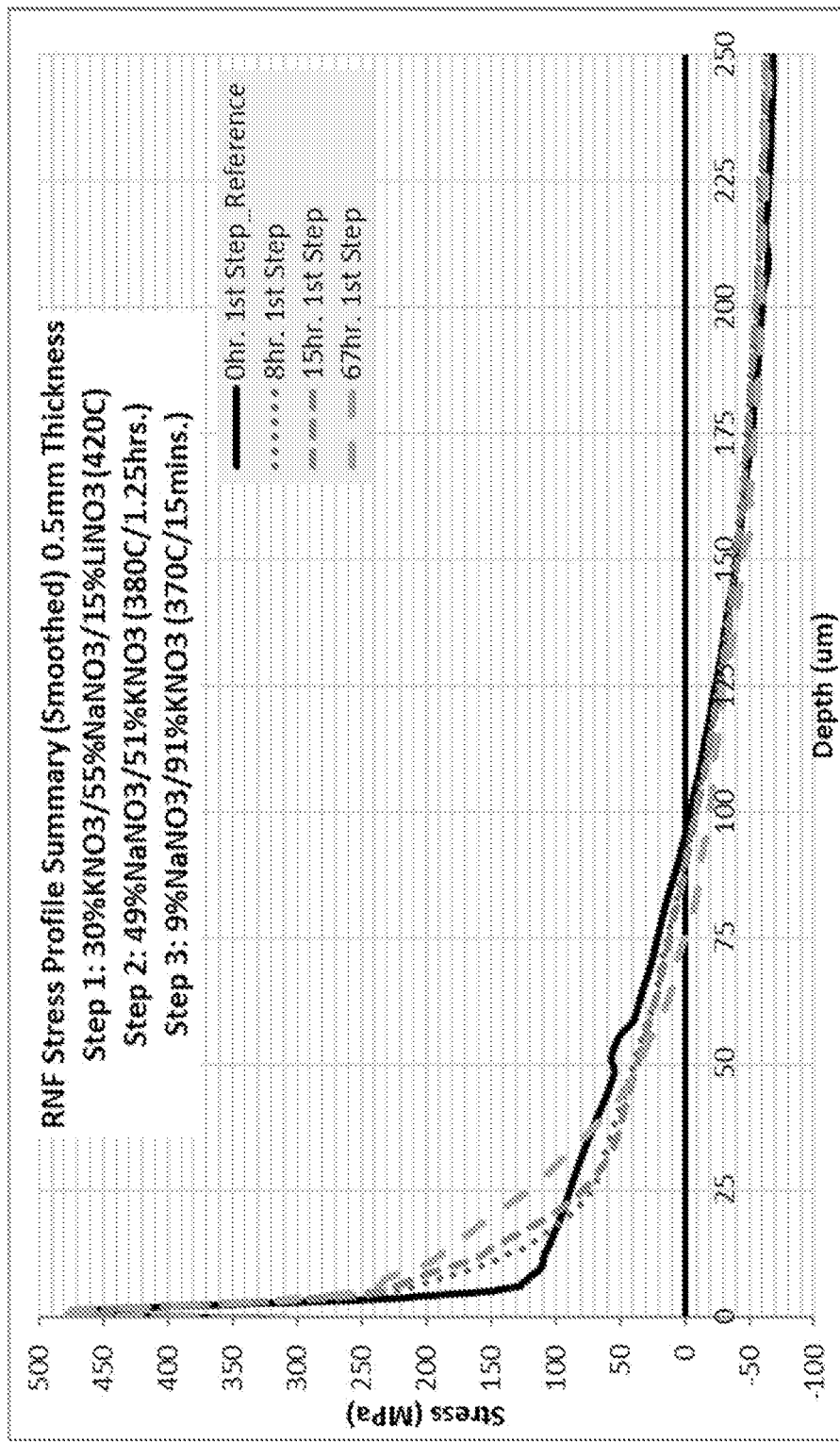
FIG. 27 is a graph of a stress profile of stress (MPa) versus a depth of up to one-half the thickness according to some embodiments disclosed herein.

FIG. 27 is a graph of a stress profile according to the samples of Table 5.1. FIG. 27 graphs stress (MPa) versus a depth of up to one-half the thickness of articles. The stress profile of FIG. 27 is an RNF-generated and smoothed profile. The data in the graph shows that the Na profile is deeper at the surface the longer the first step ion exchange is.

Table 5.1.1-A provides depth of layer of the spike ($DOL_{sp}$), knee stress ($CS_{knee}$), depth of compression (DOC), a first average compressive stress ($CS_{avg-1}$) in the region of enhanced stress, potassium depth of layer ($DOL_K$) and a second average compressive stress ($CS_{avg-2}$) in the region of enriched potassium. $DOL_K$ was derived from an inverse-WKB method and TM and TE index profiles discussed with respect to FIGS. 30-31. Table 5.1.1-B is a summary of $CS_{avg-1}$ over a specified depth.

TABLE 5.1.1-A

| First & second step (49Na:51K/1.25 hrs) & third step (9Na:91K/15 min.) IOX Sample ID | $1^{st}$ STEP Time (hr.) | Spike DOL ($DOL_{sp}$) (µm) | DOC (µm) | First Average compressive stress ($CS_{avg-1}$) over $DOL_{sp}$ + 1 µm to $DOL_{FSM}$ | Potassium (K) DOL ($DOL_K$) (µm) | Second Average compressive stress ($CS_{avg-2}$) over $DOL_{sp}$ + 1 µm to $DOL_K$ |
|---|---|---|---|---|---|---|
| REF B | 0 | — | 93.5-96.5 | — | — | — |
| P15 | 8 | 6.6 | 88-91 | 133 | 28-31 | 109 |
| P6 | 15 | 7.1 | 86-89 | 131 | 36-38 | 101 |
| P10 | 67 | 7.4 | 73-76 | 125 | 69-76 | 73 |

TABLE 5.1.1-B

| First & second step (49Na:51K/1.25 hrs) & third step (9Na:91K/15 min.) IOX | REF B | P15 | P6 | P10 |
|---|---|---|---|---|
| $1^{st}$ STEP Time (hr.) | 0 | 8 | 15 | 67 |
| Depth range (µm) | $CS_{avg-1}$ | $CS_{avg-1}$ | $CS_{avg-1}$ | $CS_{avg-1}$ |
| 8-20 | 106 | 127 | 148 | 182 |
| 10-20 | 104 | 119 | 139 | 175 |
| 12-20 | 102 | 111 | 131 | 170 |
| 8-25 | 102 | 114 | 131 | 168 |
| 10-25 | 100 | 106 | 123 | 162 |
| 12-25 | 98 | 99 | 116 | 156 |
| 8-30 | 98 | 103 | 117 | 155 |
| 10-30 | 96 | 96 | 110 | 149 |
| 12-30 | 95 | 91 | 103 | 143 |
| 8-35 | 95 | | 106 | 143 |
| 10-35 | 93 | | 99 | 137 |
| 12-35 | 91 | | 93 | 132 |
| 8-40 | 91 | | | 131 |
| 10-40 | 89 | | | 126 |
| 12-40 | 88 | | | 121 |
| 8-45 | 87 | | | 121 |
| 10-45 | 86 | | | 115 |
| 12-45 | 84 | | | 110 |

Figure 28:
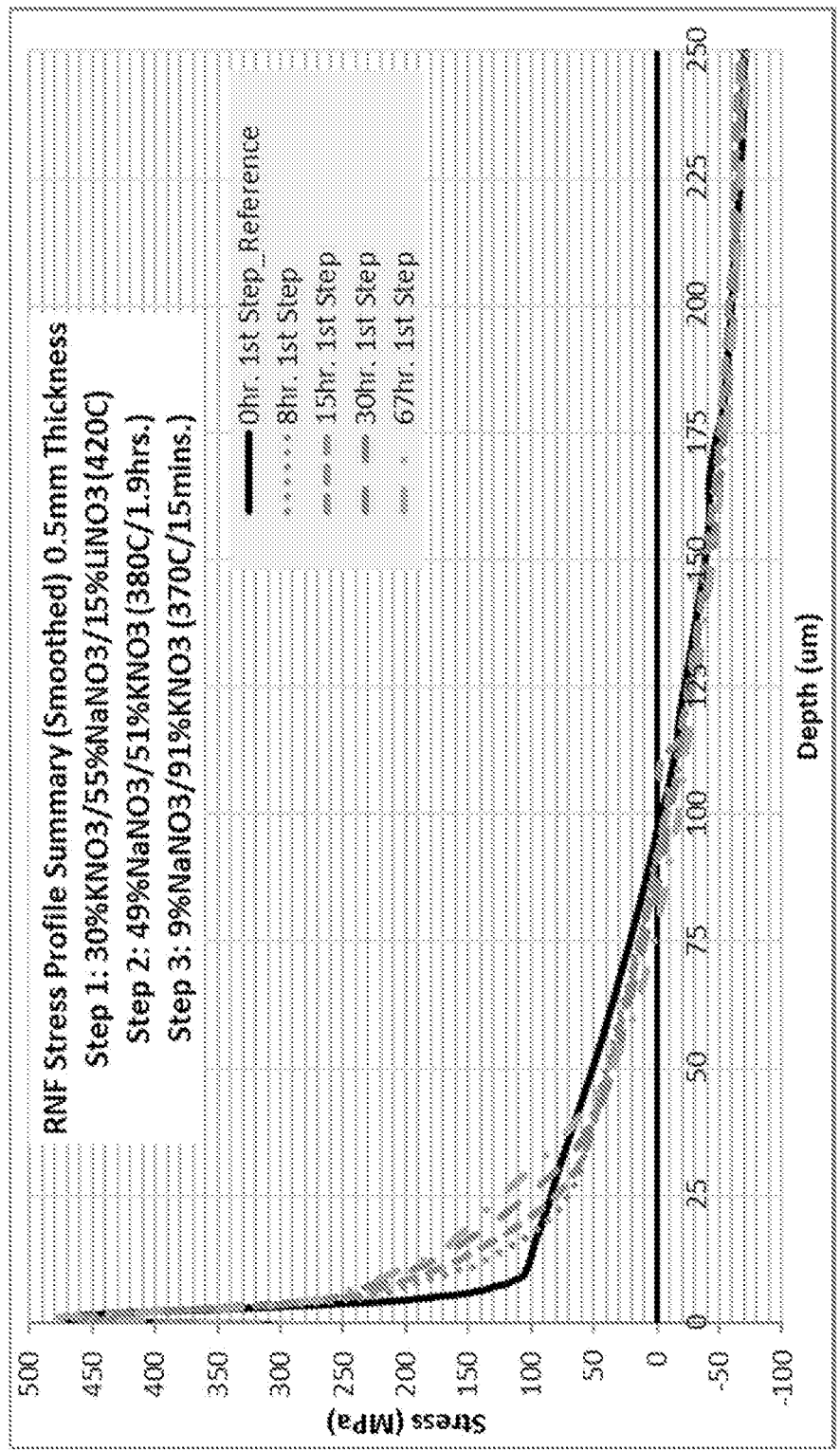
FIG. 28 is a graph of a stress profile of stress (MPa) versus a depth of up to one-half the thickness according to some embodiments disclosed herein.

FIG. 28 is a graph of a stress profile according to the samples of Table 5.3. FIG. 28 graphs stress (MPa) versus a depth of up to one-half the thickness of articles. The stress profile of FIG. 28 is an RNF-generated and smoothed profile. The data in the graph shows that the Na profile is deeper at the surface the longer the first step ion exchange is.

Table 5.3.1-A provides depth of layer of the spike ($DOL_{sp}$), knee stress ($CS_{knee}$), depth of compression (DOC), a first average compressive stress ($CS_{avg-1}$) in the region of enhanced stress, potassium depth of layer ($DOL_K$) and a second average compressive stress ($CS_{avg-2}$) in the region of enriched potassium are determined and summarized in. $DOL_K$ was derived from an inverse-WKB method and TM and TE index profiles discussed with respect to FIGS. 30-31. Table 5.3.1-B is a summary of $CS_{avg-1}$ over a specified depth.

TABLE 5.3.1-A

| First & second step (49Na:51K/1.92 hrs) & third step (9Na:91K/15 min.) IOX Sample ID | $1^{st}$ STEP Time (hr.) | Spike DOL ($DOL_{sp}$) (μm) | DOC (μm) | First Average compressive stress ($CS_{avg-1}$) over $DOL_{sp}$ + 1 μm to $DOL_{FSM}$ | Potassium (K) DOL ($DOL_K$) (μm) | Second Average compressive stress ($CS_{avg-2}$) over $DOL_{sp}$ + 1 μm to $DOL_K$ |
|---|---|---|---|---|---|---|
| REF D | 0 | — | 95-98 | — | — | — |
| P16 | 8 | 6.8 | 90-93 | 132 | 27-30 | 111 |
| P7 | 15 | 7.0 | 88-91 | 131 | 35-37 | 103 |
| P3 | 30 | 7.4 | 82-85 | 130 | 46 | 102 |
| P11 | 67 | 7.4 | 76-79 | 125 | 69-74 | 76 |

TABLE 5.3.1-B

| First & second step (49Na:51K/1.92 hrs) & third step (9Na:91K/15 min.) IOX | REF D | P16 | P7 | P3 | P11 |
|---|---|---|---|---|---|
| $1^{st}$ STEP Time (hr.) | 0 | 8 | 15 | 30 | 67 |
| Depth range (μm) | $CS_{avg-1}$ | $CS_{avg-1}$ | $CS_{avg-1}$ | $CS_{avg-1}$ | $CS_{avg-1}$ |
| 8-20 | 100 | 128 | 147 | 167 | 178 |
| 10-20 | 98 | 118 | 138 | 159 | 170 |
| 12-20 | 97 | 111 | 131 | 152 | 163 |
| 8-25 | 96 | 113 | 131 | 152 | 165 |
| 10-25 | 95 | 105 | 123 | 144 | 158 |
| 12-25 | 93 | 98 | 116 | 138 | 152 |
| 8-30 | 93 | 102 | 117 | 138 | 153 |
| 10-30 | 91 | 95 | 110 | 131 | 147 |
| 12-30 | 90 | 89 | 103 | 125 | 141 |
| 8-35 | 90 | | 107 | 126 | 142 |
| 10-35 | 88 | | 100 | 119 | 135 |
| 12-35 | 87 | | 94 | 113 | 130 |
| 8-40 | 86 | | | 115 | 131 |
| 10-40 | 85 | | | 108 | 125 |
| 12-40 | 84 | | | 103 | 120 |
| 8-45 | 83 | | | | 121 |
| 10-45 | 82 | | | | 115 |
| 12-45 | 80 | | | | 110 |

Tables 5.2.1-A, 4.1-A, and 5.1.1-A demonstrate that the average compressive stress in a region beyond the depth of the spike with characteristic depth signified by either $DOL_{FSM}$ or by the full depth of K-enrichment, $DOL_K$ was significantly increased compared to a reference chemical strengthening (example REF C) not comprising the K-enrichment first step.

Tables 5.2.1-B, 4.1-B, and 5.1.1-B demonstrate that the average CS in specific depth ranges of interest beyond the spike depth $DOL_{sp}$ was significantly increased when the K-enrichment step is long enough to provide this increase (e.g., for the examples with K-enrichment step of 8 hours or more). During drop events on certain hard surfaces having moderate roughness (such as rough granite) flaws formed on impact with depths most often below 60 micron, but sometimes as low as 15 microns, cause fracture when the cover glass experiences local bending. Increasing the average compressive stress in a region beyond the spike depth can help reduce the probability of such fractures, and the examples in these show such an increase. The increase in average CS is very large for depths below 20 microns.

Figure 29:
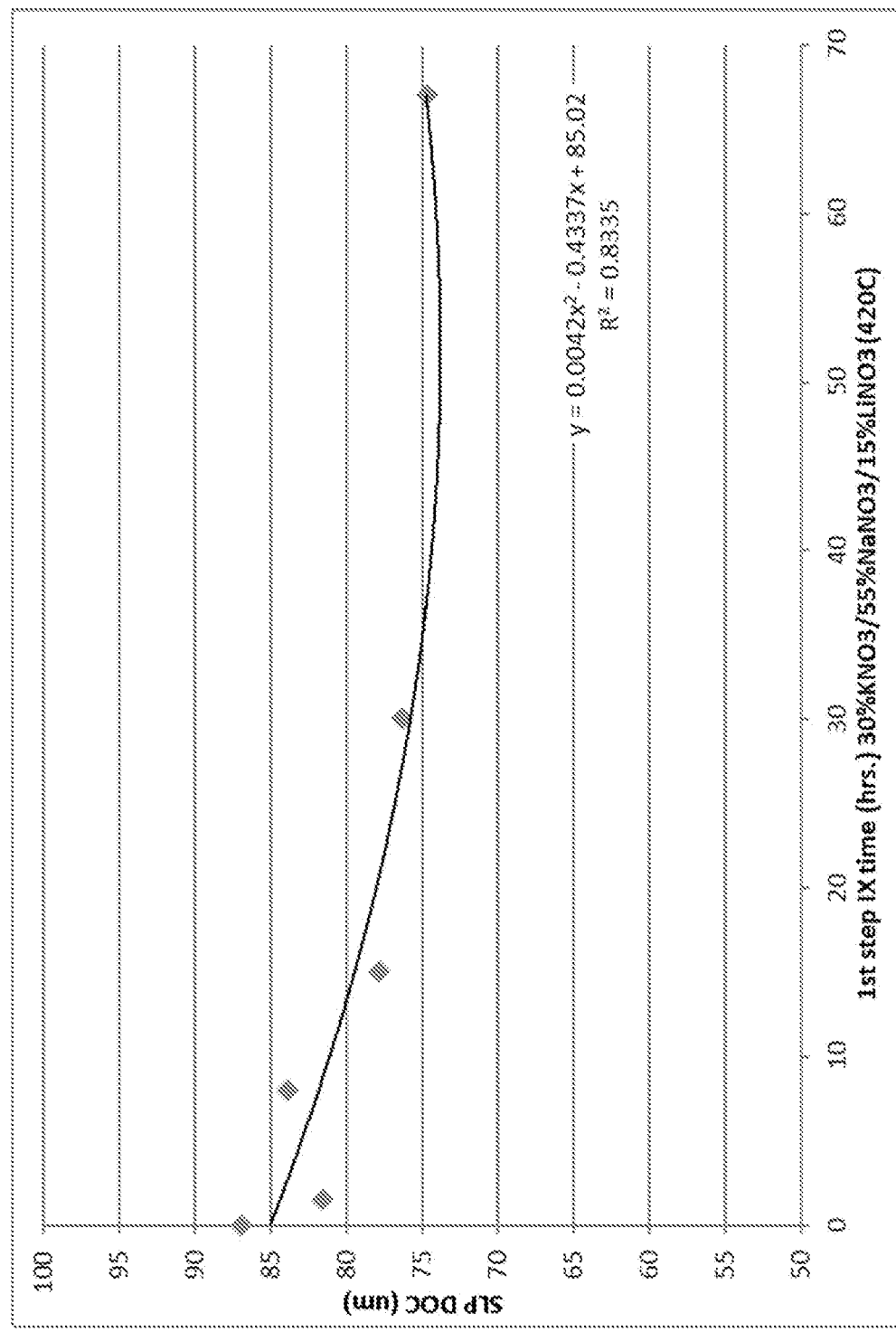
FIG. 29 is a graph of depth of compression (DOC) versus first IOX step time (hrs.) and samples having undergone three IOX steps.

Depth of Compression. FIG. 29 is a graph of depth of compression (DOC) versus first IOX step time (hrs.) according to the samples of Table 4. The DOC was calculated from SCALP measurements using an SLP-1000 instrument. The data in the graph shows that the DOC decreases slightly the longer the samples were in the first step bath.

Figure 30:
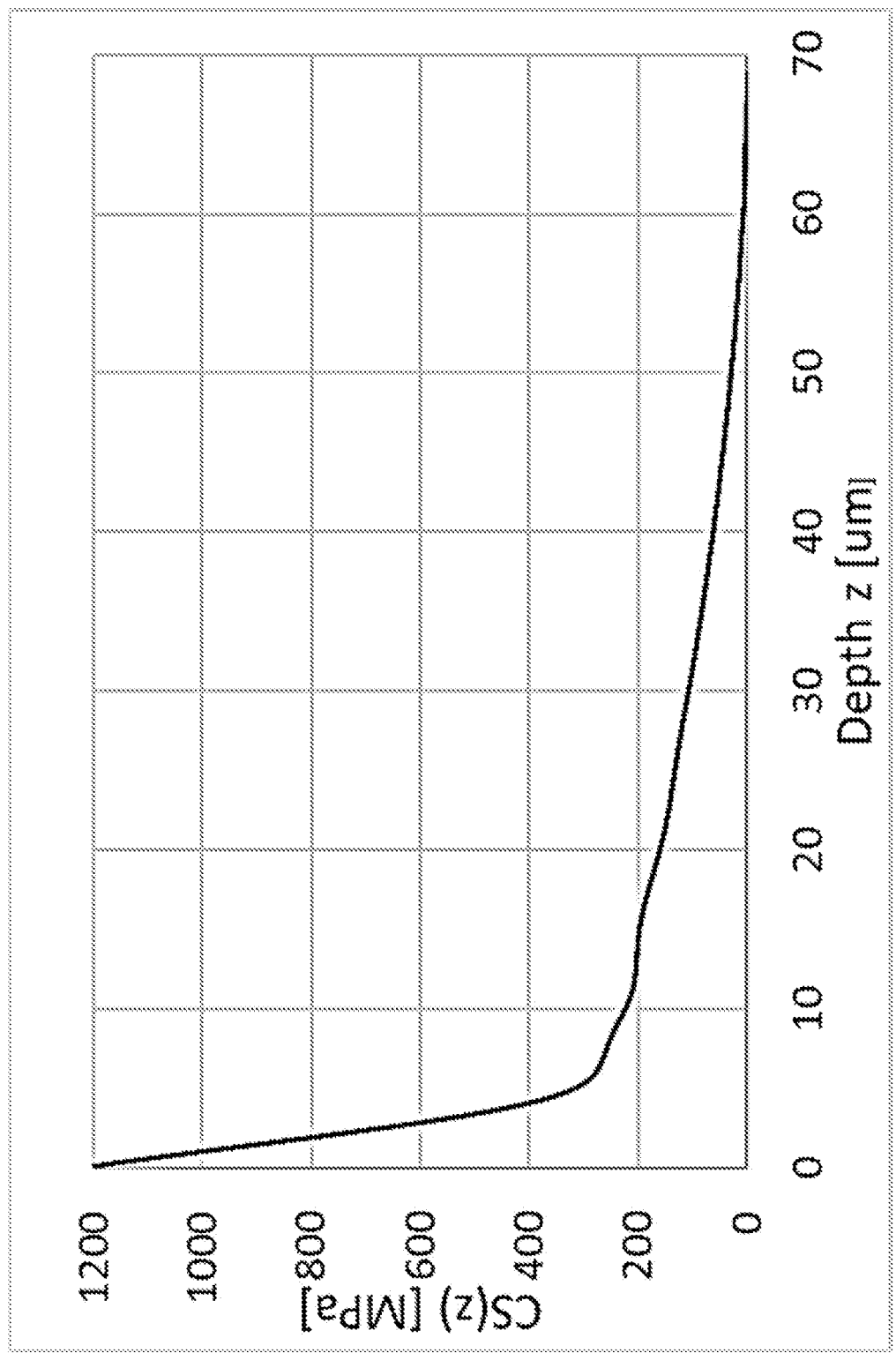
FIG. 30 is a stress profile of stress (MPa) versus a depth of up to one-half the thickness according to some embodiments disclosed herein.
Figure 31:
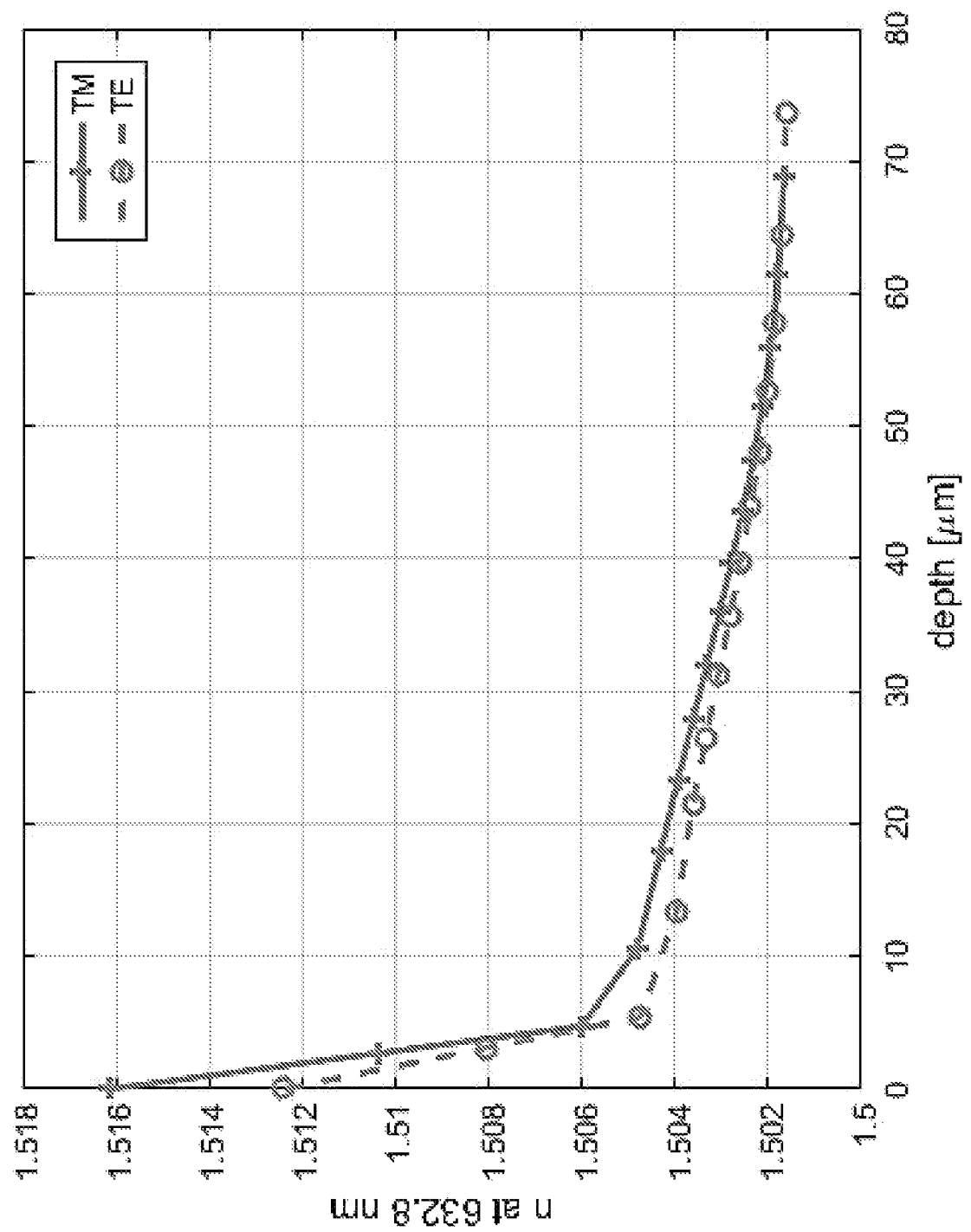
FIG. 31 is a graph of TM and TE index profiles for the stress profile of FIG. 30.

FIGS. 30-31 respectively show a partial stress profile and TM and TE index profiles obtained for sample P12 of Table 5.4, which received a third step of ion exchange in 100% $KNO_3$ at 380° C. for 12 minutes, to boost the surface compressive stress. The stress profile of FIG. 30 stress profile was extracted by an inverse-WKB method up to approximately the depth of K enrichment, via measuring the effective indices of the optical modes bound to the potassium-enriched portion of the profile. The profile was smoothed using low-pass filtering with a smoothing length about 4.5 microns, to decrease artifacts resulting from the discrete nature of the measurement. The stress profile was extracted almost to the full depth of potassium enrichment, which was up to 75 micrometers in accordance with FIG. 31. One of the index profiles, the TE profile in this case, was extracted to the full depth of 75 micrometers owing to the circumstance that there was a substantially bound optical mode having effective index essentially at the same level as the substrate index in the same TE polarization. Hence, FIG. 31 demonstrates an effective way to determine the minimum depth of K penetration non-destructively by measuring the depth of TE and TM index profiles via performing inverse-WKB on carefully measured prism-coupling spectra able to resolve the fringes corresponding to all of the bound optical modes. In addition, FIG. 30 demonstrates a good non-destructive method to obtain partial stress profile up to the depth of K enrichment, containing the surface CS, and a reasonably good estimate of the $CS_{knee}$ and the stress distribution in the K-enriched region.

Example 7—Prophetic

In the embodiments described so far, there was a decrease of compressive stress at depths beyond the target maximum depth of CS boost that is provided by the potassium enrichment, along with a decrease in depth of compression (DOC) when comparing to the reference stress profiles of the identical chemical strengthening lacking the potassium-enrichment step. Said reductions of CS at large depths and of DOC are generally highly undesirable, and are accepted as a trade-off for a significant boost in $CS_{knee}$ and more generally in CS in a sub-region situated in the depth range between $DOL_{sp}$ and 40 micrometers for the examples in the present disclosure.

This undesirable trade-off can be partially or significantly mitigated by performing a partial lithium enrichment of the glass interior during or after the potassium enrichment step. Said lithium enrichment allows higher compressive stress to occur in the deep regions that are poor in K but enriched in Na after the final steps of chemical strengthening. More specifically, the lithium enrichment prior to the final steps that introduce Na helps increase the gradient of Na concentration after the final steps, and thus achieve higher CS in the regions where Na concentrations are increased by K concentration is low, for example the region between the target depth of CS boost and the depth of compression.

In some embodiments, the lithium enrichment is performed simultaneously with the K enrichment by utilizing bath that is not equilibrated with the glass with respect to Li—Na exchange. More specifically, the mass fractions of $KNO_3$, $LiNO_3$, and $NaNO_3$ in the bath are such that the glass receives net increase in K and Li ions, and net decrease of Na ions, and a weight loss is registered as a result of this K and Li enrichment step even though K ions are heavier than Na ions. In some embodiments, the $LiNO_3$ to $NaNO_3$ ratio is increased for a fixed $KNO_3$ fraction when compared to a bath that was equilibrated with respect to Li—Na exchange. In the presented examples, a partially equilibrated bath for the glass of Composition B has 30% $KNO_3$:15% $LiNO_3$: 55% $NaNO_3$ by weight. A bath that would accomplish the simultaneous K and Li enrichment and find an beneficial balance between the CS boost in the target region and CS loss in the deeper region is a bath having 30% KNO3:20% LiNO3:50% NaNO3. The weight ratio LiNO3:NaNO3 in this bath is 0.40, which is 47% higher than the weight ratio of the partially equilibrated bath, and will promote Li enrichment of the glass of Composition B. At the same time, the concentration of K-enrichment will decrease slightly, though the $CS_{knee}$ boost in the final profile should still be significant, in the currently disclosed range above 160 MPa after the subsequent one or two steps involving the introduction of Na are performed in the same way as in the previous examples. The CS loss at depths from the maximum CS-boost depth to the DOC will be reduced, and CT will increase compared to the presented examples. The final DOC may increase slightly compared to the case of K enrichment without Li enrichment, in part due to the lower concentration of K enrichment. In addition, after the Li enrichment step, a somewhat longer Na diffusion can be tolerated, which can partially recover the DOC loss beyond the partial DOC recovery associated with the slightly lower concentration of K enrichment. For example, instead of using 1.92 hours in the Na-diffusion step (second step), the Na diffusion time at 380° C. can be increased to 2-2.5 hours, and in cases of more significant Li enrichment from the first step, even to 3 hours. In some cases the Li enrichment can cause a change in effective diffusivity for Na and K in subsequent steps, which may benefit from adjustment of the Na diffusion time to achieve the maximum stress in the profile. The adjustment would normally be within a factor of 2.

In some embodiments, the Li reduction of K concentration incorporated in the glass as a result of the increased Li to Na ratio in the bath may be compensated by increasing the $KNO_3$ content of the bath, while detracting more $NaNO_3$ than $LiNO_3$ to keep the $LiNO_3$ to $NaNO_3$ ratio elevated. In an example, the K+Li enrichment bath of the previous example may be modified to the ratio 35% $KNO_3$:18% $LiNO_3$:47% $NaNO_3$. This bath is expected to produce similarly increased K enrichment as the original bath (30:15:55), but with simultaneous Li enrichment and result in higher-CT profiles with higher overall integrated compressive stress over the compressive-stress region. As for the previous example of Li enrichment, the Na-diffusion final steps may benefit from a slight adjustment of bath diffusion time or temperature to achieve maximum integrated stress in the profile.

In some embodiments, the Li-enrichment step may be performed after a K-enrichment step, particularly when it is beneficial for the $LiNO_3$ content in the bath to be high (e.g., 30%, 40%, or more). In that case, it may be undesirable to elevate the bath temperature above 420° C., but it may be desirable to elevate the bath temperature for the purposes of K diffusion, particularly for glasses in which the K diffusion is even slower than for the example glass of Composition B of this disclosure. In an example, a first bath having relatively high $KNO_3$ content, for example 30%, 40%, 50%, or even 80%, 90%, or 95%, may be used in a first K-enrichment step, while the rest of the bath weight is balanced between $NaNO_3$ and $LiNO_3$ to either prevent substantial modification of the composition of the substrate interior, or to enrich the substrate in Li slightly. The main goal of this step may be to quickly diffuse a lot of K ions to a relatively large depth, via a combination of higher K concentration in the bath, and hotter bath, if a hotter bath is acceptable. Then, in a subsequent Li-enrichment step, the bath has higher content of $LiNO_3$, lower content of $KNO_3$, and either higher or lower content of $NaNO_3$ than the first-step bath. If the $LiNO_3$ is significantly increased, e.g., to levels of 20, 30, 40, or more % of the bath weight, then the $NaNO_3$ may also benefit from being increased to avoid significant tension and warp in the samples, as well as difficulties in maintaining the bath. This step may be performed at a temperature even lower than 420° C., to avoid decomposition of the $LiNO_3$, if the bath composition has more than 40% of $LiNO_3$ by weight. Following such significant Li enrichment, stress profiles with significantly higher $CS_{knee}$ and CT can be generated than the examples presented so far in the present disclosure, after applying Na-enrichment final steps similar to the ones described herein.

Example 8

The following examples used Compositions C and D and substrates that were 0.7 mm thick by 50 millimeters by 50 millimeters. These examples were obtained in pursuit of stress profiles seeking to withstand fracture for a particularly demanding application involving cover glass for a large and heavy article which would generate very significant stresses upon drop events on a hard smooth or rough surface. The weight of the article was several times higher than that of a smart phone. Raising $CS_{knee}$ further was considered particularly important, along with using glass compositions with higher fracture toughness, and stress profiles having larger DOC and larger total stress area (and associated with it larger CT).

0.7 mm thick samples of Composition C were heat treated according to a typical thermal cycle for 3-D forming which results is the glass having fictive temperature intermediate between the anneal point and a typical fusion-forming fictive temperature, with corresponding diffusivities for K and Na ions being intermediate between the diffusivities for annealed glass and fusion-formed glass.

In a first, K-enrichment ion-exchange step, the samples were immersed in a triple-nitrate bath comprising $KNO_3$, $LiNO_3$, and $NaNO_3$ in weight ratios of 58:19.4:22.6. The bath also had additive silicic acid amounting to 0.5% of the total weight if the nitrates, and additive sodium nitrite ($NaNO_2$) amounting to 0.35% of the total weight of the nitrates. The immersion time was 7 hours at 440° C. In a second, Na-enrichment step, the samples were immersed in a bath comprising $NaNO_3$ and $KNO_3$ in a weight ratio 25:75 at 400° C. for 2.5 hours. In a third step, a high-CS spike was obtained on the surface after immersion in a $KNO_3$-only bath at 390° C. for 20 min The resulting profile had K-ion penetration exceeding 30 microns, and $CS_{knee}$ over 400 MPa.

This example shows that the inventive method enables the boost in $CS_{knee}$ and CS in a region immediately following the spike not only in a composition according to Composition B, but also in other Li-containing glass composition for chemical strengthening more suitable for higher CT and higher $CS_{knee}$. The characteristic boosted average compressive stresses $CS_{avg-1}$ and $CS_{avg-2}$ were significantly increased to 230 MPa and 164 MPa, respectively, owing to a combination of a benefit of the glass composition, and a more aggressive K-enrichment step which provided some significant Li-enrichment as well, as evidenced by a net weight loss during the K-enrichment step. Analysis of the 0.7 mm samples of Composition C are provided in Table 6.1.

TABLE 6.1

| First IOX step 19.4Li/ 58K/22.6Na 440° C. Second IOX step (25Na:75K/2.5 hrs/400° C.). Third IOX step (100K/20 min/390° C.). Sample ID | Sample 6.1-a |
|---|---|
| $1^{st}$ STEP Time (hr.) | 7 |
| Reported FSM Stress ($CS_{max}$) (MPa) | 1100 |
| Reported FSM DOL ($DOL_{FSM}$) (μm) | 23 |
| Surface Stress ($CS_{surface}$) (MPa) | 1172 |
| $CS_{knee}$ (MPa) | 410 ± 10 |
| SCALP CT (MPa) | 82.6 |
| Spike DOL ($DOL_{sp}$) (μm) (+/− 1 um) | 6.5 |
| DOC (μm) | 122 |
| First Average compressive stress ($CS_{avg-1}$) over $DOL_{sp}$ + 1 μm to $DOL_{FSM}$ | 230 |
| Potassium (K) DOL ($DOL_K$) (μm) | 38 |
| Second Average compressive stress ($CS_{avg-2}$) over $DOL_{sp}$ + 1 μm to $DOL_K$ | 164 |

Composition D has fracture toughness that is about 9% higher than that of Composition C, and 15% higher than that of Composition B, but has significantly slower diffusivity of K, and presents a challenge for developing a deep K-enriched region and deep K-spike. Imparting a spike of maximum surface CS by a final ion-exchange step in a bath providing only K ions would lead to a relatively low $CS_{knee}$ at the bottom of the spike, which is also a shallow spike due to the relatively low diffusivity of K ions. Hence, it is of value to provide a $CS_{knee}$ boost and a boost in a region immediately following the spike even if this region may be shallower than in the other examples.

0.7 mm thick samples of Composition D were heat treated according to a typical thermal cycle for 3-D forming which results is the glass having fictive temperature intermediate between the anneal point and a typical fusion-forming fictive temperature, with corresponding diffusivities for K and Na ions being intermediate between the diffusivities for annealed glass and fusion-formed glass. In the two examples using Composition D, the K-enrichment step was obtained by immersion at 440° C. for 8 hours in a bath comprising $KNO_3$, $LiNO_3$, and $NaNO_3$ in weight ratios of 58:17:25, with added 0.5% silicic acid, said immersion resulting in the formation of a K-enriched layer with CS near 300 MPa and DOL around 15 microns according to standard FSM-6000 measurement. The immersion also resulted in an enrichment of the glass interior region in Li, as evidenced by the net weight loss of about 0.1% after this ion-exchange step. The next step responsible for introduction of large amount of Na into the glass was performed in a bath having high $NaNO_3$ content. In one example the bath was comprising $NaNO_3$ and $KNO_3$ in a ratio 40:60 by weight. In another example, said ratio was 28:72 and the glass specimen was immersed at 400° C. In both examples the glass specimens were immersed at 430° C. for 130 min For both examples, the surface CS was boosted in a final ion-exchange step in which the specimens were immersed in a $KNO_3$-only bath at 380° C. for 20 min The main attributes of the resulting stress profiles and K-enriched region are summarized in the Table 6.2.

TABLE 6.2

| First IOX step 17Li / 58K / 25Na 440° C. Second IOX step (see below/2.17 hrs/430° C.). Third IOX step (100K/20 min/380° C.). Sample ID | Sample 6.2-a | Sample 6.2-b |
|---|---|---|
| $1^{st}$ STEP Time (hr.) | 8 | 8 |
| $2^{nd}$ STEP salt bath | 28Na/72K | 40Na/60K |
| Reported FSM Stress ($CS_{max}$) (MPa) | 1386 | 1300 |
| Reported FSM DOL ($DOL_{FSM}$) (μm) | 13.5 | 14 |
| Surface Stress ($CS_{surface}$) (MPa) | 1353 | 1391 |
| $CS_{knee}$ (MPa) | 485 ± 10 | 440 ± 20 |
| SCALP CT (MPa) | 98.6 | 101.4 |
| Spike DOL ($DOL_{sp}$) (μm) (+/− 1 um) | 3.2 | 3.8 |
| DOC (μm) | 133 | 136 |
| First Average compressive stress ($CS_{avg-1}$) over $DOL_{sp}$ + 1 μm to $DOL_{FSM}$ | 278 | 258 |
| Potassium (K) DOL ($DOL_K$) (μm) | 15.6 | 17 |
| Second Average compressive stress ($CS_{avg-2}$) over $DOL_{sp}$ + 1 μm to $DOL_K$ | 257 | 233 |

EMBODIMENTS

Embodiment 1. A glass-based article comprising: a lithium-based aluminosilicate composition; a glass-based substrate having opposing first and second surfaces defining a substrate thickness (t), wherein t is less than or equal to 0.74 mm; and a stress profile comprising: a maximum compressive stress ($CS_{max}$) of greater than or equal to 450 MPa; a spike region extending from the first surface to a tail region; and the tail region extending to a center of the glass-based article; wherein the tail region comprises: a region of enhanced stress having a first average compressive stress ($CS_{avg-1}$) of greater than or equal to 100 MPa; and a FSM depth of layer ($DOL_{FSM}$) located at a depth of greater than or equal to 13 micrometers.

Embodiment 2. The glass-based article of the preceding embodiment, wherein the first average compressive stress ($CS_{avg-1}$) is less than or equal to 220 MPa.

Embodiment 3. The glass-based article of any preceding embodiment, wherein the spike region extends to a spike depth of layer ($DOL_{sp}$) from which the tail region extends.

Embodiment 4. The glass-based article of any preceding embodiment, wherein $CS_{avg-1}$ is measured from the $DOL_{sp}$ plus 1 micrometer to the $DOL_{FSM}$.

Embodiment 5. The glass-based article of any preceding embodiment, wherein a $DOL_{sp}$ is greater than or equal to 3 micrometers and less than or equal to 20 micrometers.

Embodiment 6. The glass-based article of embodiment 1, wherein $CS_{avg-1}$ is in a range of greater than or equal to 125 to less than or equal to 195 when measured from a depth of 8 micrometers to a depth of 20 micrometers.

Embodiment 7. The glass-based article of embodiment 1, wherein $CS_{avg-1}$ is in a range of greater than or equal to 100 to less than or equal to 160 when measured from a depth of 10 micrometers to a depth of 30 micrometers.

Embodiment 8. The glass-based article of any preceding embodiment, wherein the $DOL_{FSM}$ is located at a depth of greater than or equal to 20 micrometers.

Embodiment 9. The glass-based article of the preceding embodiment, wherein the $DOL_{FSM}$ is located at a depth of greater than or equal to 22 micrometers.

Embodiment 10. A glass-based article comprising: a lithium-based aluminosilicate composition; a glass-based substrate having opposing first and second surfaces defining a substrate thickness (t), wherein t is less than or equal to 0.74 mm; and a stress profile comprising: a maximum compressive stress ($CS_{max}$) of greater than or equal to 450 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to a potassium depth of layer ($DOL_K$) having a second average compressive stress ($CS_{avg-2}$) of greater than or equal to 100 MPa; wherein the $DOL_k$ is located at a depth of greater than or equal to 20 micrometers.

Embodiment 11. The glass-based article of the preceding embodiment, wherein the average compressive stress ($CS_{avg}$) is less than or equal to 170 MPa.

Embodiment 12. The glass-based article of any of embodiment 10 to the preceding embodiment, wherein the $DOL_K$ is located at a depth of greater than or equal to 20 micrometers.

Embodiment 13. The glass-based article of any of embodiment 10 to the preceding embodiment, wherein a knee compressive stress ($CS_{knee}$) is greater than or equal to 100 MPa.

Embodiment 14. The glass-based article of the preceding embodiment, wherein the $CS_{knee}$ is greater than or equal to 160 MPa.

Embodiment 15. The glass-based article of preceding embodiment, wherein the $CS_{knee}$ is greater than or equal to 200 MPa.

Embodiment 16. The glass-based article of any embodiment 10 to the preceding embodiment, wherein the $DOL_{sp}$ is greater than or equal to 3 micrometers.

Embodiment 17. The glass-based article of any preceding embodiment, wherein the t is greater than or equal to 0.2 millimeters.

Embodiment 18. The glass-based article of any preceding embodiment, wherein a molar ratio of $Na_2O$ to $Li_2O$ in the lithium-based aluminosilicate composition is greater than or equal to 1.

Embodiment 19. The glass-based article of any preceding embodiment, wherein a maximum central tension ($CT_{max}$) is greater than or equal to 40 MPa.

Embodiment 20. A glass-based article comprising: a lithium-based aluminosilicate composition, wherein a molar ratio of $Na_2O$ to $Li_2O$ in the lithium-based aluminosilicate composition is greater than or equal to 1; a glass-based substrate having opposing first and second surfaces defining a substrate thickness (t), wherein t is greater than or equal to 0.2 mm and less than or equal to 0.74 mm; and a stress profile comprising: a maximum compressive stress ($CS_{max}$) of greater than or equal to 450 MPa; a maximum central tension ($CT_{max}$) of greater than or equal to 40 MPa; a spike region extending from the first surface to a tail region; and the tail region extending to a center of the glass-based article; wherein the tail region comprises: a region of enhanced stress having a first average compressive stress ($CS_{avg-1}$) of greater than or equal to 100 MPa; and a FSM depth of layer ($DOL_{FSM}$) located at a depth of greater than or equal to 13 micrometers.

Embodiment 21. The glass-based article of the preceding embodiment, wherein the first average compressive stress ($CS_{avg-1}$) is less than or equal to 220 MPa.

Embodiment 22. The glass-based article of embodiment 20, wherein $CS_{avg-1}$ is in a range of greater than or equal to 125 to less than or equal to 195 when measured from a depth of 8 micrometers to a depth of 20 micrometers.

Embodiment 23. The glass-based article of embodiment 20, wherein $CS_{avg-1}$ is in a range of greater than or equal to 100 to less than or equal to 160 when measured from a depth of 10 micrometers to a depth of 30 micrometers.

Embodiment 24. The glass-based article of any preceding embodiment, wherein a depth of compression (DOC) is greater than or equal to 0.12·t.

Embodiment 25. The glass-based article of any preceding embodiment, wherein the $CS_{max}$ is greater than or equal to 600 MPa.

Embodiment 26. The glass-based article of the preceding embodiment, wherein the $CS_{max}$ is greater than or equal to 750 MPa.

Embodiment 27. The glass-based article of any preceding embodiment, wherein the maximum central tension ($CT_{max}$) is greater than or equal to 55 MPa.

Embodiment 28. The glass-based article of the preceding embodiment, wherein the maximum central tension ($CT_{max}$) is greater than or equal to 60 MPa.

Embodiment 29. The glass-based article of the preceding embodiment, wherein the maximum central tension ($CT_{max}$) is greater than or equal to 65 MPa.

Embodiment 30. The glass-based article of the preceding embodiment, wherein the maximum central tension ($CT_{max}$) is greater than or equal to 70 MPa.

Embodiment 31. The glass-based article of any preceding embodiment comprising potassium oxide ($K_2O$) having a non-zero concentration that varies from the first surface to a potassium depth of layer ($DOL_K$).

Embodiment 32. The glass-based article of any of embodiment 10 to the preceding embodiment, wherein all points of the stress profile located in the spike region comprise a tangent having a slope with an absolute value that is 20 MPa/micrometer or greater, and all points of the stress profile located in the tail region deeper than the $DOL_K$ comprise a tangent having a slope with an absolute value that is less than 20 MPa/micrometer.

Embodiment 33. The glass-based article of any preceding embodiment, wherein the thickness is less than 0.70 mm.

Embodiment 34. A glass-based article comprising: a lithium-based aluminosilicate composition; a glass-based substrate having opposing first and second surfaces defining a substrate thickness (t), wherein t is greater than or equal to 0.2 millimeters and less than or equal to 0.74 millimeter; potassium oxide ($K_2O$) having a non-zero concentration that varies from the first surface to a potassium depth of layer ($DOL_K$); and a stress profile comprising: a maximum compressive stress ($CS_{max}$) of greater than or equal to 450 MPa; a maximum central tension ($CT_{max}$) of greater than or equal to 40 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to the $DOL_K$ having a second average compressive stress ($CS_{avg-2}$) in a range of greater than or equal to 100 MPa to less than or equal to 170 MPa. wherein the $DOL_K$ is located at a depth of greater than or equal to 20 micrometers.

Embodiment 35. A consumer electronic product comprising: a housing having a front surface, a back surface, and side surfaces; electrical components at least partially within the housing, the electrical components comprising at least a controller, a memory, and a display, the display at or adjacent the front surface of the housing; and a cover disposed over the display; wherein at least a portion of at least one of the housing and the cover comprises the glass-based article of one of embodiments 1 to 34.

Embodiment 36. A method of manufacturing a glass-based article comprising: exposing a glass-based substrate that comprises sodium oxide and lithium oxide in a base composition, the glass-based substrate having opposing first and second surfaces defining a substrate thickness (t), to an ion exchange treatment to form the glass-based article, the ion exchange treatment comprising: a first bath comprising a potassium salt and a sodium salt and a lithium salt; and a second bath comprising a potassium salt, a sodium salt, and optionally a lithium salt; wherein t is less than or equal to 0.74 mm and the substrate comprises a composition wherein a molar ratio of $Na_2O$ to $Li_2O$ in the lithium-based aluminosilicate composition is greater than or equal to 1; wherein the glass-based article comprises a stress profile comprising: a maximum compressive stress ($CS_{max}$) of greater than or equal to 450 MPa; a spike region extending from the first surface to a spike depth of layer ($DOL_{sp}$); and a tail region extending from the $DOL_{sp}$ to a center of the glass-based article; wherein the tail region comprises: a region of enriched potassium extending from the $DOL_{sp}$ plus 1 micrometer to a potassium depth of layer ($DOL_K$) having a second average compressive stress ($CS_{avg-2}$) of greater than or equal to 100 MPa; wherein the $DOL_K$ is located at a depth of greater than or equal to 20 micrometers.

Embodiment 37. The method of embodiment 36, wherein in the first bath: the potassium salt is $KNO_3$, which is present in an amount of greater than or equal to 30% by weight, the sodium salt is $NaNO_3$, the lithium salt is $LiNO_3$, and a weight ratio of $LiNO_3$ to $NaNO_3$ in the first bath is in a range of 0.273±0.1% to 0.858±0.1%.

Embodiment 38. The method of embodiment 36 or 37, wherein after exposure to the first bath, a value of weight gain of the glass-based substrate is in a range of greater than or equal to −0.3% by weight to less than or equal to 0.1(1+0.02/t)%, wherein t is measured in millimeters.

Embodiment 39. The method of one of embodiments 36 to 38, wherein the ion exchange treatment further comprises a third bath comprising a potassium salt and a sodium salt wherein content of the potassium salt in the third bath is greater than or equal to 90% by weight.

Embodiment 40. The method of one of embodiments 36 to 39, wherein the first bath comprises: 20-60 wt. % $NaNO_3$, 10-20 wt. % $LiNO_3$, and 25-60 wt. % $KNO_3$, wherein content of the $NaNO_3$, $LiNO_3$, and $KNO_3$ totals 100%, and the glass substrate comprises a base composition having a molar ratio of $Na_2O$ to $Li_2O$ of greater than or equal to 1.

Embodiment 41. The method of embodiment 40, wherein the first bath comprises: 50-60 wt. % $NaNO_3$, 10-20 wt. % $LiNO_3$, and 25-35 wt. % $KNO_3$, wherein content of the $NaNO_3$, $LiNO_3$, and $KNO_3$ totals 100%, and the glass substrate comprises a base composition having a molar ratio of $Na_2O$ to $Li_2O$ of greater than or equal to 1.3.

Embodiment 42. The method of embodiment 40, wherein the first bath comprises: 20-30 wt. % $NaNO_3$, 10-20 wt. % $LiNO_3$, and 55-60 wt. % $KNO_3$, wherein content of the $NaNO_3$, $LiNO_3$, and $KNO_3$ totals 100%, and the glass substrate comprises a base composition having a molar ratio of Na2O to $Li_2O$ of greater than or equal to 1 and less than or equal to 1.3.

While the foregoing is directed to various embodiments, other and further embodiments of the disclosure may be devised without departing from the basic scope thereof, and the scope thereof is determined by the claims that follow. The features of the present disclosure may be combined in any and all combinations, for example as set forth in the following embodiments.

Directional terms as used herein—for example up, down, right, left, front, back, top, bottom, inward, outward—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the terms "comprising" and "including," and variations thereof, shall be construed as synonymous and open ended, unless otherwise indicated. A list of elements following the transitional phrases comprising or including is a non-exclusive list, such that elements in addition to those specifically recited in the list may also be present.

It will be apparent to those skilled in the art that various modifications and variations can be made to the present disclosure without departing from the spirit and scope of the disclosure. Thus, it is intended that the present disclosure cover such modifications and variations.

What is claimed is:
1. A glass-based article comprising:
a lithium containing aluminosilicate composition;
a glass-based substrate having opposing first and second surfaces defining a substrate thickness (t), wherein t is less than or equal to 0.74 mm; and
a stress profile comprising:
a maximum compressive stress ($CS_{max}$) of greater than or equal to 450 MPa;
a spike region extending from the first surface to a tail region; and
the tail region extending to a center of the glass-based article;

wherein the tail region comprises:
  a region of enhanced stress having a first average compressive stress ($C_{avg-1}$), from $DOL_{sp}$, plus one micron to $DOL_{FSM}$, of greater than or equal to 100 MPa; and
  a FSM depth of layer ($DOL_{FSM}$) located at a depth of greater than or equal to 13 micrometers.

2. The glass-based article of the claim 1, wherein the first average compressive stress ($CS_{avg-1}$) is less than or equal to 220 MPa.

3. The glass-based article of claim 1, wherein a $DOL_{sp}$ is greater than or equal to 3 micrometers and less than or equal to 20 micrometers.

4. The glass-based article of claim 1, wherein $CS_{avg-1}$ is in a range of greater than or equal to 125 to less than or equal to 195.

5. The glass-based article of claim 1, wherein $CS_{avg-1}$ is in a range of greater than or equal to 100 to less than or equal to 160.

6. The glass-based article of claim 1, wherein the $DOL_{FSM}$ is located at a depth of greater than or equal to 20 micrometers.

7. The glass-based article of claim 6, wherein the $DOL_{FSM}$ is located at a depth of greater than or equal to 22 micrometers.

8. The glass-based article of claim 1, wherein the t is greater than or equal to 0.2 millimeters.

9. The glass-based article of claim 1, wherein a molar ratio of $Na_2O$ to $Li_2O$ in the lithium containing aluminosilicate composition is greater than or equal to 1.

10. The glass-based article of claim 1, wherein a maximum central tension ($CT_{max}$) is greater than or equal to 40 MPa.

11. The glass-based article of claim 1 comprising potassium oxide ($K_2O$) having a non-zero concentration that varies from the first surface to a potassium depth of layer ($DOL_K$).

12. The glass-based article of claim 1, wherein all points of the stress profile located in the spike region comprise a tangent having a slope with an absolute value that is 20 MPa/micrometer or greater, and all points of the stress profile located in the tail region deeper than the $DOL_K$ comprise a tangent having a slope with an absolute value that is less than 20 MPa/micrometer.

13. The glass-based article of claim 1, wherein the thickness is less than 0.70 mm.

14. A consumer electronic product comprising:
  a housing having a front surface, a back surface, and side surfaces;
  electrical components at least partially within the housing, the electrical components comprising at least a controller, a memory, and a display, the display at or adjacent the front surface of the housing; and
  a cover disposed over the display;
  wherein at least a portion of at least one of the housing and the cover comprises the glass-based article of claim 1.

* * * * *